Oct. 11, 1960 W. E. DIETRICH, JR 2,955,762
REPRESENTATION AND MEASUREMENT OF
PHYSICAL ENTITIES ELECTRICALLY
Filed July 28, 1953 25 Sheets-Sheet 2
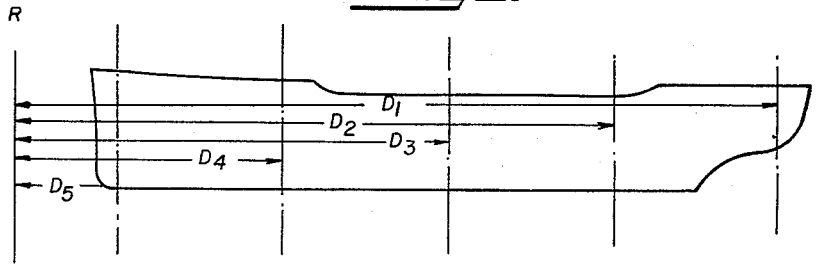
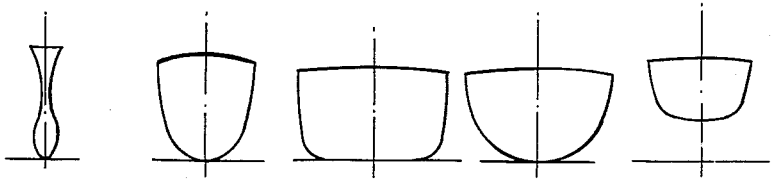
FIG 2-A   FIG 2-B   FIG 2-C   FIG 2-D   FIG 2-E
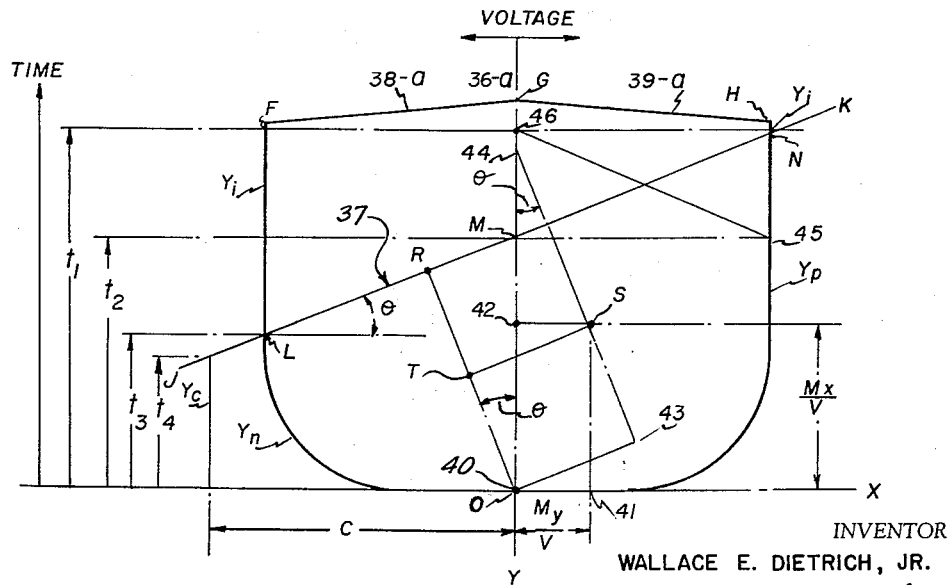
INVENTOR
WALLACE E. DIETRICH, JR.
BY George Sipkin
    B.L. Zampiell
ATTORNEYS

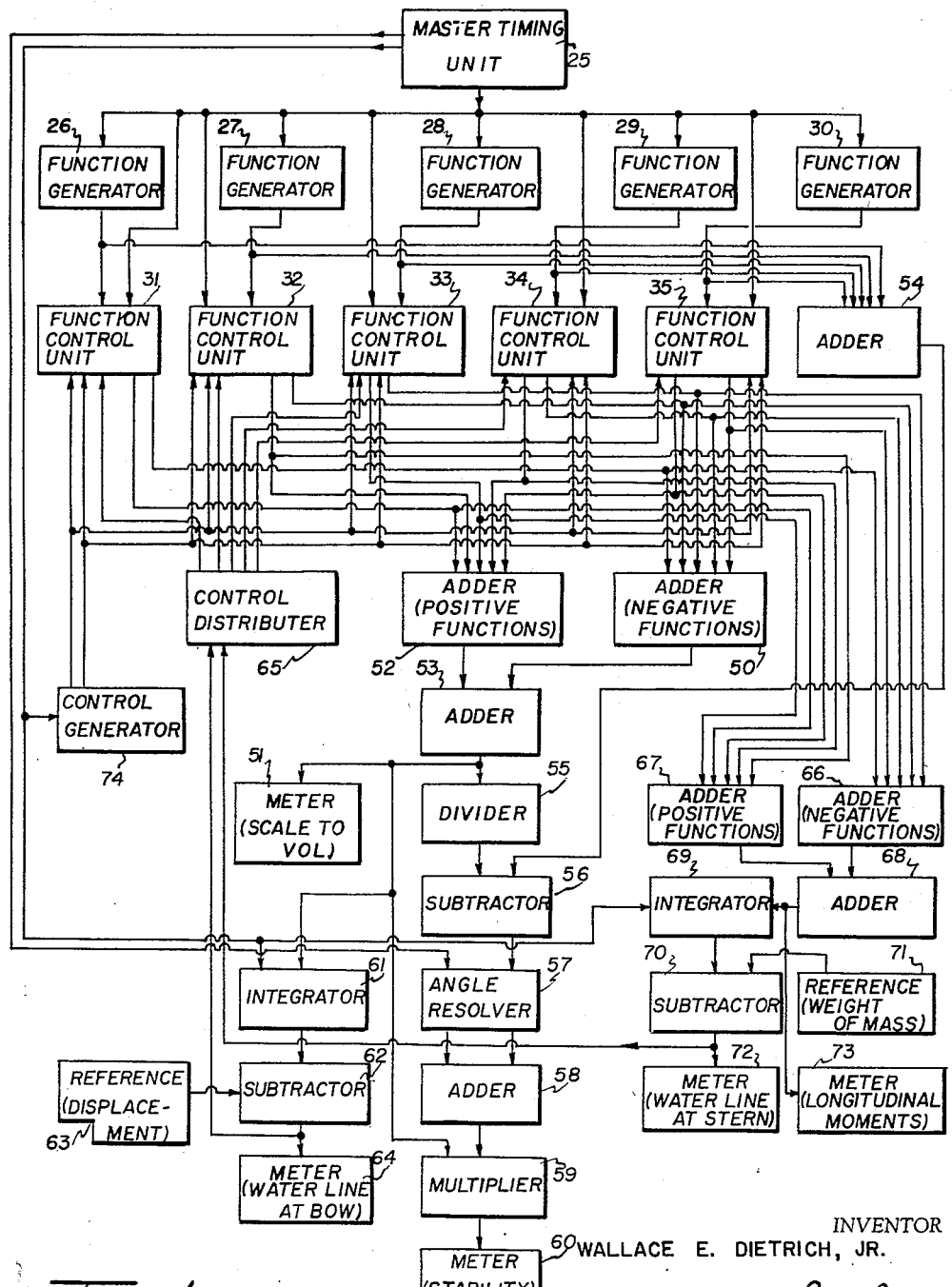

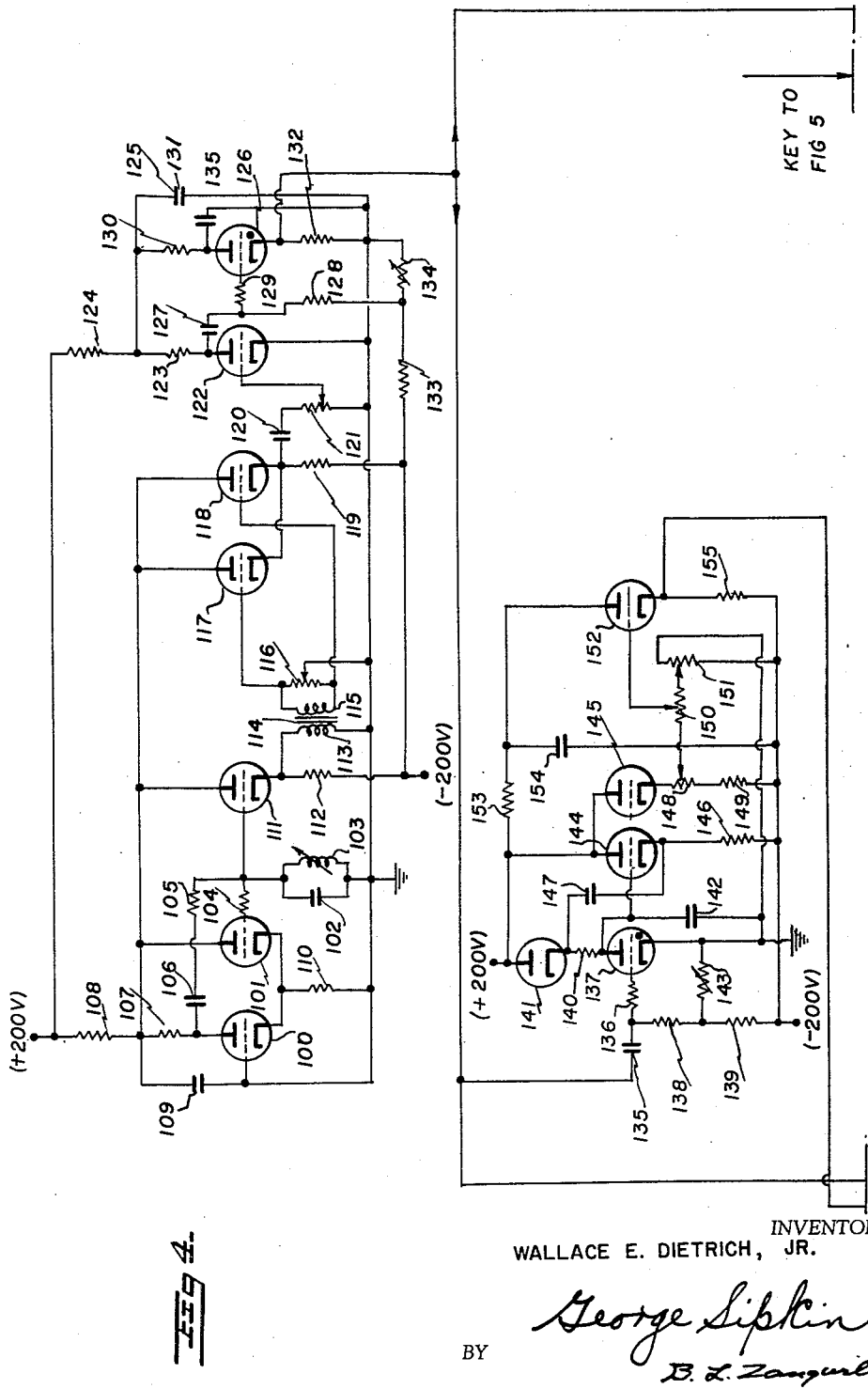

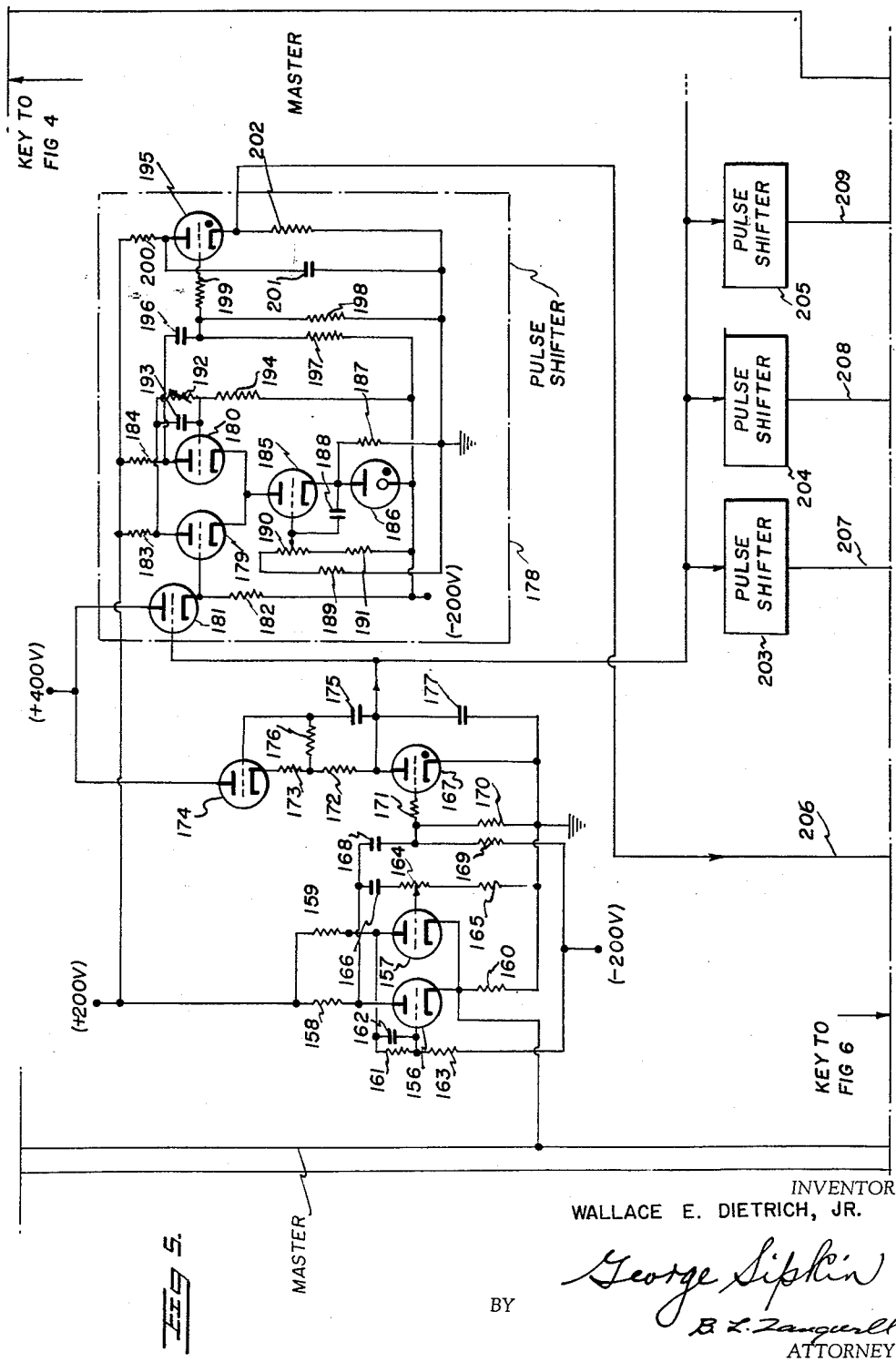

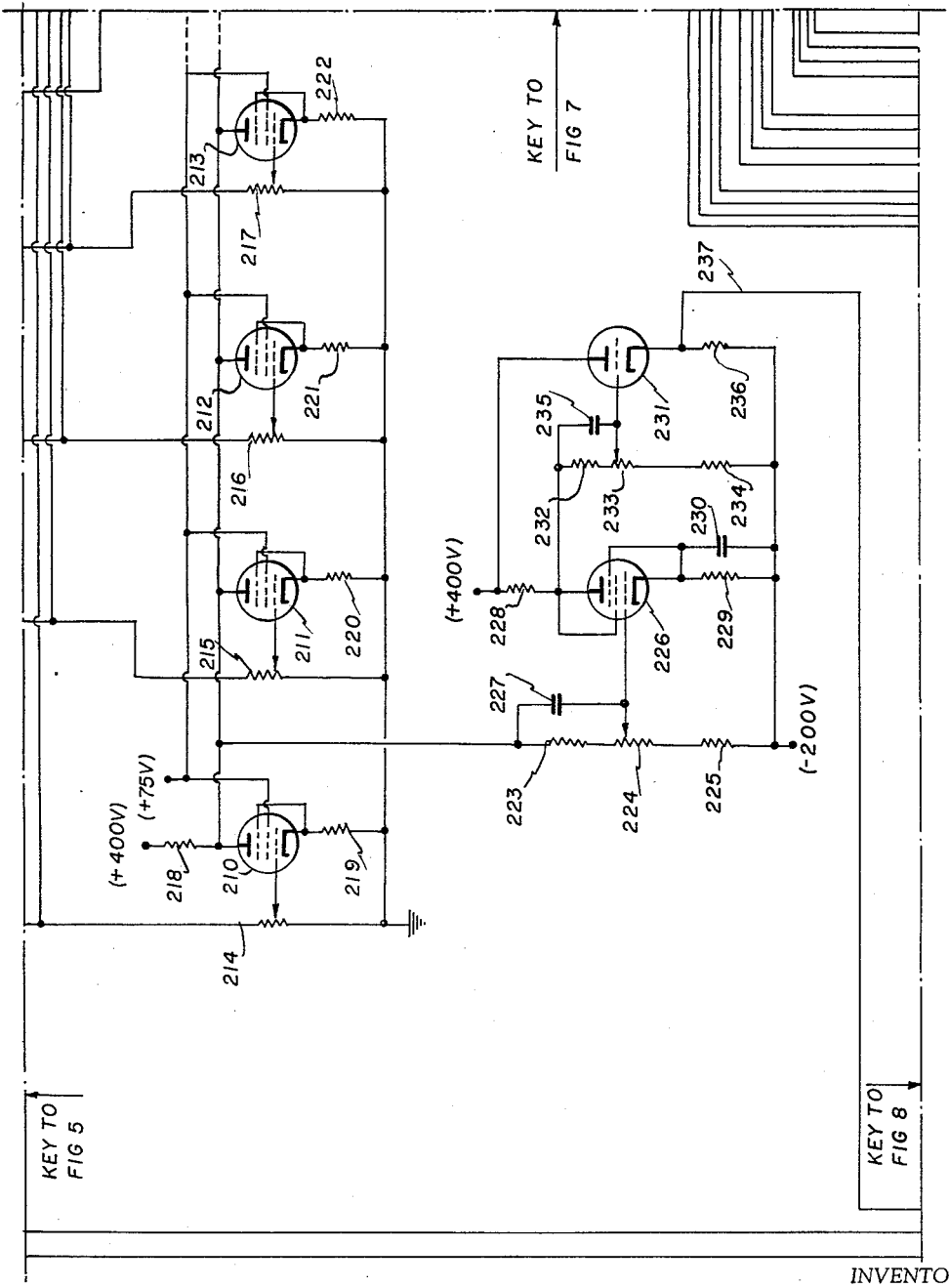

Oct. 11, 1960  W. E. DIETRICH, JR  2,955,762
REPRESENTATION AND MEASUREMENT OF
PHYSICAL ENTITIES ELECTRICALLY
Filed July 28, 1953  25 Sheets-Sheet 16

INVENTOR
WALLACE E. DIETRICH, JR.
BY George Sipkin
B. L. Zangwill
ATTORNEYS

Oct. 11, 1960 W. E. DIETRICH, JR 2,955,762
REPRESENTATION AND MEASUREMENT OF
PHYSICAL ENTITIES ELECTRICALLY
Filed July 28, 1953 25 Sheets-Sheet 20

INVENTOR
WALLACE E. DIETRICH, JR.

George Sipkin
B. L. Zangwill
BY ATTORNEYS

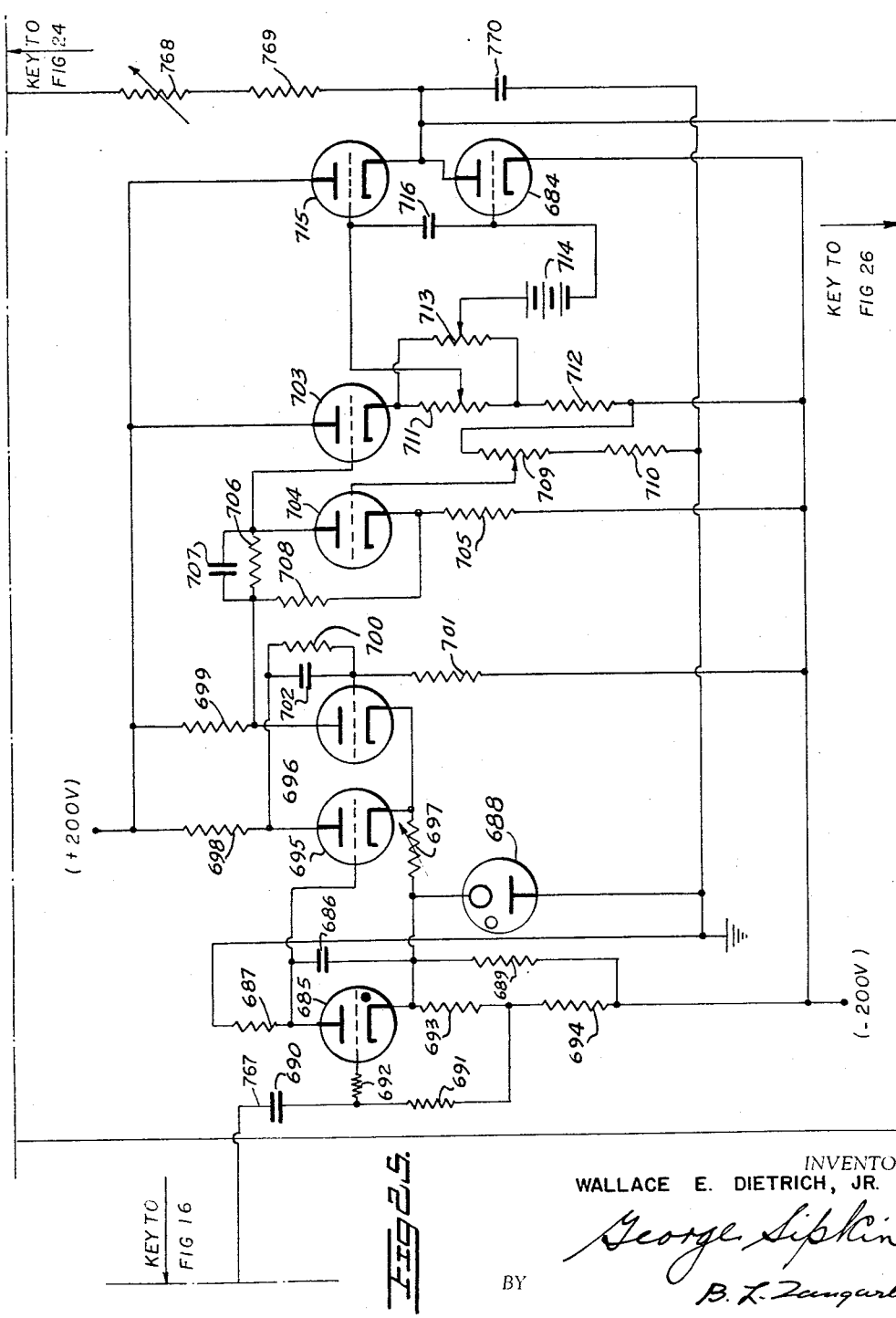

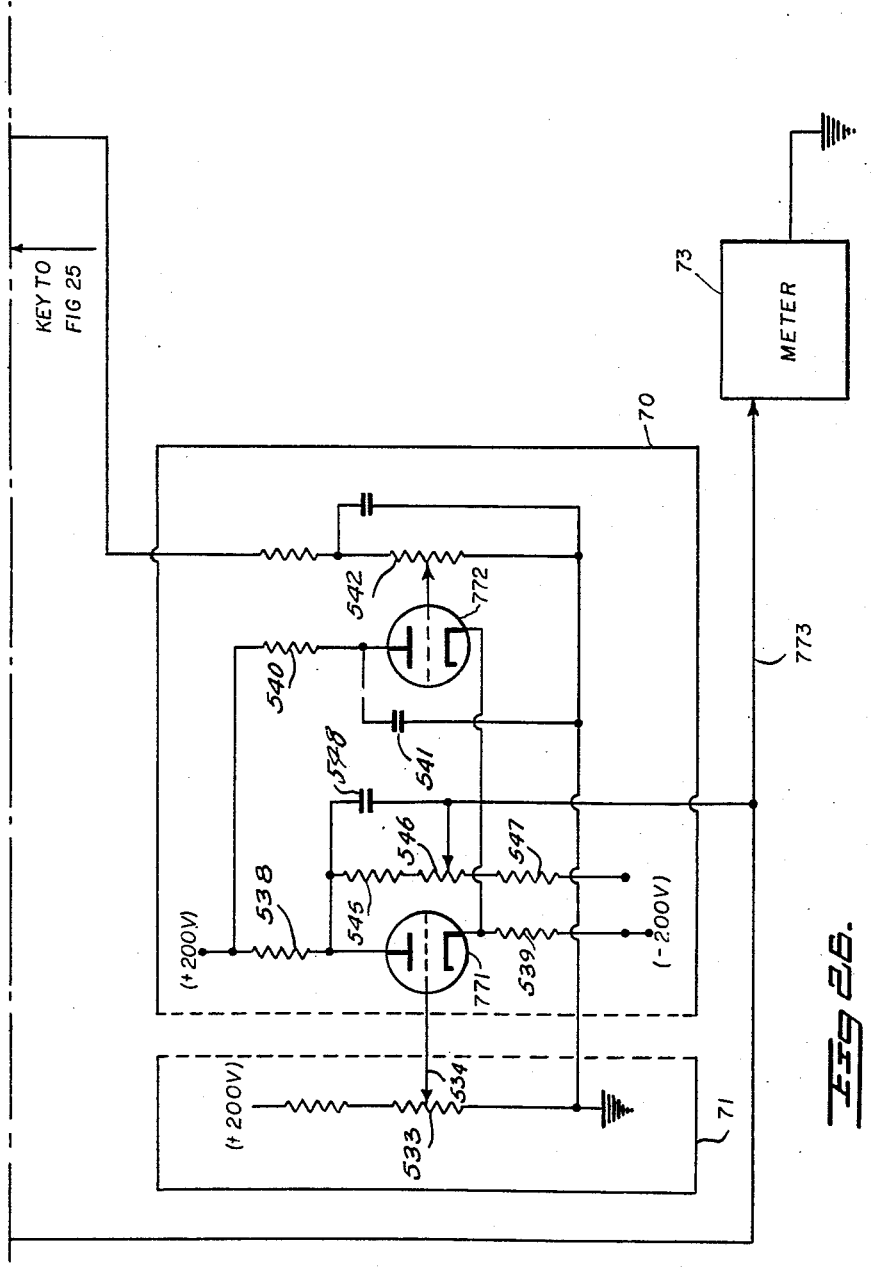

United States Patent Office 2,955,762
Patented Oct. 11, 1960

2,955,762

REPRESENTATION AND MEASUREMENT OF PHYSICAL ENTITIES ELECTRICALLY

Wallace E. Dietrich, Jr., 3800 Eastwood Drive, Baltimore 6, Md.

Filed July 28, 1953, Ser. No. 370,901

28 Claims. (Cl. 235—184)

(Granted under Title 35, U.S. Code (1952), sec. 266)

The invention described herein may be manufactured and used by or for the Government of the United States of America for governmental purposes without the payment of any royalties thereon or therefor.

This invention relates in general to computing devices, and in particular to electrical computing devices for making dynamic and rapid calculations pertaining to geometrical figures, graphical curves, and physical entities of a mechanical and electrical nature.

It is frequently desirable to determine the physical relationship or the behavior of physical objects, such as shafting, ships, electrical generators, etc., under various conditions of operation. Calculating devices for rapidly ascertaining such information are known and usually comprise mechanisms or other elements which can be adjusted or preset to simulate or represent a physical property, such as for example, inertia, displacement, size, of the object being analyzed; the mechanisms being properly set-up and associated, and then automatically operatively related to determine the information desired. This invention pertains generally to an electrical computer of this kind.

In accordance with the present invention, a calculator is provided which can be used for determining the behavior of objects under conditions that can be mathematically expressed either by a function or graphically.

The invention is in essence a form of analog computer. However, it is distinctly different from conventional forms of analog computers. In conventional analog computers the basic electrical circuit elements, inductance, capacitance and resistance, are used to represent mechanical characteristics of an actual device involving, for example, a mass, a spring and damping factors such as spring internal resistance and air friction. By the use of a plurality of these circuit elements properly selected or adjusted and connected, a complete mechanical system consisting of a plurality of mechanical devices can be simulated. The electrical behavior of the electrical combination will correspond to the mechanical behavior of the mechanical system in operation, and electrical conditions in the electrical combination will be representative of mechanical characteristics of mechanical devices in the mechanical system. By taking suitable electrical measurements, the mechanical characteristics of the mechanical system and its mechanical devices can be ascertained.

Another type of prior art analog computer employs amplifiers with resistive or capacitive feed back and capacitive or resistive inputs for performing mathematical operations such as addition, subtraction, integration and differentiation, employing servomechanisms for multiplication. This particular type is quite useful in performing mathematical operations such as solution of differential equations.

In distinction to this, a specific form of the invention does not require or involve the set-up of electrical equivalens of components of systems to be investigated; but provides electric circuits that dynamically generate a plurality of electric signals providing waveshape which represent mathematical quantities involved in a determination of the results desired. These circuits can be manipulated or otherwise correlated to produce results indicative of the behavior of actual objects under conditions represented by the mathematical quantities. In this way, the dynamic behavior of objects in motion, or undergoing stress or other conditions can be ascertained. The equipment has means which continuously repeats the signals and automatically corrects them, if necessary, at a rapid recurrence rate, until the desired equilibrium conditions in accordance with selected operating equations are obtained, and then sustains the signals representing the equilibrium conditions.

Basically, apparatus embodying the invention includes equipment that generates the electric signals as variables with respect to time. When viewed on an oscilloscope, the signals are, in effect, graphical representatives or curves on a two-coordinate plane. In a preferred embodiment the equipment has easily adjustable means for controlling the visible shape of the curves which can be made into shapes somewhat like a conic or exponential curve or can be made as a straight line or some other shape that fits a mathematical expression. The curves are visible on the oscilloscope, and through adjustments the visible curves can be made to intersect for outlining an area, if desired. The signals producing an area can conveniently be called an outline signal or the like. Obviously, the intersecting curves and the areas can be analyzed and combined; and by mathematical formulae and principles, the enclosed size, the center of gravity and other information about the areas enclosed by the curves can be gathered. Similarly, physical characteristics of irregularly shaped bodies can be interpolated by taking a plurality of cross-sectional areas at known distances apart, and applying mathematical formula and principles for correlating the information gathered about the two-dimensional cross-sectional areas into information about the three-dimensional bodies containing such cross-sectional areas.

It is, of course, known that many mathematical formulae and operations for ascertaining physical factors, characteristics and operating conditions of an object are complex, and any attempt to solve them only by human operations would take an inordinately long time, if at all possible. The preferred embodiment of the invention reduces and minimizes the need for human operations by performing complicated mathematical operations automatically and with extreme, electronic rapidity. To this end the equipment includes means for performing mathematical steps of algebraic summations, multiplication, differentiation and integration.

It is believed that the invention will be better understood when explained in connection with a particular embodiment thereof for a particular application of the invention, although it is to be distinctly understood that the invention is not so limited. The embodiment so utilized to explain the invention is one for obtaining information and data concerning physical and operating conditions of a ship's hull. Such a device is of special value in connection with ships because it permits information and data to be obtained from the "drawing board" design before huge sums are laid out for the complete construction of a ship. However, it is pointed out that even this particular embodiment has other applications.

In accordance with certain principles of the invention, the performance, including displacement, characteristics of a ship hull are determined through the use of curves representative of (a) transverse cross-sections of the hull in planes of known spacing along and perpendicular to the longitudinal axis, or vertical center line plane of the ship, and (b) the waterline at each cross-section under various riding of the ship in the water. For convenience, the hull outline cross-sectional curve, including a deck line, is also called the outline signal or signal outline, and the waterline is called the intercept or intercept signal. The hull outline curve includes curves shaped to the side of the hull at the plane of the cross-section, and a curve representative of the deck line of the ship in that plane. For simplicity, the deck line is taken to consist of one or two straight lines. When the ship is on even keel the waterline is perpendicular to the vertical centerline in the hull outline cross-sectional curve, which centerline is representative of the center vertical hull plane. This waterline will be at a distance from the apex of the outline curve that is dependent on the estimated draft, that is, the penetration of the hull section into the water. However, when the ship is not on even keel, say, when the ship is on a list, the waterline will be at an angle to the vertical centerline. From the two basic curves for each cross-section of the hull, namely the outline signal and the waterline intercept line, it is possible, by use of the invention, to determine riding factors such as hull displacement, stability and other factors indicating or predicting the riding qualities of a hull under each of the many possible operating conditions or positions in which a hull may be placed. Additionally, the preferred embodiment of the invention permits other valuable information to be obtained. By way of example, the equipment includes means for controllably changing the shape of the curves so that the possible effect of changes in a particular hull design can be explored. Similarly, information can be gained respecting the liklihood of a ship overturning and when this might occur. Data can be obtained concerning the rupturing forces operative upon various parts of the hull.

In accordance with the invention, the outline signals in the shape of a curve or waveform can be repetitively generated and observed on an oscilloscope. Controls are provided which enable the shape to be changed to correspond to a predetermined shape which can be, for example, initially placed on the screen of the scope by means of a transparent sheet of paper or the like. In accordance with the preferred embodiment of the invention, the predetermined shape is, as indicated hereinbefore, that of a selected cross-section of a hull, and several such shapes can be produced. Each signal for a shape is produced by a piece of equipment identified as a function generator; there being, preferably, a function generator for each shape or cross-section taken along the length of the hull.

Each function generator includes electric circuitry which yields the ultimate signal therefor. This circuitry includes circuit-means, such as an adder, for algebraic steps, and circuit-means for calculus operations, such as an integration circuit. Such integration apparatus may be, for example, the conventional circuit-combination of resistance and capacitance with an adjustable time-constant.

The signals of all of the function generators are synchronized and controlled by a master timer having a timing means in the form of a master timing oscillator. For synchronizing the signals the master timer has circuitry providing short master pulses repeating at a desired frequency, typically of 100 pulses per second. For controlling the signals, the master timer provides a sequence of groups of control pulses that are applied to a plurality of conductors or lines which are connected to each function generator for producing a signal. Through operation of the adder circuit and the integration apparatus, the groups of control pulses are converted to the desired waveform electric signals having waveforms which when plotted against time reproduce the selected hull shape. Typically, for master pulses of 100 per second, the groups of control pulses also occur at a corresponding frequency, there being 100 groups of control pulses per second, each group consisting of 10 equally-spaced control pulses, each pulse having a duration of 0.9 millisecond.

The invention also includes a signal used for computation purposes. This signal can be generated in any convenient apparatus, but preferably is included in the master timer and has a sawtooth waveform.

In the preferred embodiment, the function generators and the master timer cooperate to provide the waveform signals having waveforms or shapes which when plotted against time correspond to the cross-sectional shapes of the hull at selected points along its length. More specifically, at each function generator, the series of signal control pulses provided by the master timer are combined in suitable amplitude by means of the adder of the function generator and are integrated by the integration circuit of the function generator to obtain an exponential curve which duplicates the desired hull cross-section shape or a part thereof. By adjustment of the pulse amplitudes and the time constant of integration of the integration apparatus or means of the function generator, it is possible to generate a signal corresponding to any practical ship cross-section shape. Thus it is possible to duplicate shapes or cross-sections employed at all portions of the hull, from the high narrow cross-section of the bow to the wide, almost rectangular, shape of the amidships region and ultimately to the high, almost parabolic shapes usually found near the stern. These latter stern shapes, which have a keel or starting point higher than the main keel line of the vessel, can be produced by using for that section zero amplitude for the first few signal control pulses in the repetitive groups that are applied to the adder, so that the waveforms start later than the waveforms for the sections nearer the middle of the ship. To complete the hull cross-sectional shape, curves indicative of the deck line are also added in the function generator. These approximately straight line and function curves are produced in an appropriate timed relation for outlining on the receiving oscilloscope a completed outline that is geometrically similar to a ship's cross-sectional area, and the sectional outline can be electrically integrated for ascertaining its area.

For ship calculations, it is desirable to have the waterline or intercept cross the sectional outline signal at a suitable position dependent on the depth of penetration and at any desired list of the hull in water. The waterlines are produced, in the preferred embodiment, by a plurality of function control units, there being one function control unit for each function generator and hence each hull cross-section.

After the signal outline, the deck line and the waterline intercepts are produced, the preferred embodiment of the invention suitably analyzes and combines the resulting shapes as functions, and provides utilizable information dependent upon the functions by performing mathematical operations which are chosen to provide the solution sought. For ship calculations, the equipment includes means comprising the aforesaid adders and other means for adding positive functions and for adding negative functions, subtractors, multipliers, meters, angle resolvers and other similar means for representing quantities or factors and performing mathematical operations upon them to yield the solution of equations or formulae representative of the physical properties or characteristics sought to be ascertained.

Accordingly, it is an object of the present invention to provide a computer apparatus capable of rapid calculation of problems involving complex mathematical operations.

It is another object of the present invention to provide a computer apparatus capable of rapid calculation of problems involving displacement of fluid by a body immersed therein.

Another object of the present invention is to provide a computer device for determining ship hull displacement under various conditions of list, pitch, loading or combinations thereof.

Another object of the present invention is to provide a computer device for determining the stability factor of a ship hull under various conditions of list, pitch, loading, or combinations thereof.

Another object of the present invention is to provide a self-correcting ship hull computer which automatically selects a hull waterline to obtain a selected displacement.

Another object of the present invention is to provide a self-corrective ship hull computer which automatically adjusts the fore and aft attitude (pitch) of the hull to obtain a balance between the longitudinal moments of weight and displacement.

It is a primary object of the invention to provide a calculator for rapidly indicating the expectable performance of a predetermined or an assumed ship's hull.

Another object of the present invention is to provide a computer wherein the quantities to be studied are represented by electrical signals of controllable waveforms that can be obtained without time consuming mathematical computations.

Other and further features, objects and innovations of the present invention will become apparent upon a careful consideration of the following description and the accompanying drawings wherein:

Fig. 1 is a view showing in block form apparatus embodying features of the present invention.

Fig. 2 is a view illustrating a longitudinal elevational outline of a typical ship hull.

Figs. 2–A, 2–B, 2–C, 2–D and 2–E are views illustrating cross-sectional outlines at various places along the length of the hull. These drawings are not intended to illustrate full and accurate hull cross-sections, but are typical outline shapes of cross-sections of the portion of the hull that is or could be wetted by water under various conditions of list.

Fig. 3 illustrates various geometrical relationships present in the cross-section of a ship hull, particularly those present under conditions of list.

Figs. 4–18 taken together constitute a schematic circuit diagram of basic apparatus constructed in accordance with the teachings of the present invention. The individual figures are "keyed" by suitably marked arrows to permit assembly thereof into a complete schematic circuit diagram including all apparatus connections and interconnections. In these Figures 4–18;

Fig. 4 shows details of the master timing oscillator and a sawtooth generator and shows part of the apparatus located in a master timing unit 25 of Fig. 1.

Fig. 5 shows details of pulse shifting apparatus completing, with Fig. 4, the apparatus located in block 25 of Fig. 1.

Fig. 6 is a schematic diagram showing components of a part of a function generator 26 of Fig. 1, specifically the "adder" portion thereof.

Figure 7:
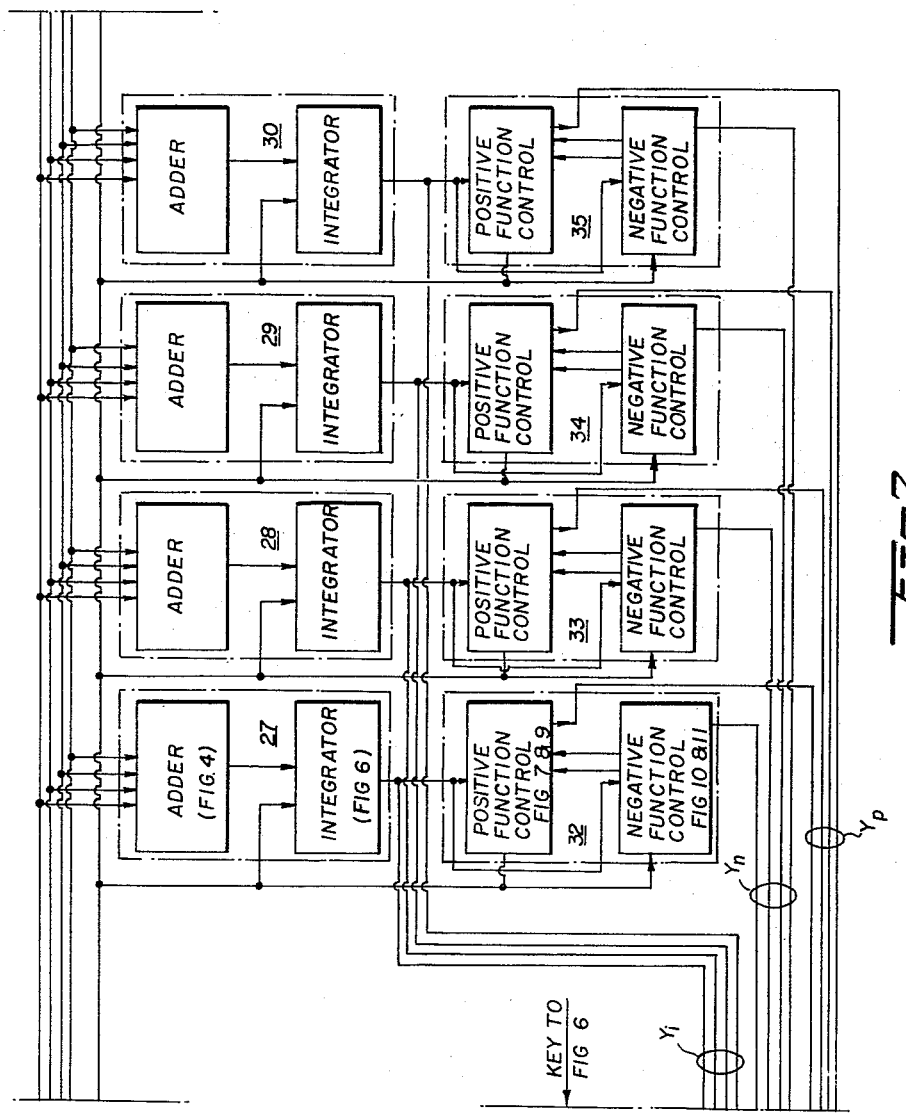

Fig. 7 is a block diagram of sub-blocks within the function generators 27, 28, 29, 30 and function control units 32, 33, 34 and 35 of Fig. 1 showing all connections thereof to other portions of the basic apparatus. Apparatus similar to the adder of Fig. 6 is located in each sub-block in Fig. 7 marked adder.

Figure 8:
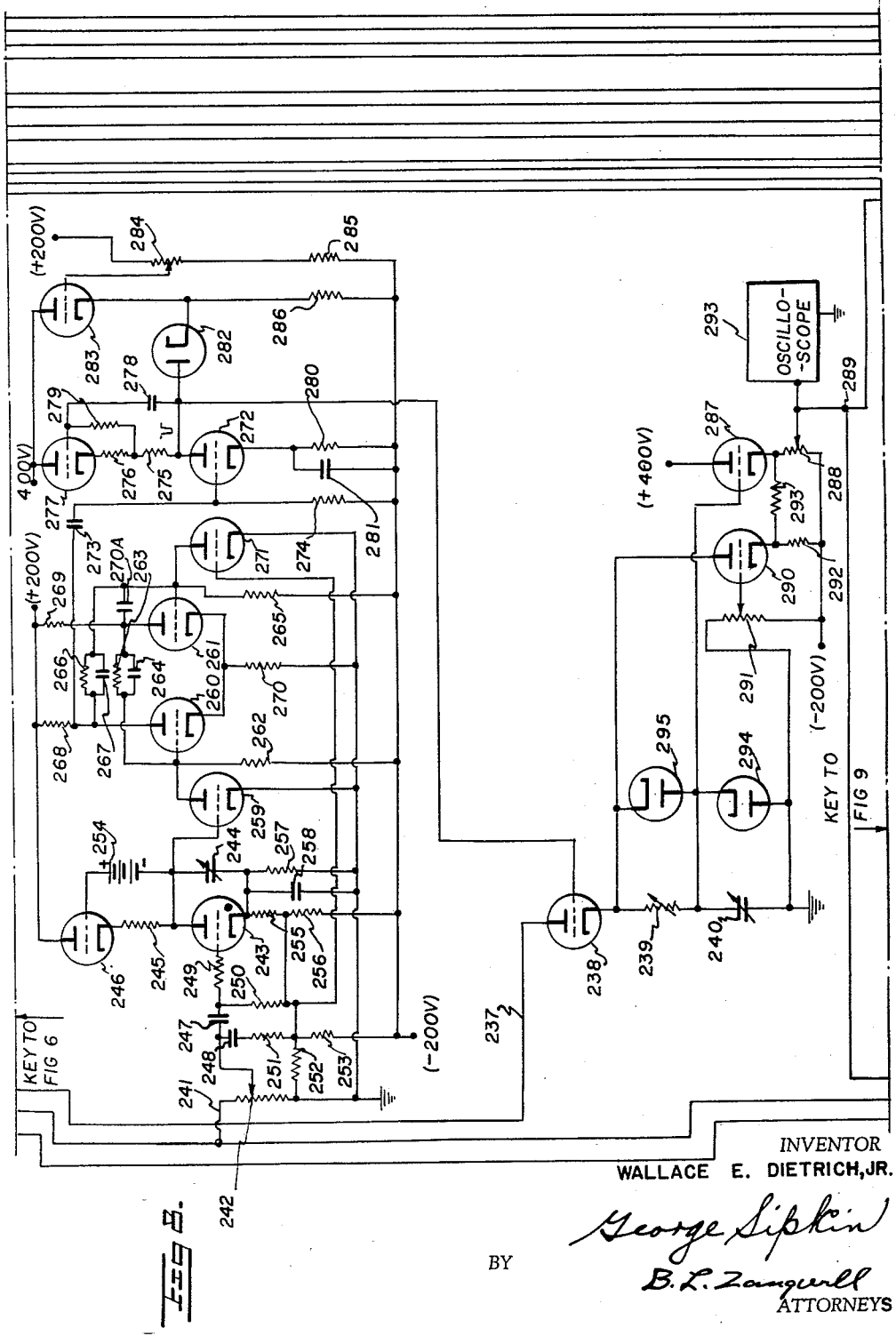

Fig. 8 is a schematic diagram showing integrator apparatus completing the function generator unit 26. Apparatus similar to the integrator of Fig. 8 is located in each sub-block in Fig. 7 marked integrator.

Figure 9:
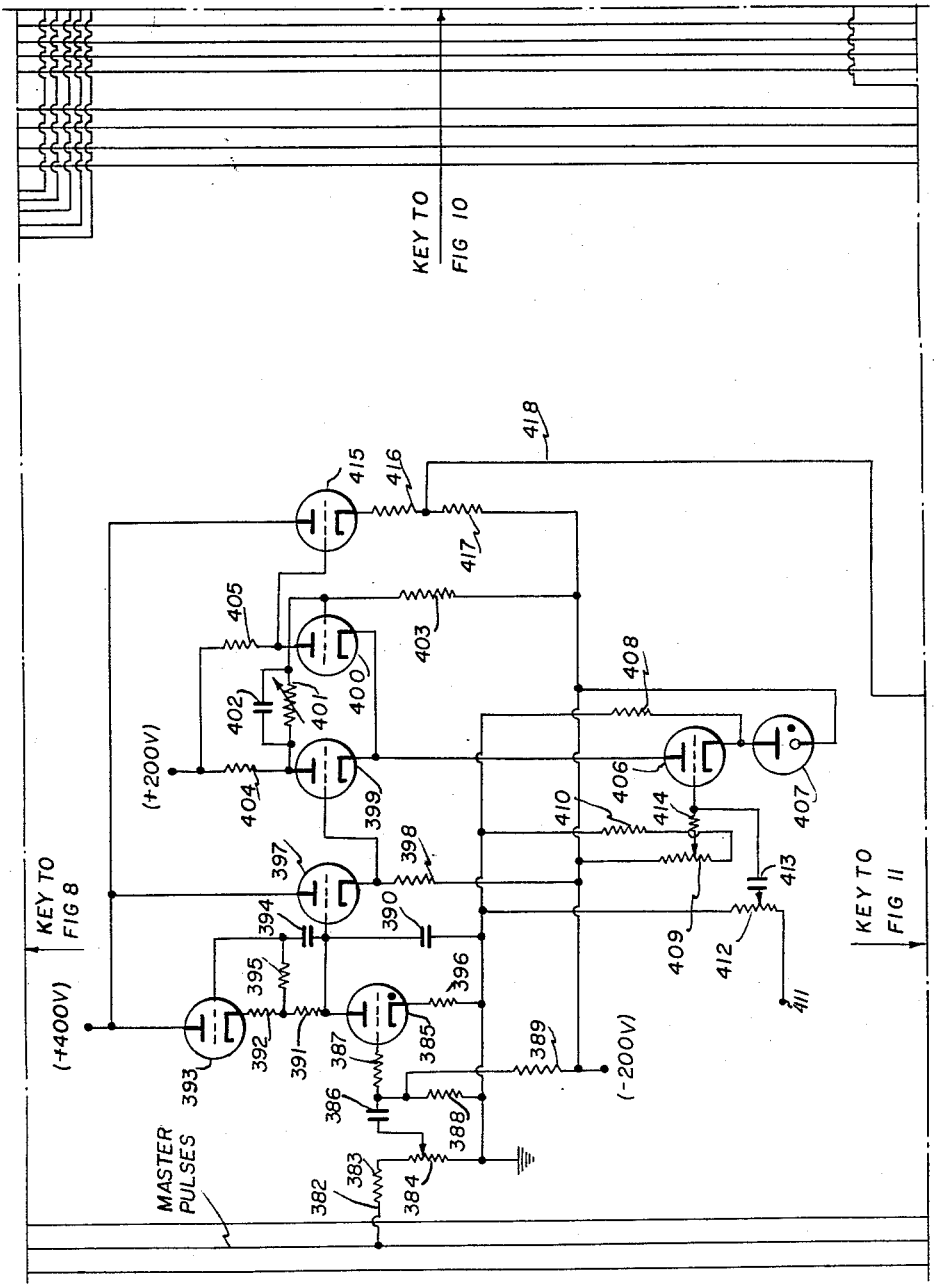

Fig. 9 is a schematic diagram of part of the apparatus of a function control unit 31 of Fig. 1.

Figure 10:
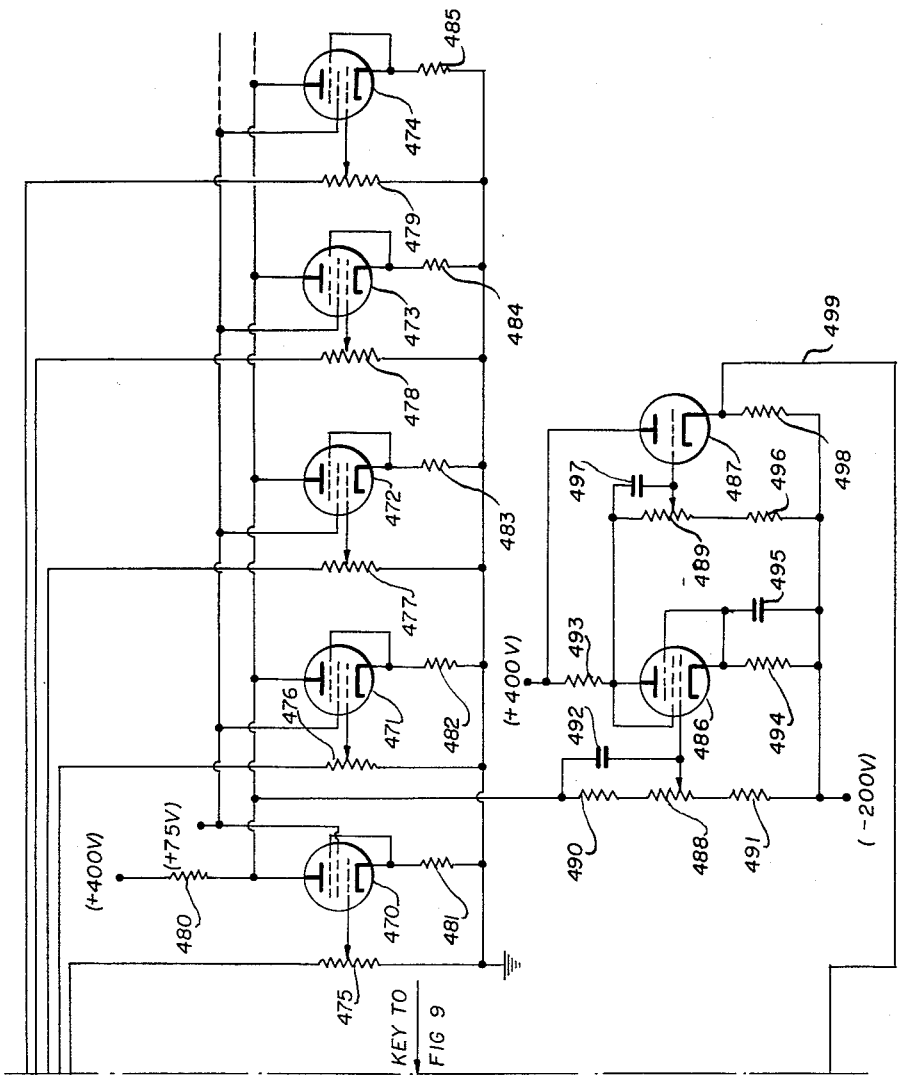

Fig. 10 is a schematic diagram of an adder 54 of Fig. 1.

Figure 11:
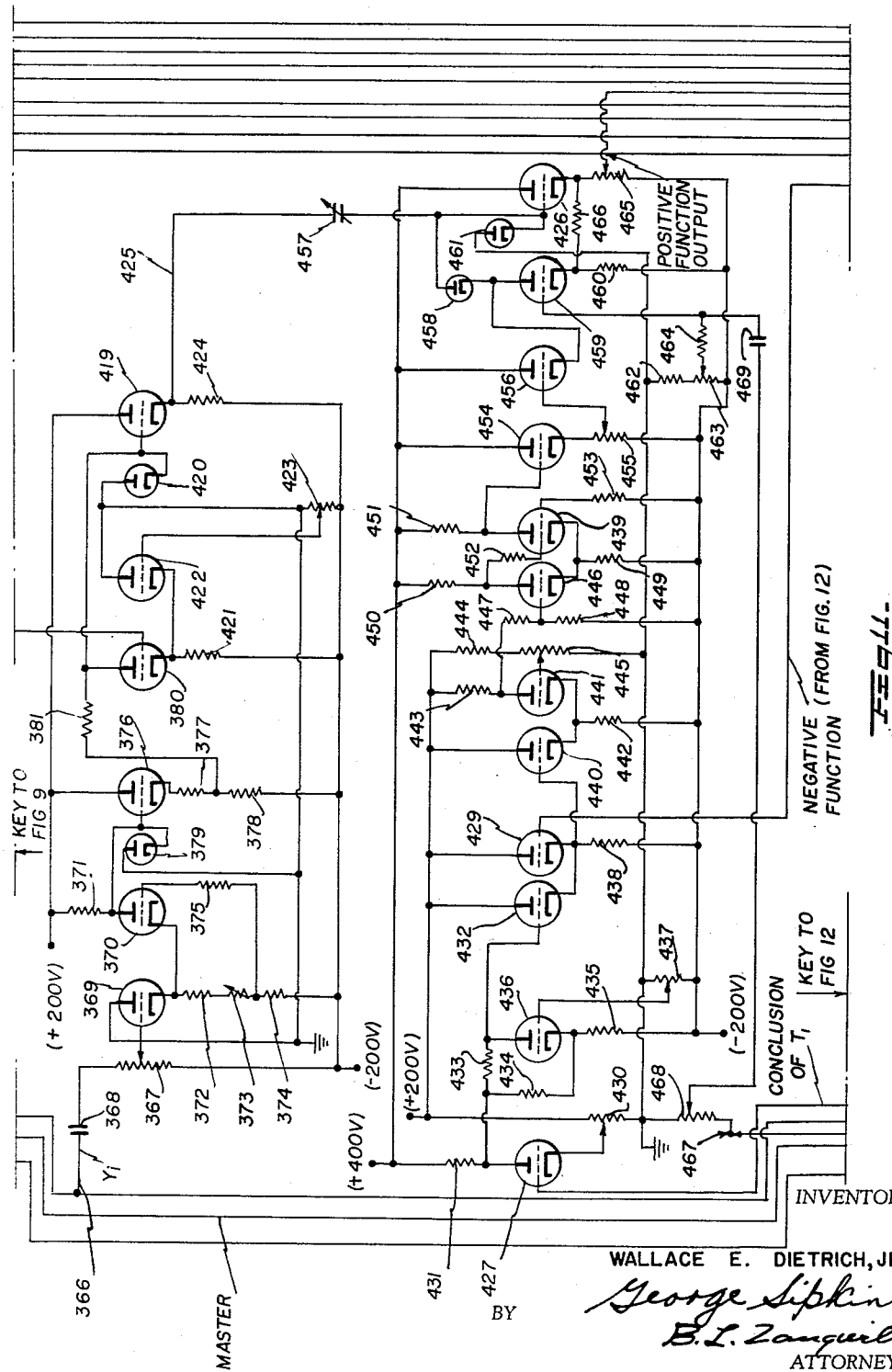

Fig. 11 is a schematic diagram of a second part of the apparatus of function control unit 31 of Fig. 1. Apparatus similar to Fig. 10 taken together with the apparatus of Fig. 9 is located in each sub-block labeled positive function control in Fig. 7.

Figure 12:
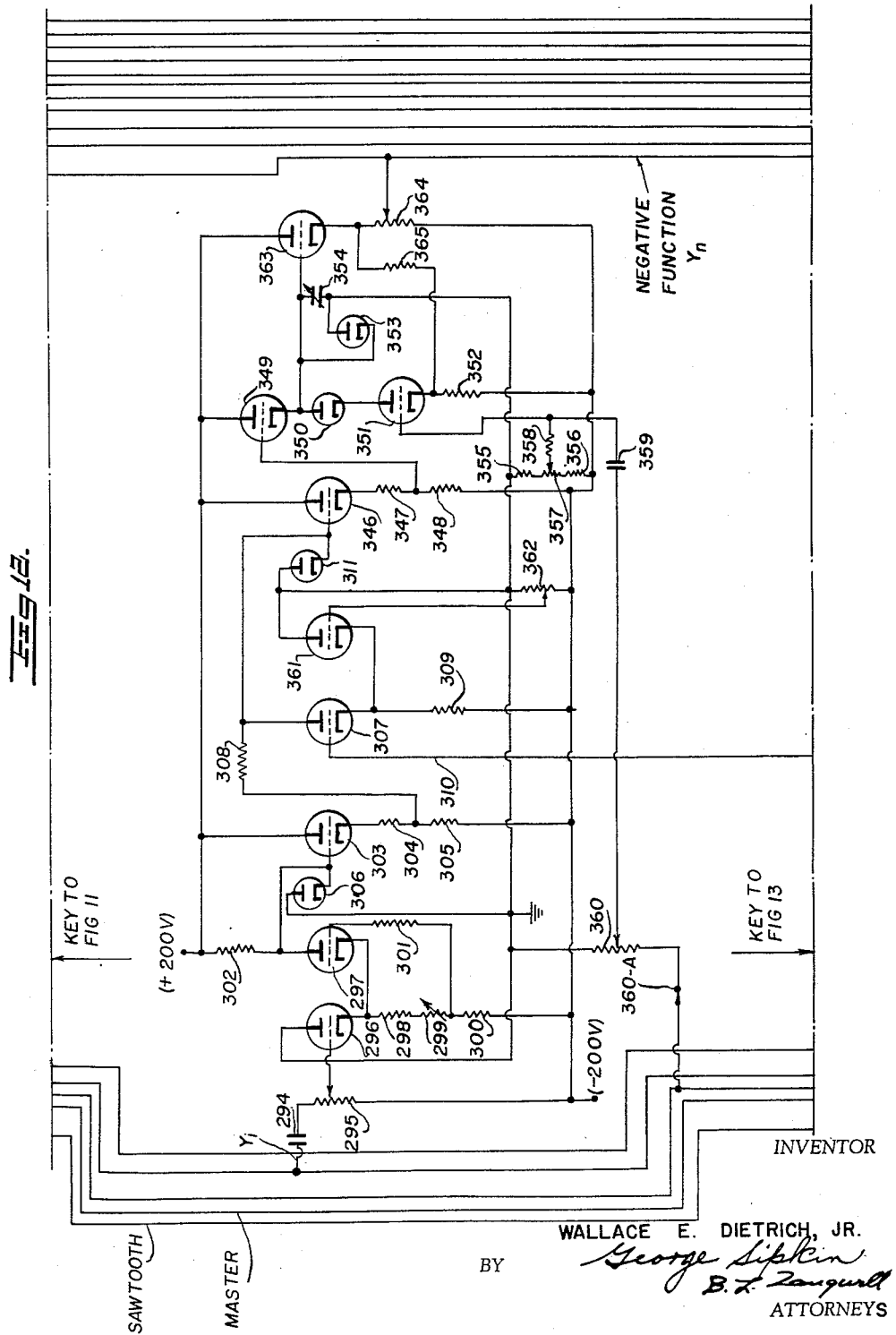

Fig. 12 is a schematic diagram of a third part of the apparatus of function control unit 31 of Fig. 1.

Figure 13:
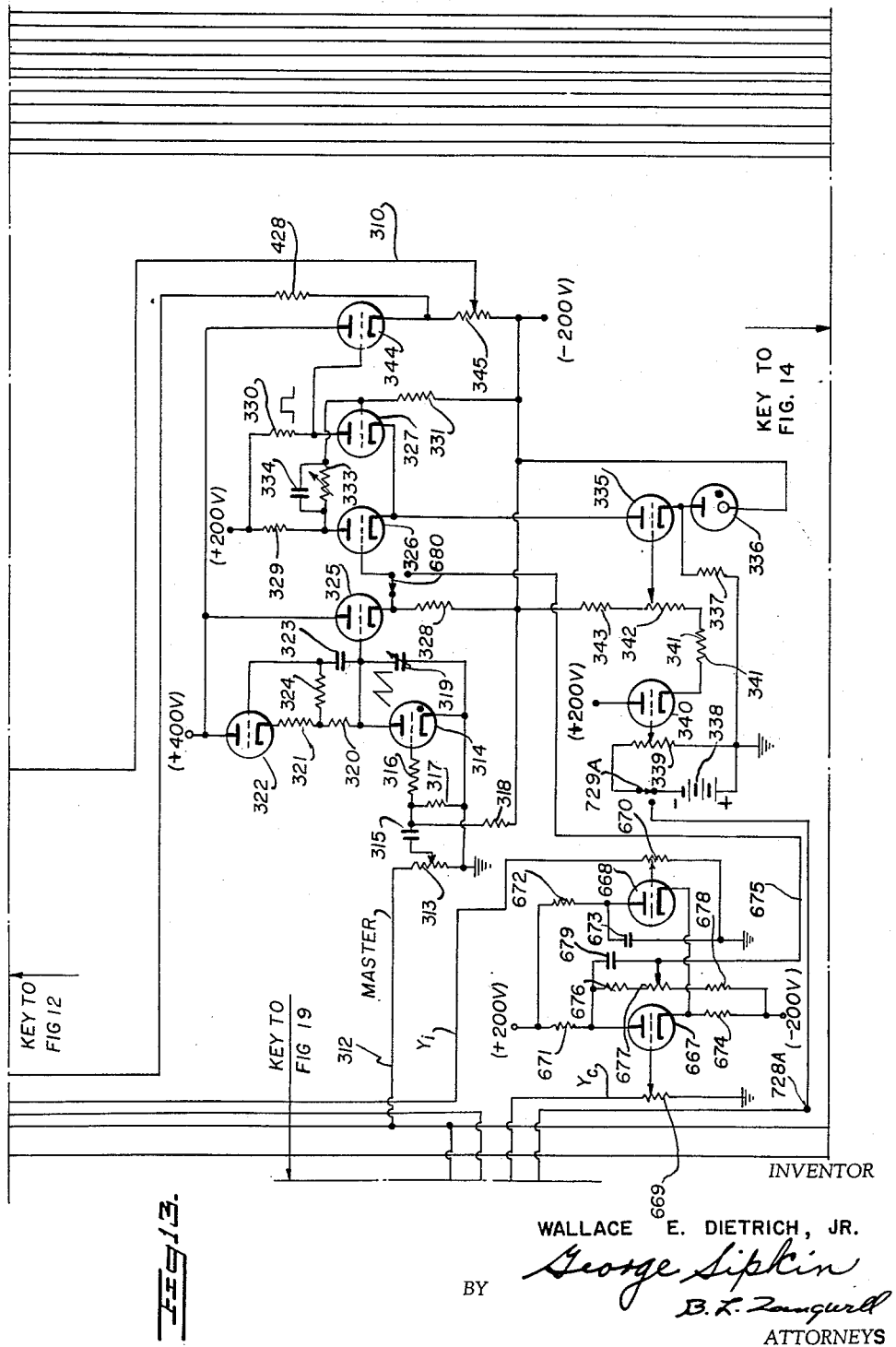

Fig. 13 is a schematic diagram of the fourth and final part of the apparatus of function control unit 31 of Fig. 1. Apparatus similar to this Fig. 13 together with the apparatus of Fig. 12 is located in each sub-block labeled negative function control in Fig. 1.

Figure 14:
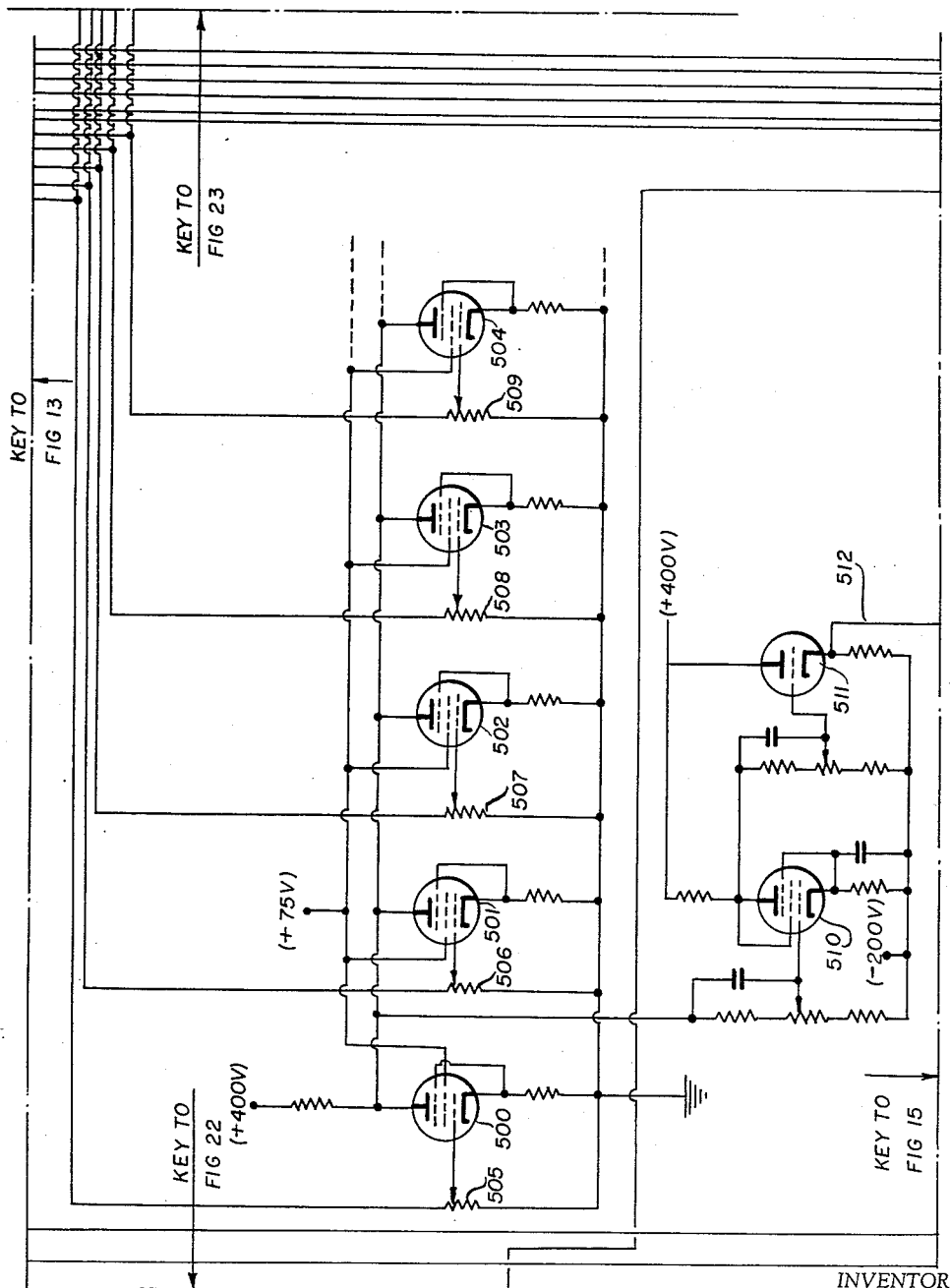

Fig. 14 is a schematic diagram of an adder 50 of Fig. 1.

Figure 15:
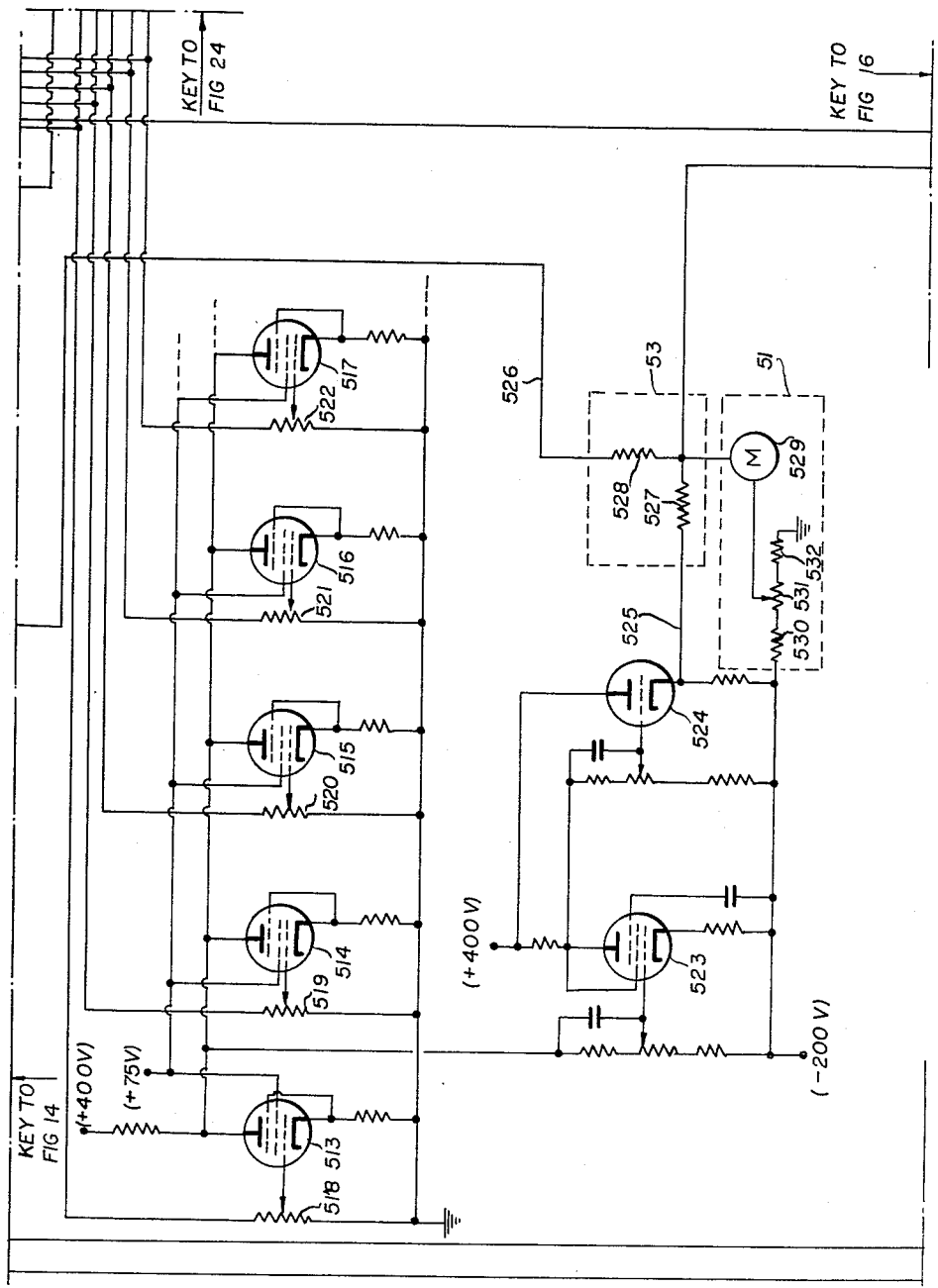

Fig. 15 is a schematic diagram of an adder 52, adder 53 and meter 51 of Fig. 1.

Figure 16:
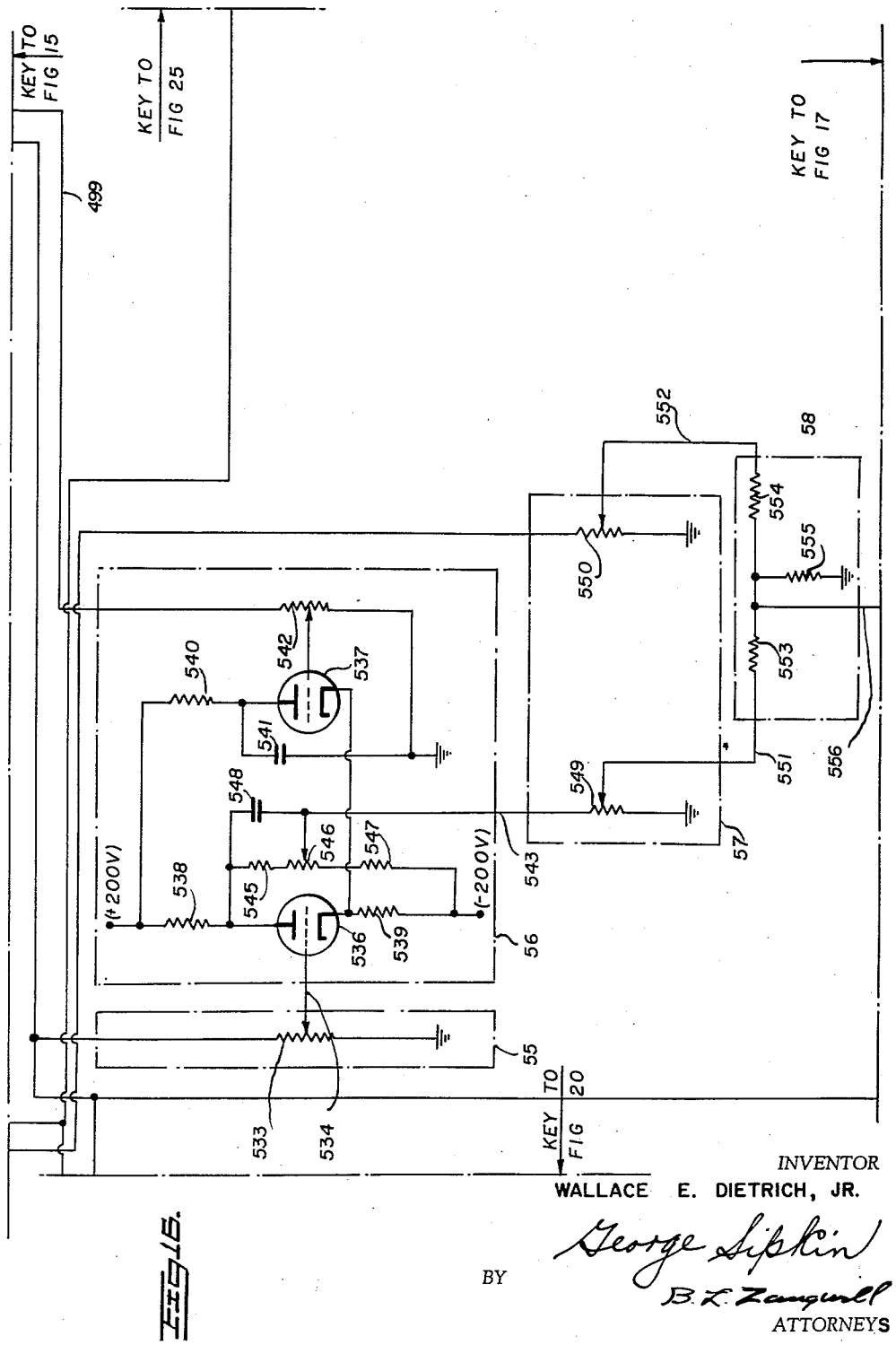

Fig. 16 is a schematic diagram of a subtractor 56, angle resolver 57 and 58 of Fig. 1.

Figure 17:
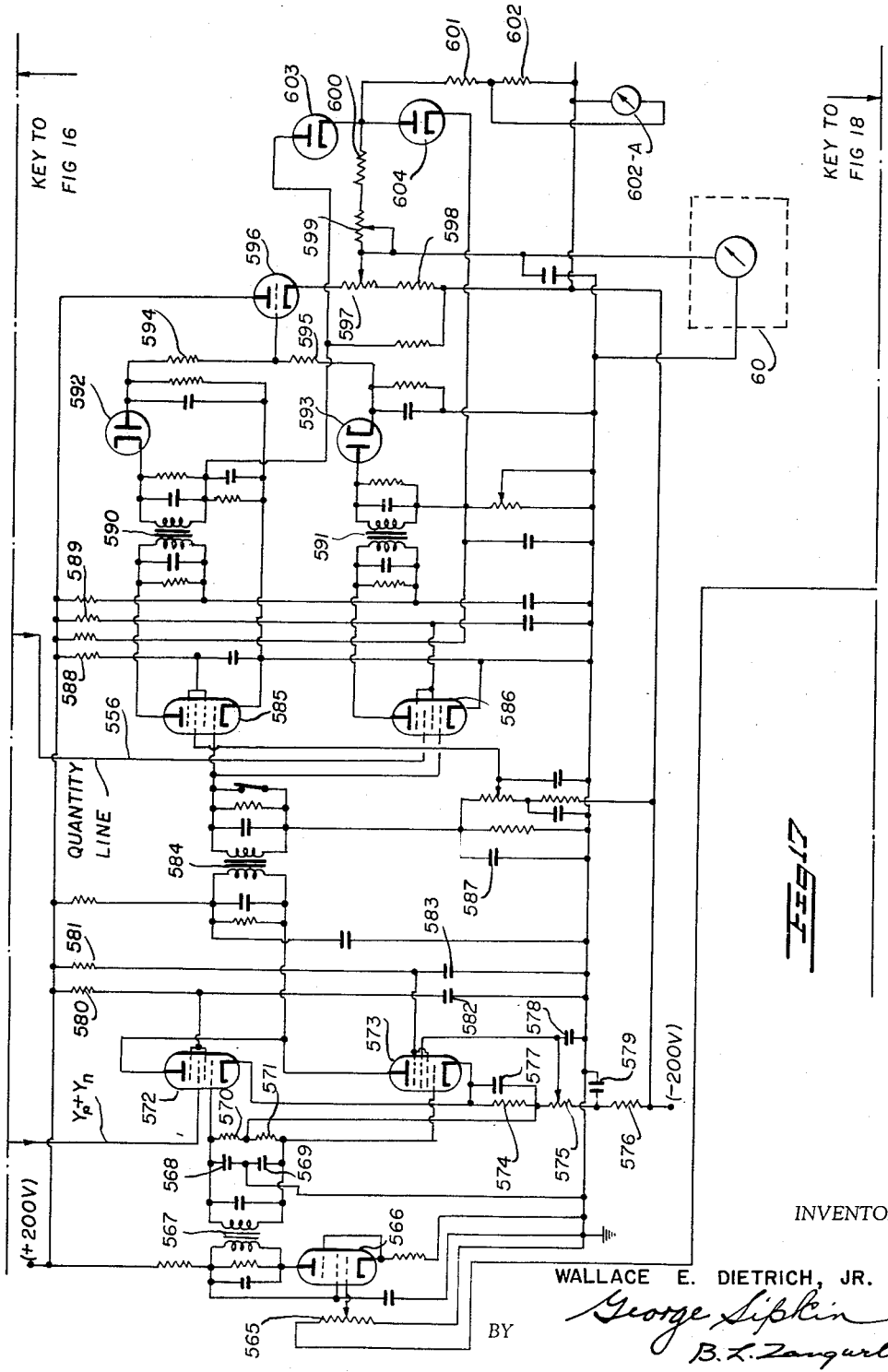

Fig. 17 is a schematic diagram of a part of a multiplier 59 and the meter 60 of Fig. 1.

Figure 18:
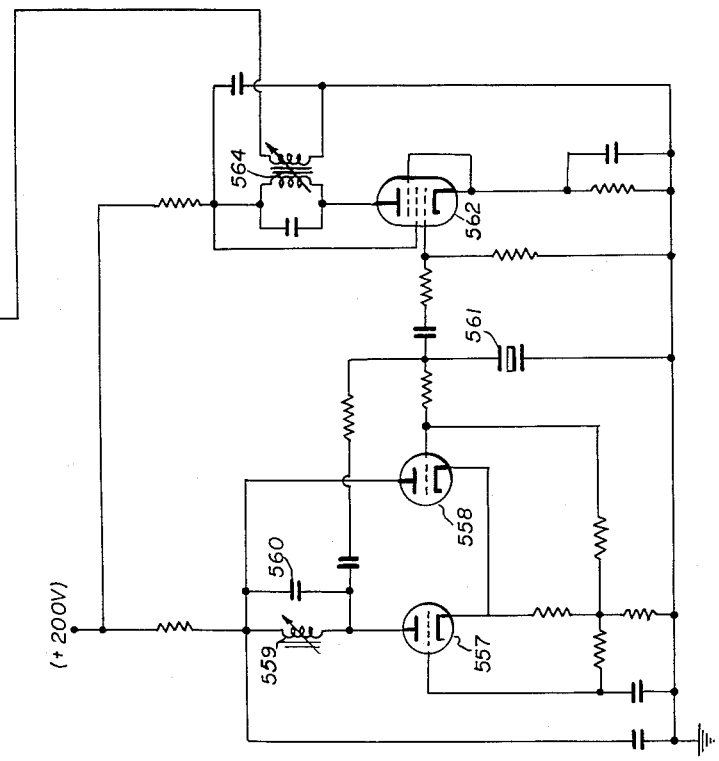

Fig. 18 is a schematic diagram of the final part of the multiplier 59 of Fig. 1.

Figure 19:
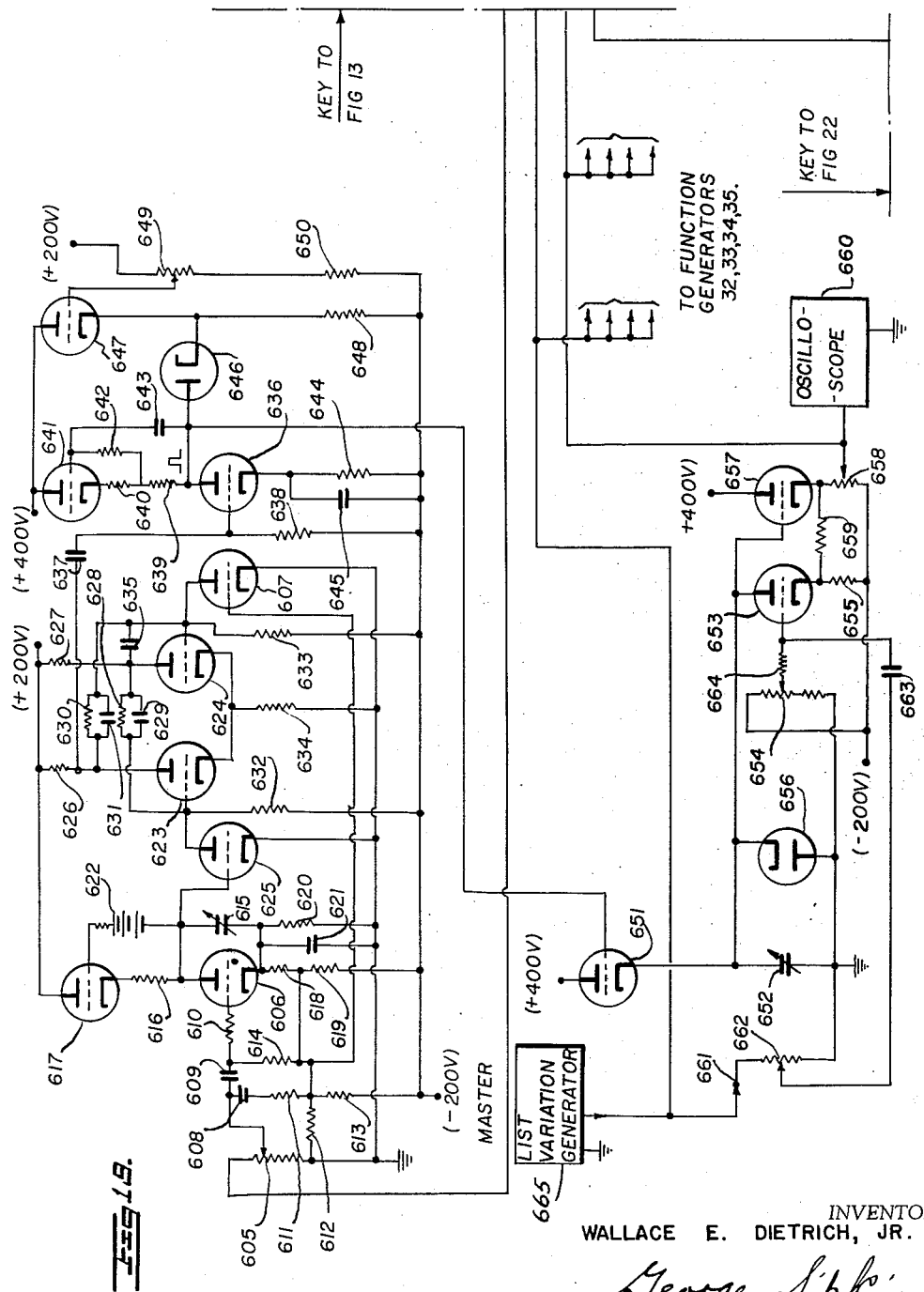

Figs. 19–26 taken together constitute a schematic circuit diagram of additions to the apparatus of Figs. 4–18 inserted to extend the utility of the basic circuitry. Here, as before, "keys" of marked arrows are included to permit assembly of the various figures to provide a complete schematic circuit diagram. The connections of the additional devices to the apparatus of Figs. 4–18 are not completely made in order to avoid excessive complexity, however the interconnections are clearly indicated. In these Figures 19–26:

Fig. 19 is a schematic diagram of the control generator 74 of Fig. 1.

Figure 20:
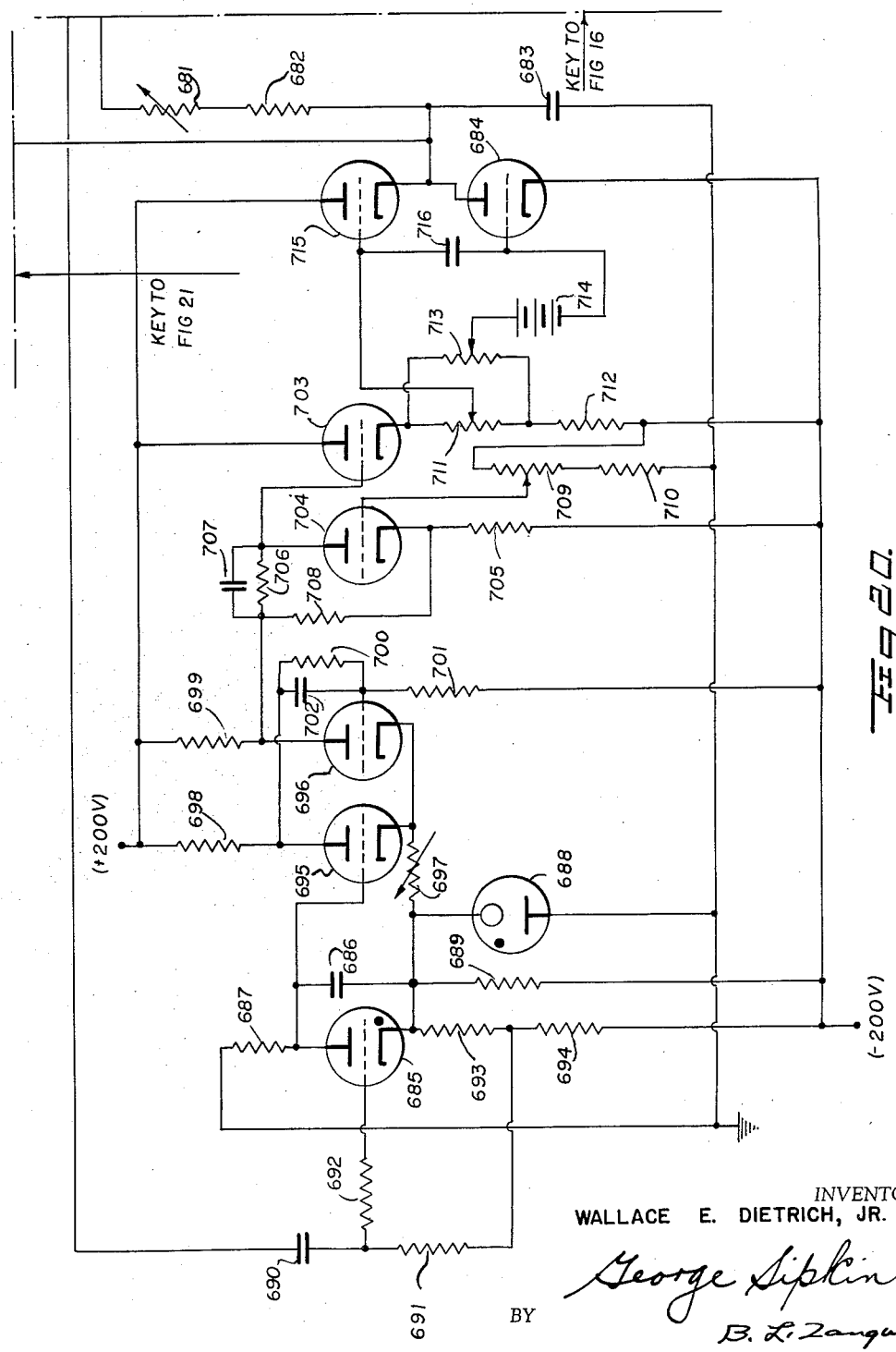

Fig. 20 is a schematic diagram showing details of a waveform integrator 61 of Fig. 1.

Figure 21:
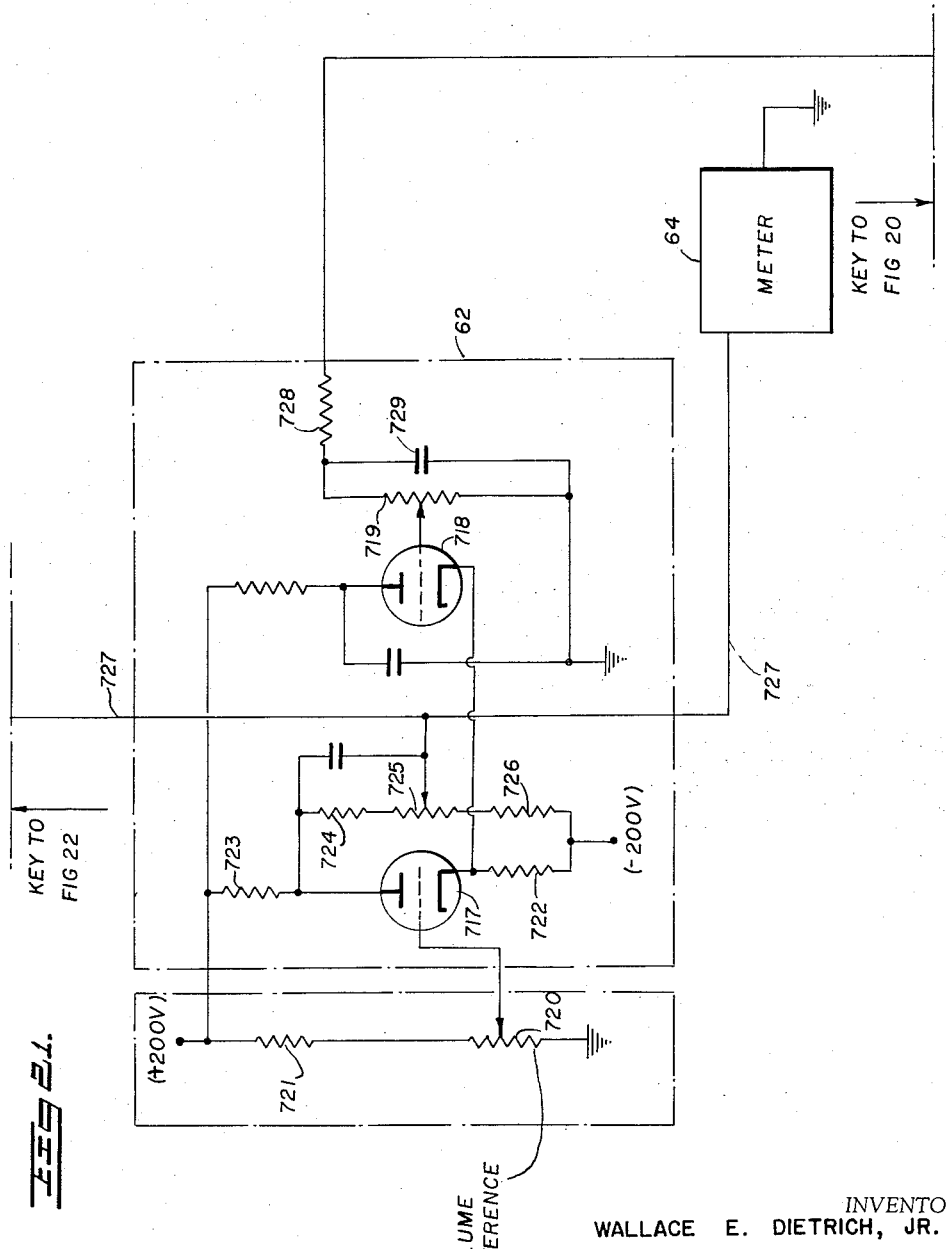

Fig. 21 is a schematic diagram showing details of a subtractor 62, reference 63 and meter 64 of Fig. 1.

Figure 22:
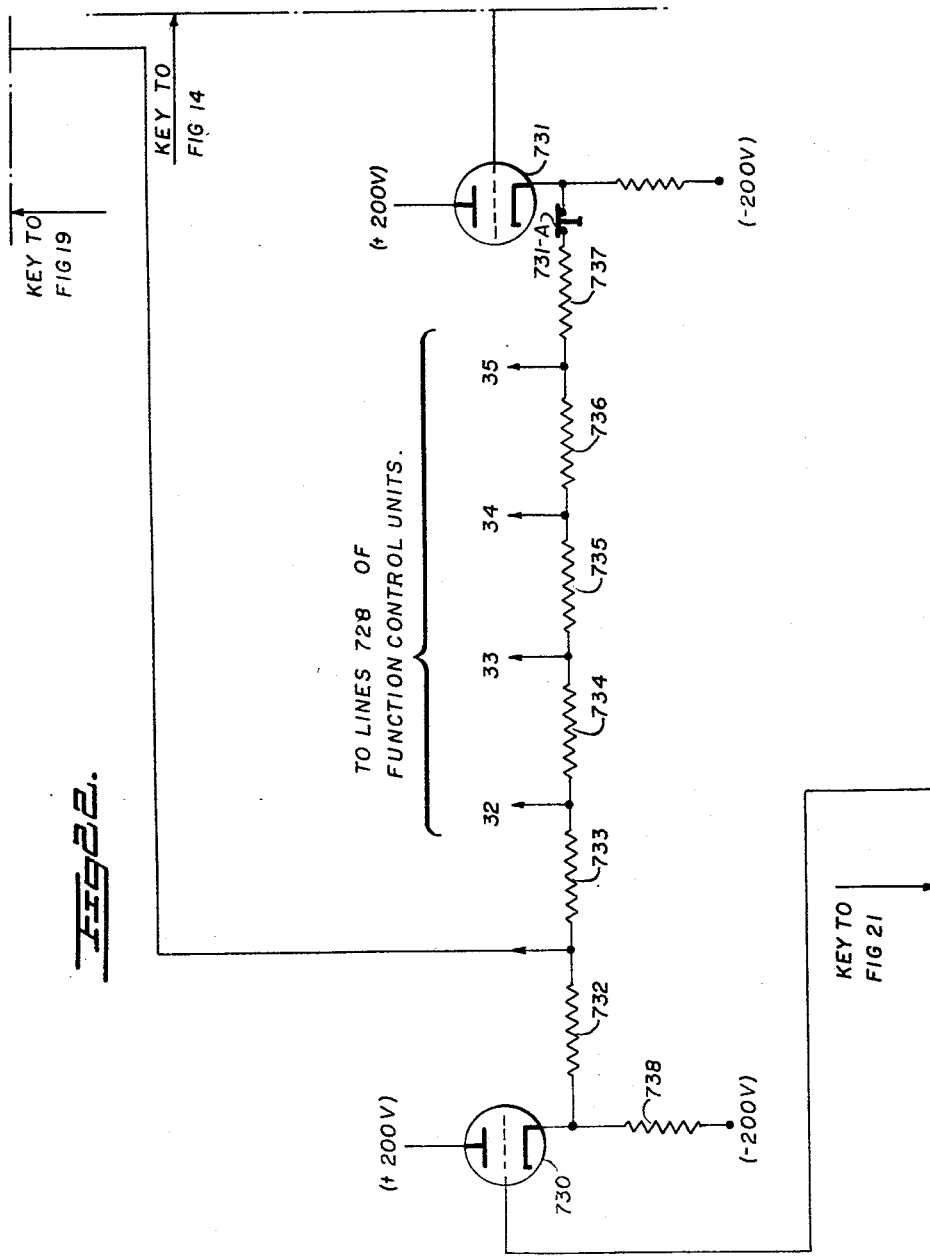

Fig. 22 is a schematic diagram of a control distributor 65 of Fig. 1.

Figure 23:
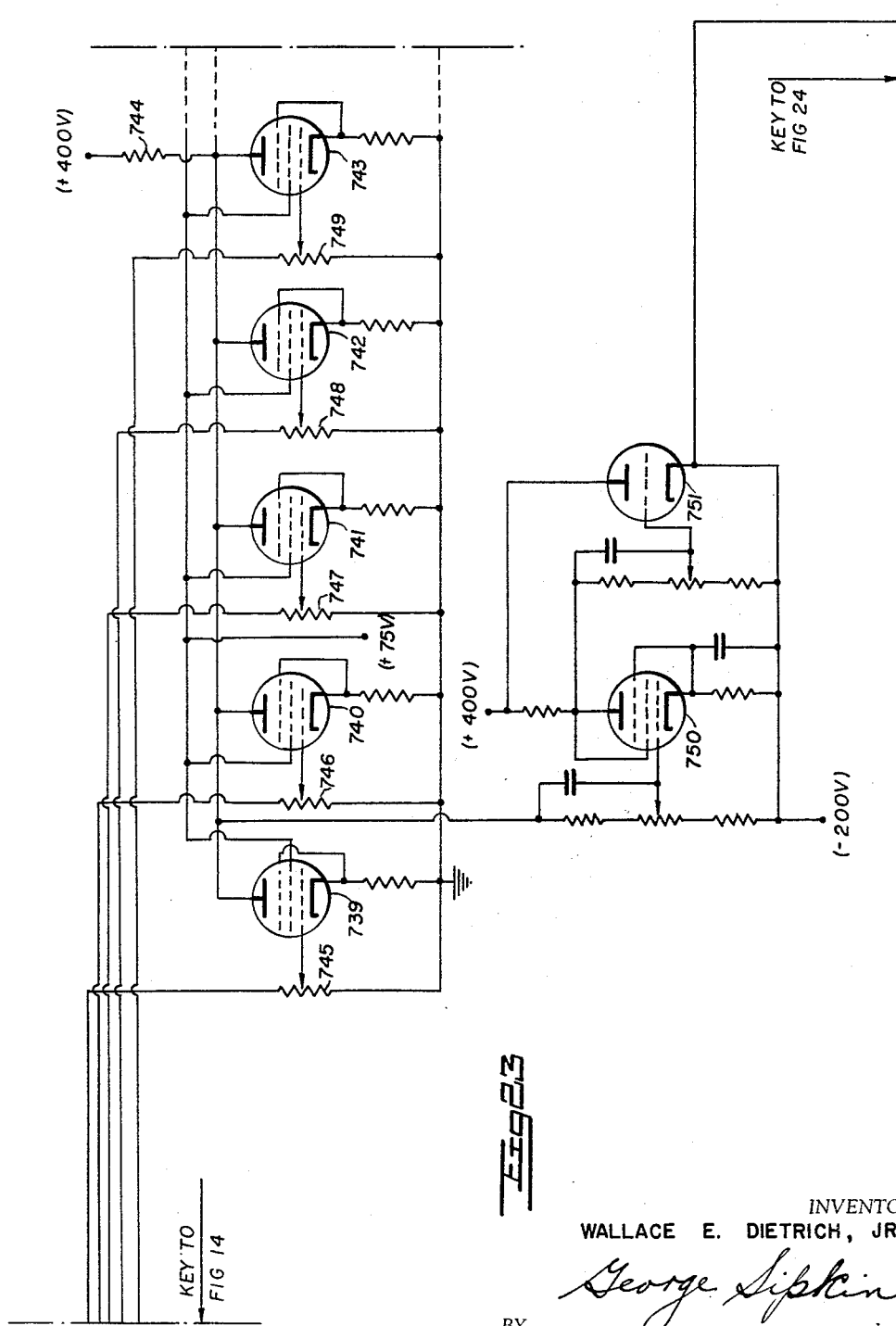

Fig. 23 shows details of an adder 66 of Fig. 1.

Figure 24:
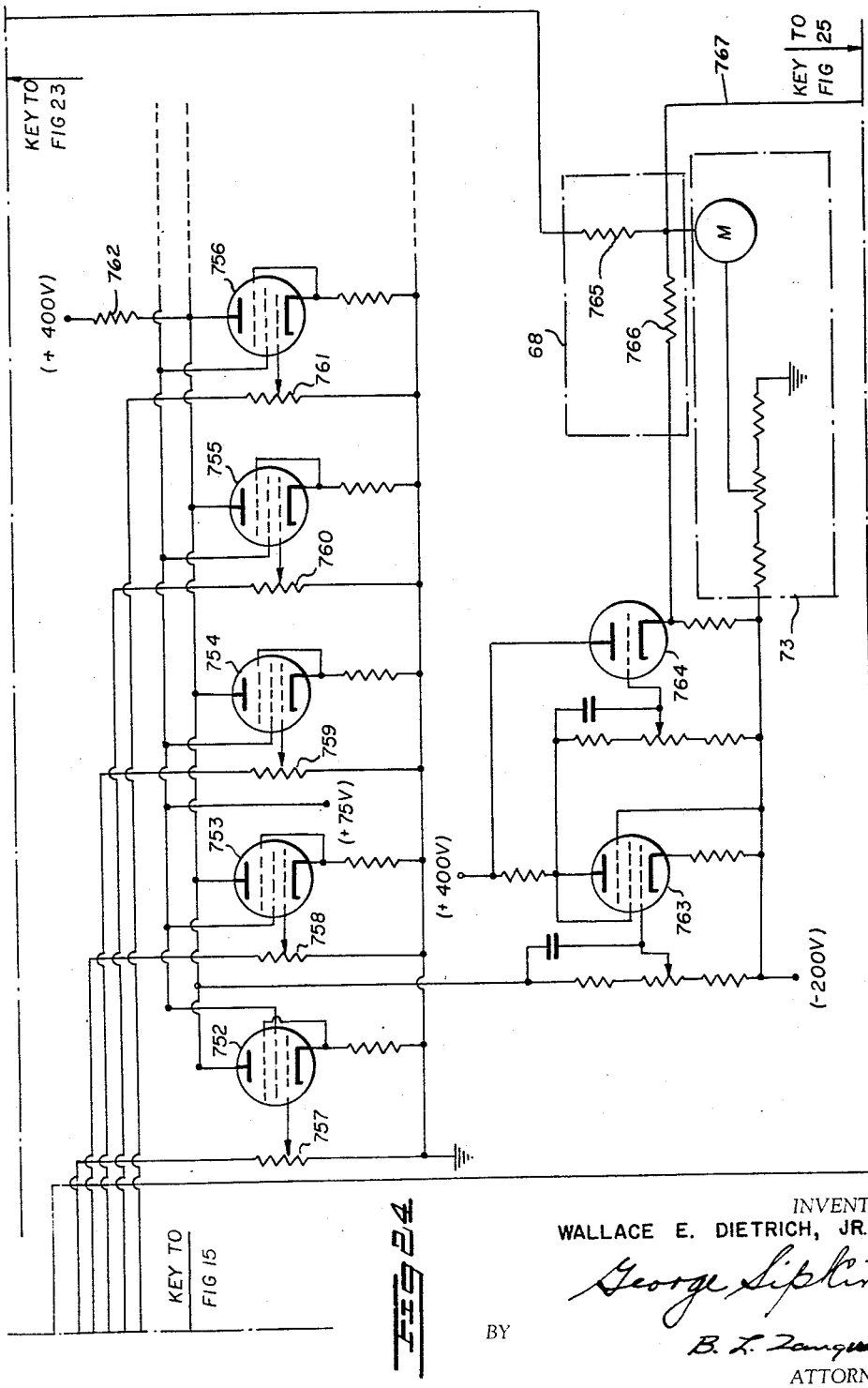

Fig. 24 shows details of an adder 67, adder 68, and meter 73 of Fig. 1.

Fig. 25 shows details of an integrator 69 of Fig. 1.

Fig. 26 shows details of a subtractor 70, reference 71 and meter 73 of Fig. 1.

In accordance with the invention, the equipment provided is intended to produce curves and signal outlines of different shapes and to make mathematical calculations involving such curves and outlines; and, as aforesaid, broad basic aspects of the invention will be understood from a description of the operation of the equipment as utilized for calculations concerning ships. The complexity of the problem can be more fully appreciated from a consideration of Figs. 2, 2A through 2E and 3.

Fig. 2 is an arbitrary outline, in elevation, of a ship's hull, and Figs. 2A, 2B, 2C, 2D and 2E are cross-sectional outlines of the hull in planes of known spacing along the hull, indicated by the vertical lines of Fig. 2 aligned with the lines of Figs. 2A–2E. The latter lines lie in the vertical centerline plane of the hull; Fig. 2A representing the cross-sectional outline of the hull near its bow and Fig. 2E the cross-section outline near the stern. In accordance with the invention, it is possible rapidly and automatically to ascertain riding and other characteristics of the hull from such outlines. To this end it is necessary to set up the mathematical factors, dependent on the outlines, which influence and determine the characteristics. Such preliminary processing can be indicated with reference to Fig. 3 of a typical hull cross-sectional outline.

In Fig. 3, the hull outline is represented by the closed curve FGHOF. Curves FG and GH are representative of the deck line and assumed to be straight lines. Curves FO and HO represent the symmetrical sides of the ship. OG is the vertical centerline and bisects the outline. For mathematical analysis, the line OG can be considered as a y-axis or the ordinate axis; and a line perpendicular thereto, passing through the point O, can be considered as the x-axis or the abscissal axis; the point O being the origin for measurements, and also representative of the keel of the ship. As will appear later these axes may be represented electrically on an oscilloscope, where the y-axis is represented in terms of time and the x-axis in terms of voltage or current. The x-axis represents voltage, being positive to the right of axis OG and negative to the left.

Applied to the hull outline is a waterline JK. The waterline is, of course, normally horizontal, so that in Fig. 3 the axes are really twisted through an angle $\theta$ which the waterline makes with the x-axis; and this angle represents the list of the hull in the water. Obviously this angle will be zero when the hull is on even keel. The waterline JK intersects curve or hull side FO at L; intersects the vertical centerline GO at M; and intersects curve or hull side HO at N. Obviously, the closed curve LONML represents the portion of the hull outline that is under water and is composed of two areas LOML and ONMO which can be added together to give the area of the cross-section of the hull that is under water for a list $\theta$.

If a plurality of cross-sectional outline areas are taken along the length of the hull in a systematic, known way, and the waterlines represented thereon, then the volume of the hull under water, that is its displacement, can be calculated or represented. For example, the area of LONML multiplied by the length of the hull having substantially the shape of the outline of Fig. 3 will give a result very close to the actual displacement of that length of the hull. Generally, a plurality of equally spaced cross-sections can be used for satisfactory results concerning displacement and other riding characteristics of the hull for a list $\theta$ on each hull section having a center of buoyancy at point S.

Another important determination to be made about a listing hull, such as that having the cross-section shown in Fig. 3, is that of the stability factor, or righting arm, which is a function of the position of the center of buoyancy of the section. This determination of the location of the center of buoyancy is necessary in order to ascertain the position of the center of buoyancy relative to the center of gravity of the hull during any expected list to determine at what angle of heel the ship will roll over. The stability factor may be expressed as the horizontal distance in some convenient unit of measurement (such as feet) between the center of buoyancy of the section and a line drawn perpendicular to the waterline and including the keel of the ship. These quantities have been placed in Fig. 3, the keel being represented by point O, the line through the keel or point O and perpendicular to the waterline JK being represented by the line OR, and the center of buoyancy being represented by point S. The righting arm or stability factor is then directly proportional to the perpendicular distance between the line OR and point S, this distance being represented by the line ST.

The following derivation is useful to determine the position of the stability factor. It is useful to note that the moments of buoyancy about the center of buoyancy are equal. Calculation may be facilitated by the use of the two perpendicular axes (x) and (y), the latter axis obviously corresponding to the vertical longitudinal plane through the center of the hull, including the keel, and the former axis passing through the keel; and by assuming a unit length of hull having the outline of the hull at the axes. With the coordinates x and y thus disposed, as indicated in Fig. 3, the distance of the point S from the x-axis is the line S–41 which is the same as the line 42–O, and may be expressed as $$\frac{M_x}{V}$$

where $M_x$ is the moment of the force-component paralleling the x-axis arising from a unit length of hull along the x-axis having the outline shown in Fig. 3, and acting clockwise about the z-axis (perpendicular to the x and y axes at point O), and where V is the volume of the displacement of water by this unit length of hull. The force W producing this moment $M_x$ is related to the volume V and weight W of displaced water and the density of the displaced water, $$\frac{W}{V}$$

so that $$\frac{M_x}{V}$$

is equivalent to the force arm or distance S–41 multiplied by a constant depending upon the units chosen.

Similarly with regard to the y-axis, $$\frac{M_y}{V}$$

is equal to the distance S–42 or 41–O of the center of buoyancy S from the y-axis where $M_y$ is the moment of the force-component paralleling the y-axis.

For further preparation for calculations, it is desirable to draw the line 43—44 through the center of buoyancy point S and parallel to line OR, the line 43—44 intersecting the y-axis line OG at 44, and the point 43 lying at the intersection of line 43—44 with a perpendicular thereto through point O, this perpendicular being the line O–43 and being parallel to the stability line TS and to the waterline JK. The lines O–43 and TS are obviously equal so that either is a measure of the stability factor.

By trigonometry, the angle O–44–43 is equal to angle $\theta$, so that line TS or O–43 is the length of the line O–44 times sin $\theta$, or (1)     Line TS = Line (O–44) sin $\theta$ However line O–44 consists of two lesser lines O–42 and 42—44. As explained before line O–42 is equivalent to $$\frac{M_x}{V}$$

By trigonometry line 42—44 equals line S–42 divided by tan $\theta$. As explained before, line O–41 is equivalent to S–42 which in turn is $$\frac{M_y}{V}$$

Consequently, the full length of line O–44 can be expressed as (2)     $\text{Line O–44} = \frac{M_x}{V} + \frac{M_y}{V \tan \theta}$ substituting Equation 2 in Equation 1

(3)     Stability line $TS = \frac{M_x}{V} \sin \theta + \frac{M_y}{V} \cos \theta$ Thus the value of the stability factor, the length of line TS, may be determined for any given list angle $\theta$ by determining the values of $M_x$ and $M_y$. The determination of these factors $M_x$ and $M_y$ involves treatment of areas.

The value of $M_x$ may be determined rather simply as being equal to the summation of the moments of a plurality of substantially rectangular segments of area, each having an infinitesimal width along the y-axis and a length parallel to the x-axis and extending to the hull side curves OLF and ONH and lying within the waterline LN. The determination of $M_y$, on the other hand, is considerably more involved and requires the introduction of several considerations which materially complicate the overall picture beyond that already presented. A convenient and readily workable way of obtaining these values will now be outlined.

In brief, the apparatus of Fig. 1 includes means that produces a plurality of separate electrical signals having variational characteristics with respect to time such that, when viewed on an oscilloscope, each signal will reproduce the outline of the "section" or transverse cross-section of the ship's hull at the desired point along its length; the plurality of signals producing the chosen plurality of "sections" along the length of the hull. These are the outline signals.

The apparatus of Fig. 1 also includes means that generates for each section, a signal or intercept line corresponding to the waterline for that cross-section under the assumed list or angle $\theta$. In usual ship position with an even keel, this waterline is perpendicular to the center vertical hull plane (represented by the line OG of Fig. 3) which passes through the keel of the ship and bisects the hull into two symmetrical halves or sides. In a list condition of the ship, however, the waterline is not perpendicular to the center vertical hull plane but is disposed with some angular relationship thereto. To cover a full range of all possibilities, it is necessary to make provision for varying the angularity of the waterline with respect to the center vertical hull plane for each section and for varying the location of the intersection of the waterline intercept line with the center vertical hull plane, this latter variation simulating different amounts of penetration of the hull section into the water.

The device of Fig. 1 includes means that operates on these two basic signals for each section, the outline signal and the waterline intercept line or signal, to determine hull displacement, the stability factor and other factors for each group of conditions under consideration; the means performing steps of shaping and varying the signals, and performing mathematical steps such as addition, subtraction, multiplication, division, differentiation and integration of quantities to the end that significant utilizable results are quickly obtained.

The signals are produced as waveforms having voltage-amplitudes varying with respect to time. Translated into Fig. 3, the time axis corresponds to the $y$-axis and the voltage axis corresponds to the $x$-axis, the zero point or origin being at O. The signal waveforms are converted to visible curves on one or more oscilloscopes and are repeated with sufficient rapidity to provide steady, visible curves. Adjustments are provided that affect the signals to effect a change in the shapes of the visible curves in any desired way, the changes being observable on the viewing means, that is, the oscilloscope or oscilloscopes. The signals thus repeat and are maintained for desired times which permit their adjustment and permit mathematical action by the equipment.

The shapes or waveforms of the signals and the rate at which they repeat are under the control of a master timing unit 25, the control being exercized by means of an arrangement of system of specialized operating signals.

The system of operating signals comprises master pulses of short duration which occur at a predetermined frequency; sawtooth signals repeating at the same frequency; and pulse-series signals, each series comprises a group or plurality of pulses, the groups or series repeating at said frequency. In the preferred embodiment herein described, the frequency is 100 cycles per second. This means that the master pulses and the sawtooth signals are generated at the rate of 100 per second. Each group-pulse is preferably 0.9 millisecond long, and the groups then also occur at a rate of 100 groups per second, the groups being spaced one millisecond apart.

The master pulses are employed to synchronize the operation of the components of the apparatus, while the sawtooth waveform is employed directly in computation, as for example, in determination of the stability factor.

The pulses of the series as obtained in sequence are combined in various ways for each ship section or "station" and then integrated to obtain exponential curves which duplicate the ship cross-sectional shapes desired. These combining and integrating operations are performed in equipment designated as function generators, numbered 26—30. In order to correspond to Figs. 2A–2E five such function generators are provided, one for each ship cross-section station. A sixth function generator, 30–A is included for calibration purposes. By adjustment of the pulse amplitudes and the time constant of integration for each function generator, it is possible to generate a signal providing a waveform corresponding to any shape of curve on the viewing means. The curves can be made to correspond to the hull half-side curves, for example FLØ and ONH of Fig. 3.

The function generators also include means providing signals for the deck line curves. The deck line and the hull half-side curves are combined in appropriate timing relationship for outlining on the viewing oscilloscope an area geometrically similar to a ship cross-sectional area. The outlined area may be integrated electrically to determine a measure of that area. The various curves forming the outlined area can be considered to be functions of time and voltage which graphically represent the hull outline involved, but bearing no reference whatever to the location of the waterline. The signals producing the curves will, of course, also correspond to the functions.

The information regarding the waterline, its position or depth of penetration, and any list is provided by means in equipment designated as function control units 31–35, one function control unit of this number being provided for each hull section, and being connected to the output of a single function generator.

The complications involved in generating a waterline and correlating it with the function corresponding to the ship outline at the various sections are considerable and may be more fully appreciated by reference to Fig. 3 showing a typical ship outline cross-section as a function of voltage ($x$-axis) versus time ($y$-axis) coordinates. In this Fig. 3, it will be recalled, one side of the hull is represented by the curve OLF, and the other side by the curve ONH. The water-shedding deck line is represented by the straight line curves FG and GH, and the water line by the straight line curve LN. The hull sides OLF and ONH, and the water line LN outline two areas (or volumes of unit thickness), one to the right of the center line or $y$-axis OG involving the hull side ONH and a right part NM of the waterline MN, the other to the left of line OG involving the hull side OLF and another part LM of the waterline. In the voltage versus time representation as employed for Fig. 3, line OG is zero voltage; thus an integration for the area under the voltage variation curve beginning at point O, (coinciding with the start of a master pulse) proceeding along curve ONH to point N, thence along line NM and then back to O will give a first quantity which when added to the somewhat similar integrated quantity on the left of line OG will give the total area of the hull section that is below water. This quantity of area multiplied by the length of the hull having the shape of that section will give the displacement of that length of the hull. A curve with voltage variations as shown by the outline discussed can be integrated by a D.C. voltmeter of the d'Arsonval type which, accordingly, will give indications directly proportional to planar displacement of the enclosed area. These indications when employed in conjunction with one or more suitable meter multiplication factors will yield solid displacement for a hull of unit length having the cross-section or outline involved.

In attempting to automatically obtain the areas inclosed on the voltage-time axes, a certain difficulty must be recognized. Thus the curve OLM varies continuously or progressively with time, but the curve ONM varies progressively from point O to point N with time, but in effect seeks to go backward time-wise in its portion from N to M. However, once a period in time has been passed it is not possible to return to it. Thus, although it is easy to generate the signal voltages varying with time for outlining the area bounded by hull side-portion OL and the water line portion LM (starting at zero time from point O moving along line OL thence along line LM), it is impossible similarly to outline the opposing area bounded by hull side-portion ON and line NM as a signal having a voltage varying continuously with time because the last portion NM would require a negative passage of time.

This difficulty can really be resolved quite easily with the novel electrical manipulation of mathematical quantities of this invention. In accordance with the teachings of the present embodiment, a method is used for modifying the displacement area, in particular the portion to the right of line OG in Fig. 3, to eliminate the requirement for negative time. This is done by substituting the line 45—46 for the line NM, the two lines being diagonals of the rectangle M-45-N-46-M, and hence equal but sloping in opposite directions with corresponding points at the same distance from the x-axis. This line 45—46 starts at time OM and reaches line OG at the same instant in time at which line MN would reach point N. Accordingly, the area O-45-N-M-O can be replaced by an equivalent area O-45-46-M-O which is bounded by the line O-45-46 that varies progressively with time. This alteration has no appreciable effect upon the displacement or on the computation of $M_x$ because the areas of the two configurations can be handled to give the same results, particularly since they are at equal distances from the x-axis. Serious alteration is introduced into the determination of $M_y$ however because of the difference in the distances of the centers of the areas from the y-axis. Nevertheless, the following discussion will show that the substitution can be made with little difficulty.

For the following discussion, the curve representations of Fig. 3 may be regarded as comprising three basic functions or voltage waveforms:

$y_i$—which is the basic ship hull outline, identical for both halves of the hull, without any water line signal. This curve therefore is merely the simple exponential curve as generated and can be either OLFGO or ONHGO.

$y_n$—this is the composite displacement area signal for one-half of the hull including the hull outline and the waterline. As assigned in Fig. 3, this signal or voltage waveform includes the composite waveform outlined by curve OL, line LM. The area of this representation is completed by line OM, the zero voltage or "base" line.

$y_p$—this is the composite modified displacement area signal for the second half of the hull including the hull outline and the modified water line. As assigned in Fig. 3, this signal or voltage waveform includes the composite waveform outlined by curve O-45 and line 45—46. The area of this representation is completed by the line O-46, the zero voltage or "base" line.

To determine $M_y$ from these functions, a summation is again made of the moments of a plurality of substantially rectangular areas, each area having an infinitesimal width along the y-axis and a length along the x-axis equal to the distance between the boundary line (function) and the base line; each area being multiplied by a moment arm equal to half the distance to the function from the base line.

For convenience the moments may be divided into two parts, the moments involving the curve $y_n$ and the moments involving the curve $y_p$, taking the moments of curve $y_n$ as negative.

Thus, for each infinitesimal area $\Delta y_n$ of $y_n$, the moment arm is $$\frac{\Delta y_n}{2}$$

and the moment for $\Delta y_n$ is (4) $\qquad M y_n \text{ (for } \Delta y_n) = \Delta y_n \times \frac{\Delta y_n}{2}$ or (5) $\qquad M \Delta y_n = \frac{\Delta y_n^2}{2}$ Also, for the moments involving $y_p$ the areas of infinitesimal thickness are each equal to $\Delta y_p$ and the moment arm therefor is equal to $$\frac{\Delta y_p}{2}$$

up to the junction of curve ONH with line 45—46. Beyond this point it is expressed by $$\left(\Delta y_i - \frac{\Delta y_p}{2}\right)$$

to correct for the modification employed with line 45—46 to avoid negative time. Thus, (6) $\qquad M_y \text{ (for } \Delta y_p) = \Delta y_p \times \left(\Delta y_i - \frac{\Delta y_p}{2}\right)$ (7) $\qquad = \Delta y_p \Delta y_i - \frac{\Delta y_p^2}{2}$ combining (5) and (7) considering the sign of quantity (5) as negative.

(8) $\qquad M_y \text{ (total)} = \Delta y_p \Delta y_i - \frac{\Delta y_p^2}{2} - \frac{\Delta y_n^2}{2}$ or (9) $\qquad M_y \text{ (total)} = y_p + y_n$ This equation for $M_y$ is in a form which is not easily handled by computing apparatus because it involves three multiplications, that of $(y_p y_i)$, $(y_p y_p)$ and $(y_n y_n)$. To avoid this, and as part of the inventive concept, a short cut has been discovered permitting a tremendous simplification of computer operation so that only one multiplication operation is necessary.

This short cut begins by making the assumption that the following equation will apply to the situation:

(10) $\qquad M_y = (y_p + y_n)\left(y_i - \frac{y_p}{2} - \frac{y_n}{2}\right)$

This equation, involving the same variables as before, but grouped in an arbitrary manner, requires only one multiplication and is therefore easily handled by computing apparatus without excessive apparatus complexity, but must be proved to be equal to the preceding equation. The proof can be as follows:

Multiplying the grouped terms of the equation above

(11) $\qquad M_y = y_p y_i - \frac{y_p^2}{2} - \frac{y_n y_p}{2} + y_n y_i - \frac{y_n y_p}{2} - \frac{y_n^2}{2}$ Combining terms,

(12) $\qquad M_y = y_p y_i - \frac{y_p^2}{2} - \frac{y_n^2}{2} - y_n y_p + y_n y_i$ Inspection shows that except for the last two terms this equation is identical to the actual equation for the moments which, as has been explained, is very unwieldy for computer manipulation, however upon closer inspection it is to be noted that for the portion of the hull expressed by the curves up to the conclusion of the time interval $t_3$, when point L is reached in curve OL, the variables $y_i$, $y_n$ and $y_p$ are all equal in magnitude, thus the last two terms are equal and since they carry opposite signs, they cancel each other so that the assumed equation is equal to the actual equation up to the conclusion of the time intervaal $t_3$ and may be substituted therefor.

In the region from the conclusion of the time interval $t_3$ to the conclusion of the time interval $t_2$, $y_i$ and $y_p$ are equal, thus the last two terms are equal, and being of opposite sign, cancel. Thus the assumed equation is also equivalent to the actual equation from the region between the conclusion of the time interval $t_3$ and the conclusion of the time interval $t_2$ and may likewise be substituted therefor without introducing error.

In the final region of the generated curve from the conclusion of the time interval $t_2$ to the conclusion of the time interval $t_1$, the variable $y_n$ is equal to zero so that the last two terms of the equation are equal to zero. Thus the assumed equation is equivalent to the actual equation throughout the length of the entire curves.

For further convenience the assumed equation can be further factored and regrouped to give an equation which is even more conveniently solved by computing apparatus to obtain the final operation equation for $M_y$.

(13) $\quad M_y = (y_p + y_n)[y_i - \tfrac{1}{2}(y_p + y_n)]$

To repeat, for convenience, the equation for the moments about $x$-axis is

(14) $\quad M_x = (y_p + y_n)(\text{sawtooth voltage})$

With $M_y$ and $M_x$ as thus obtained it is then merely necessary to solve the equation

(15) $\quad TS = \dfrac{M_y}{V}\cos\theta + \dfrac{M_x}{V}\sin\theta$ to obtain the length of the line TS to locate the position of the center of buoyancy for the selected list angle. This equation may be regrouped:

(15) $\quad TS = M_y \dfrac{\cos\theta}{V} + M_x \dfrac{\sin\theta}{V}$

Substituting in this regrouped equation the actual value for $M_y$ and $M_x$ gives (16)

$$TS = (y_p + y_n)\left(y_i - \dfrac{y_p + y_n}{2}\right)\left(\dfrac{\cos\theta}{V}\right)$$
$$+ (y_p + y_n)(\text{sawtooth})\left(\dfrac{\sin\theta}{V}\right)$$

factoring (17)

$$TS = \dfrac{y_p + y_n}{V}\left\{\left[\left(y_i - \dfrac{y_p + y_n}{2}\right)(\cos\theta)\right]\right.$$
$$\left. + [(\text{sawtooth})(\sin\theta)]\right\}$$

This final equation although apparently quite complex is readily solved by computing devices because difficult operation of multiplication of variables need be done only once, disregarding as variables $\cos\theta$ and $\sin\theta$ because the list angle $\theta$ is an independent variable and the values of the functions thereof can be inserted manually.

Even with this basic equation in simplified form, calculation with conventional computer devices is no easy matter. With apparatus constructed in accordance with Fig. 1, however, the solution of these equations to determine not only the displacement and center of buoyancy for a single section but for an entire hull having many sections of different shape is easily and quickly obtained.

This particular apparatus of Fig. 1 is specifically set up to provide solutions of the displacement and center of buoyancy problems thus far discussed at considerable length but the principles involved therein may be applied with equally efficient results to the solutions of many other entirely unrelated problems; such as forces active upon an airfoil or on a rudder in motion through a fluid, determination of the resonant frequency of the dynamic components of an engine such as the crankshaft, connecting rods, pistons, etc., of an internal combustion engine, to mention a few; merely by rearranging the mathematically operative components to solve appropriate equations and adjusting the function generators to produce signals having appropriate shapes relative to the quantities involved.

The principles thus far described permit the determination of the displacement and the center of buoyancy for a hull having a uniform cross-section shape throughout its unit length such as that represented by Fig. 3. To apply these principles to a body wherein the cross-section is variable throughout the length as in a ship hull, it is necessary to generate cross-sections at a plurality of "stations" or spaced points along the length of the body. When this is done the results obtained individually for each section may be combined according to any standard equation for determining the overall hull characteristics.

A typical combination relationship is the well known empirical Simpson's rule which gives the volume V for a body which has an odd number of cross-sectional stations $y_1$, $y_2$, $y_3$, $y_4$, $y_5$, etc., separated uniformly by the distance $h$, as follows:

(18) $\quad V = \dfrac{h}{12}(y_1 + 4y_2 + 2y_3 + 4y_4 + y_5)$

This equation can be expanded when more than five cross-sections are taken.

Simpson's rule may be applied to the present problem by using as $y_1$ to $y_5$ the sections at the five stations shown in Fig. 2. Thus for example a first function generator 26 may be set to generate a hull outline curve ($y_i$) for a cross-section near the bow of the ship as represented by that section shown in Fig. 2-A. Similarly, a second similar function generator 27 may be set to produce a cross-section outline ($y_i$) such as that of the section of Fig. 2-B, and function generator 28 an outline $y_i$ such as that of the section of Fig. 2-C. Also function generators 29 and 30 may be set to produce the outlines ($y_i$) of the sections of Figs. 2-D and 2-E, respectively.

These outlines, thus generated independently, then independently receive the waterline information, including any desired list angle from the function control units 31-35. Each function control unit produces both the negative and the positive curve functions ($y_n$ and $y_p$).

All positive curve functions ($y_p$) for the various sections are added together in the adder 52 to obtain a composite value of $y_p$. This addition of the values for the different sections must be performed in individual amplitude in accordance with the constants of the previously mentioned Simpson's rule.

Thus the generated values will be taken in the amplitude ratios of 1, 2, and 4; 4 for sections 2 and 4; 2 for section 3; and 1 for sections 1 and 5. Thus the total area, or volume, under the positive functions for the sections may be obtained in the output from adder 52 of Fig. 1 provided the inputs to the adder 52 are arranged to introduce the constants of 1, 4, 2, 4, 1, respectively as multipliers for the sections A, B, C, D, and E, respectively. This may be accomplished by means of potentiometers or voltage dividers in the adder 52 which will be described in detail at a later point in the specification. The constant $$\dfrac{h}{12}$$

will be discussed presently in connection with the meter 51, being introduced in the meter calibration.

Likewise the negative functions are added in adder 50 in accordance with Simpson's rule to obtain a composite value of $y_n$ which represents the total volume on the "negative" side of the hull.

The composite volumes $y_n$ and $y_p$ thus obtained are added in a one to one ratio by adder 53 to obtain an output signal ($y_n + y_p$). This signal is integrated by meter 51 to provide an indication proportional to the total area or total volume since the constants $$\frac{h}{12}$$

may be introduced into the reading by the meter calibration itself. To adequately provide this operation, it is necessary that a true integrating meter, such as one having a movement of the d'Arsonval type be employed. In calibrating the scale of this meter to indicate directly the displacement in tons, consideration must be made to introduce the constant $$\frac{h}{12}$$

as found in Simpson's rule as well as a constant of 35 which represents the number of cubic feet of sea water equivalent to a ton. From this it is seen that the meter 51 will directly indicate displacement in tons for the entire hull under the conditions of waterline location and list angle, if any, which are inserted at the function control units 31–35.

In addition to the necessity of obtaining a composite value for $y_p$ and $y_n$ for all the sections, in order to determine the stability factor it is also necessary to obtain a composite value for $y_i$ for all the sections, also combined in accordance with the constants of Simpson's rule. This combination is provided by the adder 54 to obtain the composite $y_i$ to which the constant $$\frac{h}{12}$$

is not yet applied.

Divider 55 provides the value of $$\frac{y_p + y_n}{2}$$

as found in the equation of $M_y$. This divider 55 may be merely a potentiometer voltage divider for taking half of the signal $(y_p+y_n)$ which is obtained from the output of adder 53.

Subtractor 56 performs the subtraction of $$\frac{y_p + y_n}{2}$$

from $y_i$ as involved in the equation for $M_y$ to provide as output the quantity:

$$\left(y_i - \frac{y_p + y_n}{2}\right)$$

Angle resolver 57 then performs the dual operations of multiplying this value by the value of the cosine of the list angle $\theta$ and of multiplying the value of the 45° sawtooth signal employed as the moment arm in $M_x$ and obtained from the master timing unit 25 by the sine of angle $\theta$ to obtain separately the two quantities $$\left[\left(y_i - \frac{y_p + y_n}{2}\right)(\cos\theta)\right]$$

and $$[(\text{sawtooth})(\sin\theta)]$$

Again for the angle resolver 57 simplicity is the keynote, the apparatus being typically a pair of potentiometers suitably calibrated to provide outputs which are equal to the input quantity multiplied by the sine or cosine of the list angle.

The above two quantities are then added by adder 58 to obtain the quantity:

$$\left[\left(y_i - \frac{y_p + y_n}{2}\right)(\cos\theta) + (\text{sawtooth})(\sin\theta)\right]$$

Multiplier 59 then performs the operation of multiplying the output of adder 58 by the quantity $(y_p+y_n)$ as obtained from adder 53 to provide the solution to the equation for the stability factor which then must be divided by the volume obtained from meter 51. This last operation of division is best performed manually to which end the quantity:

$$\left[(y_p + y_n)\right]\left\{\left[\left(y_i - \frac{y_p + y_n}{2}\right)(\cos\theta)\right] + [(\text{sawtooth})(\sin\theta)]\right\}$$

will be indicated by a second integrating meter 60.

The basic device as thus described provides an output indication of the hull displacement in tons of water under various conditions, together with an indication which, when divided by displacement in cubic feet (conversion factor 35 cubic feet of water per ton) will give the stability factor in feet.

Several additions may be made to the basic device as thus far described to extend its utility even further. For example where it is desired to determine the location of the waterline to obtain a certain displacement under various list angles including zero list angle (even keel), the device thus far described would require individual adjustment of each function control unit to a water line in a cut and try process. This operation will be somewhat time consuming (still it would be faster operation than that provided by conventional computers) and may be reduced considerably by means of the apparatus in the five blocks 61, 62, 63, 64 and 65.

This apparatus provides a means for inserting a desired comparison signal or "displacement" which will then be compared with the actual value of displacement, the integrated composite value of $(y_p+y_n)$ as obtained from adder 53, to simultaneously and automatically adjust the water line placed on the function curves by the function control units 31–35 until the desired displacement is obtained. The computer will thus perform the cut and try operations itself, correcting itself at the rate of 100 times per second in the example under discussion so that stabilization will be realized in a very short period of time and with the expenditure of very little manual effort. By measuring the control signal applied to the function control units 31–35 to obtain this desired displacement, it is possible to determine the location of the water line which produces the desired displacement.

To perform this time saving operation, the displacement signal composite $(y_p+y_n)$ as taken from the adder 53 is integrated by integrator 61 and the result subtracted from a reference signal in subtractor 62. The reference signal is provided by the reference control unit 63 which supplies a manually adjustable comparison signal regarding the desired displacement.

The resultant signal from the subtractor which may be of either a negative or a positive polarity depending upon whether the displacement is larger or smaller than the desired displacement reference is applied through control distributor 65 to the function control units 31–35. The magnitude of this control signal may be measured by meter 64 to provide an indication of "water line" when the meter scale carries suitable calibration.

Thus far described, the signals delivered to all the function control units for control of water line are uniform so that the water line is placed an equal distance from the keel line for all sections. This represents the situation wherein the ship is riding at an even keel in still water.

In ship hull calculations it is also necessary to determine what happens to the displacement and center of buoyancy when the ship is in water in an attitude other than with an even keel. An illustration of such a situation is with an unloaded tanker in which the machinery located near the stern causes the stern to be held low in the water while the empty forward section rides high in the water. In this situation the hull cross-sections near the stern will have a much higher water level in comparison to the forward sections than in the even keel operation, the variation being linear along the length of the ship. Insertion of this variation may be manually made directly into the function control units but such an arrangement necessitates an individual adjustment of each function control unit whenever the keel angle or displacement is varied.

Again this is an operation that requires time, and one which may be considerably simplified by relatively simple circuitry in the control distributor 65. This device in block 65 may comprise primarily a voltage divider which applies a given percentage of an input control signal to each function control unit in proportional dependency upon the quantity of the function control units or sections employed. For example, where there are five function control units for five hull sections as shown in the apparatus of Fig. 1, the function control unit may apply zero percentage of the control signal to function control unit 31, 25 percent of the control signal to function control unit 32, 50 percent to function control unit 33, 75 percent to function control unit 34, and 100 percent to function control unit 35. It must be borne in mind that such a percentagewise example is exemplary only and that actually different percentages may be employed for example, 75, 70, 65, 60, and 55 percent for the function control units 31, 32, 33, 34 and 35, respectively.

The apparatus employed to develop the attitude variation signals includes the negative and positive adders 66 and 67 which may be identical to the adders 50 and 52 and similarly connected to the $y_n$ and $y_p$ function outputs; adder 68, which is connected to the output of adders 66 and 67 to produce combination of the outputs thereof, integrator 69, which provides integration over the entire signal, subtractor 70 which compares the integrated signal (longitudinal buoyancy moments about a reference axis) with a comparison signal (longitudinal weight moments about a reference axis) as obtained from reference 71 to obtain an output corrective signal which is employed to locate the water line differently for each section to obtain a situation where the weight moments and buoyancy moments are equal. This corrective signal is applied to the function control units through the previously mentioned control distributor 65. Additionally a meter 72 is included which provides an indication of this corrective signal. Meter 72 may be calibrated to indicate the water line at the stern, for example, and an integrating meter 73 connected to the output of adder 68, and to provide an indication of the longitudinal moments.

Figs. 4–18, taken together, constitute a schematic diagram of specific basic apparatus exemplifying the teachings of the present invention as employed in the solution of the displacement and stability problems. To these circuits of the basic apparatus are preferably added the auxiliary apparatus of Figs. 19–26 which provides vastly improved overall operation by automatic control of the water line with relatively little additional complexity.

The nature of the overall circuit of the invention is such as to permit a ready breakdown thereof into a number of different components which may be described and shown separately. The different figures are drawn in such a manner that, although each is complete in itself with regard to what it is intended to show, all of the figures may be assembled into one large diagram, the relative positions of the different figures being indicated by arrowheads (keys) at appropriate points on the figures. When the figures are disposed relative to each other with all keys in correspondence, all interconnections and components of the basic apparatus of blocks 25–60 in the blocks diagram of Fig. 1 are shown in such a manner as to avoid undue complexity and indefiniteness. Such an assembly does not, however, show all the connections to the basic apparatus of Figs. 4–18 of the auxiliary apparatus of Figs. 19–26, nevertheless all connections not shown are indicated by appropriate means. If desired the schematic figures may be considered in conjunction with the block diagram of Fig. 1 wherein all interconnections are shown on a single sheet.

With reference now to Fig. 4 of the drawing, a schematic diagram of the master timing unit 25 (Fig. 1) is shown. This master timing unit 25 provides timing signals which control the operation of the entire unit. Two basic signals are provided by the master timing unit together with a plurality of secondary output signals time displaced relative to one of the basic signals. The first of these basic signals is a recurring pulse signal having a repetition frequency typically of 100 cycles per second, and the second signal is a sawtooth voltage of the same recurrence frequency and which varies linearly with respect to time and which is used as the moment arm in the previously mentioned calculation of $M_x$. This sawtooth signal will be described in further detail in connection with the description of the specific structure (Fig. 16) which utilizes the signal.

The circuit of Fig. 4 includes an oscillator section having the triode electron tubes 100 and 101 connected in an oscillatory circuit with a tuned parallel resonant circuit including capacitance 102 and inductance 103. One terminal of this resonant circuit is connected to ground, while the other terminal thereof is connected to the grid of tube 101 through current limiting resistance 104 and to the anode of tube 100 through resistance 105 and capacitance 106. The anode of tube 100 is further connected through resistance 107 to a source of (B plus) potential which is supplied from a (plus 200 volt) power supply through the decoupling filter network consisting of resistance 108 and capacitance 109. The anode of tube 101 is directly connected to the positive terminal of filter capacitance 109 and the cathodes of tubes 100 and 101 are connected together and returned to ground through a common resistance 110.

The frequency of the oscillator is determined primarily by the components 102 and 103 which are set to produce oscillations having a frequency of 50 cycles per second. If desired, provision may be made for adjusting this frequency by employing an inductance 103 which is adjustable, however the frequency is so low that it is not very practical to employ a variable condenser in the L—C circuit.

Oscillations thus produced by the operation of the oscillator circuit and which may be obtained across the parallel resonant circuit are applied to the grid of a cathode follower type isolating tube 111. The anode of tube 111 is connected to the filtered (B plus) potential obtained across capacitance 109, while the cathode of tube 111 is connected to a source of potential (minus 200 volts) through cathode load resistance 112. The cathode of tube 111 is also connected to ground through the primary 113 of a coupling transformer 114. The secondary 115 of transformer 114 has the fixed terminals of a potentiometer 116 connected thereacross, the movable contact of this potentiometer being connected to ground.

Additionally, the secondary 115 has its output terminals connected to the grids of a pair of triode tubes 117 and 118, which are connected in a form of push-push frequency doubler circuit having substantially infinite input impedance for the control signal. The frequency doubler tubes 117 and 118 have their anodes connected to the source of filtered (B plus) potential that is obtained across capacitance 109, while their cathodes are connected together and returned through resistance 119 to the negative potential (minus 200 volts). The grids of the triodes are connected in push-pull and the plate circuits are connected in parallel, thus the cathode resistor 119 receives two pulses of plate current for each cycle of excitation frequency. The output of the circuit is similar to that of a full-wave rectifier where the output ripple frequency is twice that of the input frequency. The output frequency is therefore 100 cycles per second.

The cathodes of tubes 117 and 118, at which this frequency doubled signal is obtained, are coupled by means of capacitance 120 and potentiometer 121 to the grid of an amplifier and inverter tube 122. Tube 122 has its anode connected through plate resistance 123 to a second source of filtered (B plus) potential obtained from the (plus 200 volt) supply through the decoupling network consisting of resistance 124 and capacitance 125. The frequency doubled signal is amplified and inverted by tube 122 so that a series of positive pulses of short duration, are developed across resistance 123.

These positive signals from the anode of tube 122 are coupled to the grid of a gas-filled triode type electron tube 126, which tube forms a low impedance current path similar in many respects to that as employed in a sawtooth generator but which, due to the output connection, provides in this particular instance a pulse type output signal. To this end the grid of tube 126 is coupled to the anode of tube 122 with the coupling circuit including capacitance 127 and resistance 128 and the current limiting resistance 129. The anode of tube 126 is connected through resistance 130 to the source of filtered (B plus) potential as obtained from the filter circuit of resistance 124 and capacitance 125 and is by-passed to ground by capacitance 131. The cathode of tube 126 is connected to ground through cathode load resistance 132. Grid bias for tube 126 is provided by means of a voltage divider consisting of resistances 133 and 134, the latter being variable, connected between the (minus 200 volt) power supply and ground which maintain the average potential of the grid of tube 126 at a selected negative potential with respect to the cathode thereof. In this circuit tube 126 is rendered conductive by each positive pulse produced across resistance 123. Tube 126, thus brought to conduction to produce this pulse is extinguished shortly thereafter through the operation of the time constant circuit of resistance 130 and capacitance 131 which limits the total current delivered to the anode of tube 126 so that as capacitance 131 discharges in the production of a pulse, the anode supply potential for tube 126 is lowered to produce deionization thereof.

The pulses thus produced across resistance 132 at a frequency of 100 pulses per second are the master pulses which will be identified as such and which are utilized at numerous places in the equipment to be described subsequently.

A first place in which the master pulses are used is shown in Fig. 4 itself, in the production of a linear sawtooth signal which is used as the moment arm in the subsequent calculation involving the moment, $M_x$. To produce this sawtooth signal, the master pulses, which are of positive polarity, are applied via a short time constant coupling circuit including primarily capacitance 135 and resistance 138 to the grid of a gas tube 137. This short time constant circuit "differentiates" the master pulses to obtain alternate positive and negative "spikes" or pulses of short duration. Tube 137, which is otherwise held non-conductive by a negative potential obtained from the juncture of resistances 139 and 143 connected between the (minus 200 volt) power supply and ground is brought to conduction by the positive "spikes." In the complete circuit, grid current limiting resistance 136 is interposed between capacitance 135 and the grid of tube 137.

The anode of tube 137 is connected through resistance 140 to the cathode of a diode electron tube 141 whose anode in turn is connected to the (plus 200 volt) power supply. Additionally, the anode of tube 137 is by-passed to ground supply by means of capacitance 142 and the cathode of tube 137 is connected directly to ground. The anode of tube 137 is further connected to the grids of a pair of triode type electron tubes 144 and 145 which are connected in cathode follower circuits. The anodes of these tubes are connected to the (plus 200 volt) power supply. The cathode of tube 144 is connected through resistance 146 to the (minus 200 volt) supply and is coupled by means of capacitance 147 to the cathode of tube 141. The cathode of tube 145 in turn is connected to the (minus 200 volt) supply through potentiometer 148 which is in series with a fixed resistor 149.

Tube 145 is an impedance transforming output device for the linear sawtooth generator. This sawtooth generator above described is a "boot-strap" circuit built around the time constant circuit which includes resistance 140 and capacitance 142. Capacitance 142 charges through the resistance 140 and periodically is discharged through tube 137 as previously mentioned, which tube is brought to conduction in coincidence with the leading edges of the master pulses obtained from the cathode of tube 126. Capacitance 147 together with tube 144 provides a means for increasing the effective charging potential applied to the time constant circuit of components 140 and 142 during each cycle as capacitance 142 charges to achieve as near as possible a constant current charging of capacitance 142. To this end, diode 141 isolates the circuit from the normal (B plus) potential of 200 volts whenever the adjusted (B plus) potential at the top of resistance 140 exceeds the 200 volt level. For effective operation of this circuit, it is, of course, necessary that capacitance 147 be sufficiently large so that the potential across it remains substantially constant during each charging period of capacitance 142. This would mean, of course, that the capacitance 147 is many times larger than capacitance 142.

In this circuit, as the voltage across capacitance 142 rises, the grid of cathode follower tube 144 accompanies it to produce an increase in the potential at the cathode of tube 144, which increase is almost the same magnitude as the developed sawtooth signal. This rise in potential at the cathode of tube 144 is coupled to the cathode of tube 141 by the capacitance 147 to produce a corresponding increase in potential at that point, which is the potential effective to produce the charging of capacitance 142 through resistance 140. With this circuit a high degree of linearity is obtained without requiring any particularly critical adjustment or a high supply potential.

The signals obtained from the output isolating tube 145 are applied through a seemingly complicated potentiometer arrangement including potentiometers 148, 150, and 151 to the grid of an output D.-C. level equalizing tube 152. Actually this circuit offers no particular difficulty, it being inserted to provide control of the D.-C. level of the sawtooth output, as well as the amplitude, so that the sawtooth output will vary between extremes which are above and below ground potential by equal amounts and are readily adjusted. Tube 152 has its anode connected through a decoupling filter network consisting of resistance 153 and capacitance 154 to the (plus 200 volt) power supply, while its cathode is connected through resistance 155 to the (minus 200 volt) power supply. Potentiometer 150 is disposed in the circuit with the fixed terminals thereof connected between the taps of potentiometer 151. The tap point of potentiometer 150 is connected to the grid of tube 152. Potentiometer 151 is disposed in the circuit with the ends of the resistance element thereof connected between the (minus 200 volt) power supply and ground.

Considerable interaction is involved in the adjustment of all three potentiometers, 148, 150 and 151, however, in practice it is a relatively simple matter to adjust these potentiometers to obtain the desired output amplitude and location of the D.-C. level at the center point of the sawtooth.

Also included in the master timing unit 25 as shown in detail in Fig. 5 is multiple pulse production equipment which provides, responsive to each master pulse, a series of charging pulses each of which may have a typical duration of 0.9 millisecond. These pulses occur in sequence with a minimum of time spacing therebetween. Numerous means, such as delay lines could be employed for the production of such a series of pulses following each input pulse, however it has been found desirable to employ a circuit which provides the utmost of flexibility and reliability in pulse generation since the character of the pulses thus produced is so intimately linked with the production of satisfactory outline waveforms.

The equipment of Fig. 5 is a fragmentary showing of the actual pulse shifter components which would normally be found, indicating merely four pulse shifters, one in detail, and three in block. It is to be understood, however, that this has been done merely to avoid undue circuit complexity, it being understood that a duplication of the pulse shifter equipment as indicated in the blocks of Fig. 5 to a total of ten pulse shifters as would be more typical is very easily accomplished. This apparatus of Fig. 5 operates in response to the master timing pulses as obtained from the cathode of tube 126 of Fig. 4. This timing pulse is applied to a pulse shaping circuit including the switch circuit of tubes 156 and 157. In this switch circuit, the anode of tube 156 is connected to the (plus 200 volt) power supply through resistance 158, while the anode of tube 157 is connected to this same (plus 200 volt) supply through resistance 159. The cathodes of tubes 156 and 157 are connected together and returned to ground through a common cathode resistance 160. The master timing pulse input is applied to the common cathode connection so that master pulses are developed across resistance 160 to produce switching operation of the switch circuit. Additionally the grid of the tube 156 is connected to the anode of tube 157 through resistance 161 which is by-passed by capacitance 162 and to the (minus 200 volt) power supply through resistance 163. The grid of tube 157 is connected in turn to a voltage divider consisting of potentiometer 164 and fixed resistance 165, which divider is coupled to the anode of tube 156 by means of capacitance 166. The grid of tube 157 is connected to the movable tap on potentiometer 164. In this circuit the grid voltages are arranged so that tube 156 is normally cut off and tube 157 conductive. This situation is stable because of the fact that the grid of tube 157 has an average D.-C. potential approximately equal to ground potential, whereas the potential of the grid of tube 156 is lower than that, due to voltage divider action from the (plus 200 volt) supply to the (minus 200 volt) supply produced primarily by the resistances 159, 161 and 163 as well as that of the anode current path through tube 157. Should for any reason tube 157 become momentarily non-conductive, such as for example by reason of an increase in the potential at the common cathodes, the potential at the juncture of resistances 159 and 161 increases which, when communicated to the grid of the tube 156, results in the initiation of conduction by that tube. When this occurs, the resultant drop in potential at the anode of tube 156, communicated to the grid of tube 157 by capacitance 166, holds tube 157 non-conductive for a period of time dependent upon the time constant of the circuit. Following this action, tube 157 is held non-conductive for a short period of time until the potential across capacitance 166 is readjusted by the partial discharge thereof. However, eventually tube 157 will return to conduction and tube 156 will be cut off to complete the production of a negative pulse at the anode of tube 156. In this connection it should be noted that the capacitance 162 connected to the grid of tube 156 forms no substantial part of a time constant circuit effective to control the duration of this pulse, it being inserted primarily to assist the initiation of conduction in tube 156 at the start of the master pulse.

The anode of tube 156 is coupled to the grid of a gaseous conduction electron tube 167 by means of the coupling and biasing circuit including capacitance 168, resistance 169, resistance 170 and resistance 171. This coupling circuit operates to provide differentiating action by means of the short time constant thereof so that the negative pulse produced at the anode of tube 156 is resolved into a pair of short pulses, the first one of negative polarity and the second of positive polarity. Voltage divider action between resistances 169 and 170, which are series connected between the (minus 200 volt) supply and ground, maintains the grid of tube 167 sufficiently negative with respect to the cathode thereof to prevent conduction therein except upon occurrence of the positive portion of the differentiated signal. This positive signal unblocks tube 167 to permit conduction by the anode circuit thereof.

Tube 167 has its anode connected to the (plus 400 volt) power supply through a series circuit consisting of resistance 172, resistance 173, and the anode circuit of an electron tube 174, resistance 173 being connected to the cathode of tube 174 while the anode of tube 174 is directly connected to the (plus 400 volt) power supply. The anode of tube 167 is additionally coupled to the grid of tube 174 by means of the coupling circuit consisting of capacitance 175 and resistance 176 and is shunted to ground by means of the capacitance 177. The cathode of tube 167 is directly connected to ground.

The circuit thus described, including tubes 167 and 174, is a second form of linear or "constant current" sawtooth voltage generator wherein a sawtooth signal of a very linear character is produced across the capacitance 177. Capacitance 177 is charged through the series circuit including tube 174 and resistances 173 and 172. Discharge of capacitance 177 is provided by the gaseous conduction electron tube 167. The resistance 173 is primarily a biasing resistance for tube 174, operative to maintain the cathode of tube 174 positive with respect to the grid thereof, so that in a static condition tube 174 has an appreciable amount of anode resistance. In operation as a sawtooth generator, as the potential across capacitance 177 rises during the charge thereof, this rise in potential is communicated to the grid of tube 174 to produce a decrease in the effective plate resistance of the tube. The result is a decrease in the time constant of the charge path of capacitance 177 which opposes the tendency toward the decrease in the charging current as the potential across capacitance 177 approaches (B plus) potential. This circuit thus operates as a constant current charge circuit effective to produce a sawtooth voltage waveform across capacitance 177 that has a high degree of linearity.

The sawtooth waveform thus produced is employed as a variable biasing signal for a plurality of switch circuits to control the instants of time relative to the occurrence of the master pulse at which these switch circuits are unblocked to generate pulses on their own accord. These switch circuits are shown in Fig. 5 and are identified as the pulse shifters 178, 203, 204 and 205. Each of the pulse shifters includes the circuitry shown in detail in block 178 only. This circuitry includes the two triode type electron tubes 179 and 180. The grid of tube 179 is connected to receive the sawtooth signal produced across capacitance 177 through a cathode follower isolating tube 181. Tube 181 thus has its grid connected to capacitance 177, its anode connected to the (plus 400 volt) power supply, and its cathode connected to the (minus 200 volt) power supply through resistance 182.

The grid of tube 179 is connected directly to the cathode of tube 181. The anode of tube 179 is connected to the (plus 200 volt) power supply through resistance 183 while the anode of tube 180 is similarly connected to the (plus 200 volt) power supply through resistance 184. The cathodes of tubes 179 and 180 are connected together and to an adjustable resistance cathode biasing circuit including the series connected tubes 185 and 186. In this biasing circuit the cathodes of tubes 179 and 180 are connected to the anode of triode tube 185. The cathode of tube 185 in turn is connected to the anode of a gas diode voltage regulator tube 186. In turn the cathode of tube 186 is connected to the (minus 200 volt) power supply. Additionally the cathode of tube 185 and the anode of tube 186 are connected to ground potential through voltage dropping resistance 187, and are coupled to the grid of tube 185 through capacitance 188. In this connection it may be stated that capacitance 188 is a filter capacitance operative to absorb or prevent rapid variations of potential between the grid of tube 185 and the cathode thereof.

Control of the D.-C. potential of the grid of tube 185 is provided by means of a voltage divider circuit including the series connected resistances 189, potentiometer 190 and resistance 191 connected in series between ground and the (minus 200 volt) power supply. The adjustable tap of potentiometer 190 is connected to the grid of tube 185. Thus by adjustment of the grid potential it is possible to vary the effective D.-C. resistance of the anode circuit of tube 185 to provide for a given current flow therethrough, and adjustment of the potential at the common connection of tubes 179 and 180. To complete the switch circuit of tubes 179 and 180, the grid of tube 180 is connected to the anode of tube 179 through a variable resistance 192 which is by-passed by capacitance 193. Further, the grid of tube 180 is connected to the (minus 200 volt) power supply through resistance 194.

In this circuit the stable conductive condition is that wherein tube 180 is conductive and tube 179 cut-off. This condition will prevail in the low voltage or initial portions of the sawtooth signal as long as the sawtooth signal from capacitance 177 causes the grid of tube 179 to be kept at a low potential, holding tube 179 cut off. This situation changes, however, when the rising sawtooth potential developed across capacitance 177 reaches a point which raises the potential at the grid of tube 179 sufficiently to permit conduction by tube 179.

When this occurs the resultant drop in potential across resistance 183, communicated to the grid of tube 180, drives tube 180 below cut-off so that the potential at the anode thereof rises substantially to that of the (B plus) potential (of 200 volts.) This situation will continue for the balance of the time duration of the cycle of the rising portion of the sawtooth voltage produced across capacitance 177, and tube 179 remains conductive as a result of the elevated potential at the cathode of tube 181. Upon occurrence of the fly-back of the sawtooth waveform produced across capacitance 177, however, the potential at the grid of tube 179 drops to a low negative value so that tube 179 is cut off which produces a resumption in conduction of tube 180. The instant in time relative to the start of the rising portion of each cycle of the sawtooth waveform across capacitance 177 at which tube 179 becomes conductive is determined by the anode resistance of tube 185; for example, when this resistance is large the cathodes of tubes 179 and 180 are held at a high potential because of the IR drop across the anode resistance of tube 185 so that the sawtooth voltage must rise to a relatively high potential to permit conduction by tube 179.

The anode of tube 180 is coupled to an output pulse producing tube 195, which is a gaseous conduction triode tube such as a thyratron, by means of the circuit including capacitance 196 and resistances 197, 198 and 199. The time constants involved in connection with capacitance 196 are of short duration so that this circuit is in effect a differentiating circuit which supplies a short positive pulse to the grid of tube 195 in coincidence with the interruption of conduction in tube 180. Additionally, voltage division between resistances 197 and 198 connected between the (minus 200 volt) power supply and ground provides greater than cut-off bias for tube 195 while resistance 199 provides current limiting action to prevent the flow of excessive grid current in tube 195.

The pulse output tube 195 has its anode connected to the (plus 200 volt) power supply through resistance 200 and shunted to ground through capacitance 201. The cathode of tube 195 is connected to ground through resistance 202. The output pulse signal is obtained from the cathode of tube 195. This circuit then has the appearance of a sawtooth generator. However, no specific use whatever is made of the sawtooth waveform produced at the anode of tube 195, the capacitance 201 and resistance 200 being employed to produce an extinction in the conduction by tube 195 following closely upon the initiation of conduction therein, the sizes of resistances 200, 202, and capacitance 201 being selected to obtain a desired output pulse duration and amplitude.

In the overall circuit, pulse shifters 203, 204, 205, etc., would be identical with that shown in block 178, however they would be adjusted by means of their respective equivalents of potentiometer 190 to individually produce pulses at subsequent intervals of time of 0.9 millisecond duration. Thus, following the leading edge of the master pulse, a positive pulse of 0.9 millisecond duration will occur in line 206 which will be followed immediately by a similar pulse of 0.9 millisecond duration in line 207, which in turn will be followed by a sequence of 0.9 millisecond pulses in lines 208 and 209.

The output signals obtained in lines 206, 207, 208, and 209 are combined into a single output line by means of the adding and combining circuits shown in Fig. 6. This circuit of Fig. 6, although basically a component of the function generator 26 has its counterpart in each of the function generators 27, 28, 29, 30 in the block diagram of Fig. 1, and the circuitry of Fig. 6 therefore would be duplicated to appear in each function generator 26—30.

Signal addition is provided by means of the pentode type electron tubes 210, 211, 212, and 213 which have their control grids connected to lines 206, 207, 208, and 209, respectively, through potentiometers 214, 215, 216, and 217, respectively. Thus with adjustment of the potentiometers it is possible to select any percentage of the amplitude of the output signals appearing on lines 206, 207, 208, and 209 to be employed for mixing. The anodes of tubes 210, 211, 212, and 213 are connected together and to a (B plus) potential of 400 volts through resistance 218. Likewise, the screen grid electrodes of the pentode tubes are connected together and to a suitable potential source such as the (plus 75 volt) potential as indicated. The cathode of each tube is connected to ground by means of the individual resistances 219, 220, 221, and 222. Additionally the suppressor grid of each tube is connected directly to the associated tube cathode. With this circuit the time spaced signals in the separate lines 206, 207, 208, and 209 are combined into a single line being developed across the anode load resistance 218. This single signal, depending upon the adjustment of the input potentiometers, may be made to appear as one long pulse of uniform amplitude, or as a pulse having a plurality of various amplitude portions thereof of 0.9 milli-seconds duration.

The common anode connection of tubes 210, 211, 212, and 213 is coupled to the grid of tube 226 by means of a coupling circuit including resistance 223, potentiometer 224, and resistance 225 which are connected in series in a D.-C. coupling circuit with one end of resistance 225 connected to the (minus 200 volt) power supply. The adjustable tap of potentiometer 224 is connected to the control grid of the pentode type electron tube 226. Additionally the control grid of tube 226 is coupled to the common anode connection by means of capacitance 227. Tube 226, although shown as being of the pentode type, is actually connected as a triode in this circuit inasmuch as the anode and screen grid electrodes are connected together and to the (plus 400 volt) power supply through resistance 228 while the cathode and suppressor grid are connected together and to the (minus 200 volt) supply through resistance 229 which is by-passed by capacitance 230. The anode of tube 226 is connected to the grid of the triode electron tube 231 which is connected in a cathode follower type circuit. Connection is made through the series configuration of resistance 232, potentiometer 233, and resistance 234 which are connected between the anode of tube 226 and the (minus 200 volt) power supply. Additionally, the grid of tube 231 is connected to the tap of potentiometer 233 and is coupled by capacitance 235 to the anode of tube 226.

The anode of tube 231 is connected to the (plus 400 volt) power supply while the cathode of that tube is returned to the (minus 200 volt) power supply through a resistance 236. The circuitry associated with the tubes 226 and 231 is primarily a D.-C. voltage level selecting, inverting, and isolating circuit operative to convert the negative signals produced across resistance 218 into positive signals and supply them through a low impedance output circuit at a selected D.-C. level of zero volts into line 237. The potentiometers 224 and 233 provide a measure of amplitude adjustment; however, their primary function is that of control of the D.C. level of the output signal in line 237.

With reference now to Fig. 8 of the drawing, a schematic diagram is shown of a keyed waveform integrator circuit the purpose of which is to shape the combined pulse output from the adder circuit of Fig. 6 into exponential curves which accurately duplicate the outline of the structures such as ship hulls to be analyzed.

To this end the output line 237 which contains the combined signals is connected to the anode of a gating tube 238. The cathode of tube 238 is connected to ground through variable resistance 239 and variable capacitance 240. Resistance 239 and capacitance 240 form an integrator circuit the output of which is obtained across capacitance 240 and is of an exponential character. Control of the conductivity of tube 238 is provided by a rather complex circuit arrangement which is keyed by the master pulses obtained from the master timing unit (Fig. 4) in line 241. In this circuit, master timing pulses are applied across input potentiometer 242 which permits selection of the amplitude thereof utilized for the gating tube control circuits. The variable position tap of potentiometer 242 is connected to the control grid of a discharge tube 243 which is of the triode gas-filled variety, such as a thyratron.

Tube 243 forms a part of a linearized sawtooth generator circuit which includes capacitance 244, resistance 245 and the anode resistance of tube 246. The function of this circuit is to produce at the anode of tube 243 a recurrent linear sawtooth signal having a repetition frequency equal to that of the master pulses.

The adjustable tap of potentiometer 242 is connected to the grid of tube 243 by the circuit comprising capacitances 247 and 248, and resistances 249, 250, 251, 252, and 253. Capacitance 247 forms with resistance 250, a short time constant circuit for differentiating the input master pulses of positive polarity to produce therefrom first and second sharp "spikes" of positive and negative polarity, respectively. The positive spike is utilized to initiate conduction in tube 243 by driving the grid of tube 243 above the greater than cut-off biasing voltage maintained thereon by voltage division between resistances 252 and 253 which are placed in series between ground and the (minus 200 volt) power supply. Resistance 249 is a limiting resistance inserted to prevent the flow of excessive grid current in tube 243. Resistances 255 and 256 provide additional biasing voltages for tube 243 as well as for tube 271 which will be subsequently described.

The anode of tube 243 is connected to the cathode of tube 246 through resistance 245. In turn, the anode of tube 246 is connected to the (plus 200 volt) power supply. Grid voltage for tube 246 is provided by means of a battery indicated by the numeral 254 connected in the polarity indicated between the anode of tube 243 and the grid of tube 246. Capacitance 244 which preferably is adjustable as shown is connected between the anode of tube 243 and the cathode thereof. The cathode of tube 243 is connected to the (minus 200 volt) power supply through the series circuit consisting of resistances 255 and 256. The juncture point between resistances 255 and 256 is connected to the common juncture point between resistances 250, 251, 252, and 253 in the previously mentioned grid circuit of tube 243. Additionally the cathode of tube 243 is connected to ground by means of a resistance 257, which is by-passed to ground by capacitance 258.

The anode of tube 243 is connected to the control grid of a triode electron tube 259 which is employed as a keying tube for tube 260. This latter tube forms with tube 261 an Eccles-Jordan trigger circuit having two stable conductivity states. The cathode of tube 259 is connected to ground whereas the anode thereof is connected to the grid of tube 260.

In the trigger circuit of tubes 260 and 261 the grid of tube 260 additionally is connected to the (minus 200 volt) power supply through resistance 262 and to the anode of tube 261 through a network consisting of resistance 263 in shunt with capacitance 264. Similarly, the grid of tube 261 is connected to the (minus 200 volt) power supply through resistance 265 and is connected to the anode of tube 260 through a coupling network consisting of resistance 266 which is shunted by capacitance 267.

The anode of 260 is connected to the (plus 200 volt) power supply through resistance 268 whereas the anode of tube 261 is connected to the same potential through resistance 269. The cathodes of tubes 260 and 261 are connected together and are returned to ground through resistance 270. This circuit is therefore seen to be an Eccles-Jordan circuit of conventional design but which includes an additional element, capacitance 270A, connected between the anode and the grid of tube 261 to provide a slight negative feedback to introduce a slight delay in the circuit switching action in one direction.

A second keying tube (271) is employed for the Eccles-Jordan circuit of tubes 260, and 261. Tube 271 has its anode connected to the grid of tube 261, its cathode connected to ground, and its grid connected to the multiple juncture point of resistances 250, 251, 252, 253, 255 and 256.

The combined operation of these circuits of Fig. 8 thus far described is to initiate conduction in tube 271 upon occurrence of each master pulse bringing the trigger circuit into a condition wherein tube 260 is conductive and to terminate conduction in tube 260 after a selected time delay as controlled by capacitance 244. This action provides a pulse at the anode of tube 260 of negative polarity which begins in coincidence with the master pulse and which ends at a selected later instant in time.

The anode of tube 260 is coupled to the control grid of a triode electron tube 272 which is connected in a cathode follower assisted pulse inverting circuit. This coupling to the grid of tube 272 is made by way of capacitance 273 and resistance 274 which form a conventional grid coupling circuit. The anode of tube 272 is connected to the (plus 400 volt) power supply through the series circuit consisting of resistance 275, resistance 276 and triode electron tube 277. One end of resistance 276 is connected to the cathode of tube 277 whereas the anode of tube 277 is connected to the (plus 400 volt) power supply.

The anode of tube 272 is coupled to the grid of tube 277 by means of capacitance 278 whereas the D.-C. return for the grid of tube 277 is provided by the resistance 279 connected to the juncture point between resistances 275 and 276. The cathode of tube 272 is connected to the (minus 200 volt) power supply through resistance 280 which is by-passed by capacitance 281.

Since the input pulse applied to the grid of tube 272 is of negative polarity starting in coincidence with the master pulse, the resultant pulse developed at the anode of tube 272 will be of a positive polarity. It is necessary that the sharp character of the leading edges of this pulse be retained to provide proper operation of succeeding circuits. To this end, the cathode follower assisting tube 277 is provided to sharpen up the edges of the output pulse. This is attained by making tube 277 effectively a variable load resistor for tube 272 which is of low impedance during the pulse and of high impedance at other times.

The anode of tube 272 is connected directly to the grid of tube 238 which, as has been previously described, is a gating tube which controls the application of positive charging pulses to the integrator circuit of resistance 239 and capacitance 240. In this circuit it is necessary to have very accurate and close control of the D.-C. potential of the grid of tube 238 for which purpose the circuitry associated with the diode electron tube 282 and the triode electron tube 283 is provided. This circuit is essentially a form of voltage regulator circuit which is operative to maintain a substantially constant potential at the common cathode connection between tubes 282 and 283 irrespective of any variations in current flow through tube 282. In this circuit the anode of tube 283 is connected direct to the (plus 400 volt) power supply while the grid of tube 283 is connected to a tap on a voltage divider connected between the (plus 200 volt) power supply and the (minus 200 volt) power supply. This voltage divider comprises the potentiometer 284 connected in series with the resistance 285. Adjustment of the variable tap of potentiometer 284 makes it possible to adjust the potential at the grid of tube 283 over a wide range. The cathode of tube 283 is connected to the (minus 200 volt) power supply through resistance 286 and as has been previously mentioned is also connected to the cathode of tube 282. Thus by action akin to that of a cathode follower, tube 283 maintains a substantially constant D.-C. potential at the cathode of tube 282 as controlled by the setting of potentiometer 284.

The anode of tube 282 in turn is connected to the anode of tube 272 thus, whenever the potential at the anode of tube 272 rises above that maintained at the cathode of tubes 282 and 283, tube 282 becomes conductive to provide an effective clamping action to place a limit upon the maximum positive potential which the anode of tube 272 can attain.

This control circuit for tube 238 thus provides a gating action which unblocks tube 238 for a selected interval of time following the occurrence of each master pulse so that if anode potential is supplied to tube 238 from tube 231 of Fig. 6, a charging of capacitance 240 will take place. This arrangement is necessary to provide a means for controlling the time at which the generation of each section of the hull outline starts and to provide for example the variation between the sections of Figures 2-D and 2-E which start at a different point relative to the keel line (master pulse).

Charging of capacitance 240, thus controlled, provides the signal which represents the hull up to the deck line. The deck line itself is inserted by a controlled discharge of capacitance 240 through tube 290. In this discharge circuit, tube 290, cooperative with tube 287 and associated circuitry, provides a "linearized" or constant current discharge path for capacitance 240 to simulate a deck line having a uniform downward slope away from the center of the hull as would normally be employed for purposes of shedding water. Control of the slope of the deck line is provided by adjustment of the resistance of the discharge path of capacitance 240 effected by means of the potentiometer 291 connected between ground and the (minus 200 volt) power supply, with the variable tap thereof connected to the grid of tube 290.

The anode of tube 290 is connected to the juncture between the cathode of tube 238 and resistance 239. The cathode of tube 290 is connected to the (minus 200 volt) power supply through resistance 292 and to the cathode of tube 287 through resistance 293. Resistance 239 is shunted by diode electron tube 295, the anode of which is connected to capacitance 240 and the cathode of which is connected to the anode of tube 290. Thus capacitance 240, which is charged from ground toward a positive potential by conduction through tube 238 and resistance 239, is discharged toward a negative potential by conduction through tubes 295 and 290. The potential across capacitance 240 is clamped, however, by means of the diode electron tube 294 connected thereacross to prevent capacitance 240 from being charged in a negative polarity. The anode of tube 294 is connected to ground while the cathode of tube 294 is connected to the juncture between resistance 239 and capacitance 240, as well as to the grid of tube 287.

The output signal which is obtained across capacitance 240 is delivered through a cathode follower circuit including the triode electron tube 287. To this end the grid of tube 287 is connected to the juncture between resistance 239 and capacitance 240. Additionally the anode of tube 287 is connected to the (plus 400 volt) power supply while the cathode is connected to the (minus 200 volt) power supply through potentiometer 288. From the tap point of the potentiometer 288 is obtained the output signal which is supplied to line 289. Potentiometer 288 is primarily a D.-C. voltage level control, by adjustment of which it is possible to set the zero signal equal to ground potential.

In this circuit tube 290 is at least lightly conductive at all times, however, its conductivity is less than that of tube 238 during the charge time of capacitance 240 so that no difficulty occurs. This situation is further assisted by the connection between the cathodes of tube 287 and 290 which provides bias for tube 290 during the charge time to reduce the conductivity of tube 290.

The output signal thus obtained in line 289 from the cathode follower output tube 287 is the basic function which is referred to as $y_i$ in the preceding equations. This basic function can be made to reproduce any desired curve such as the ship outline or cross section at any point by manipulating the various controls heretofore described, particularly the integrator components 239 and 240. To this end it is practically essential that an oscilloscope which may be of conventional design and which may be synchronized to the master pulses be connected to line 289 to observe the generated waveform so that the controls may be manipulated to produce the desired slopes. It should be borne in mind however, that a separate oscilloscope 293 is not necessarily required for each function generator 26, 27, 28, 29 and 30, it being satisfactory for example if a single oscilloscope be employed for the entire computer apparatus, provided that suitable switching or other forms of input signal selection be available. This arrangement would permit individual setting of each function generator to the desired outline for that section.

To summarize the description of the overall schematic diagram which has been covered thus far, the components of Figs. 4 and 5 are properly identified as being located in the master timing unit 25 of the block diagram in Fig. 1 while the components located in a function generator such as generators 26-30, but generator 26 specifically, are shown in the schematic diagrams of Figs. 6 and 8.

Fig. 7, which is a block diagram, is mainly a repetition of the blocks 27, 28, 29, 30, 32, 33, 34 and 35 in the overall block diagram of Fig. 1. However, additional details are shown in Fig. 7 in particular with regard to the components within the individual blocks 27, etc., and showing all of the interconnections of these components, several of which were shown generally in Fig. 1 to avoid undue circuit complexity. For example, blocks 27, 28, 29 and 30 are shown as including an adder which would be identical to that shown in schematic form in Fig. 6 as well as an integrator such as that shown in schematic form in Fig. 8.

With this arrangement it is possible to separately generate the ship outline functions, $y_i$ for each of the 5 selected stations. It should also be noted with regard to Fig. 7 that whereas Fig. 1 shows merely a single connection between the master timing unit and the blocked components 26 through 35 actually there are as many separate output lines as there are pulse shifted signals in the output of the master timing unit and additionally there is a line to convey the master pulses themselves.

In the typical circuit selected for Fig. 5, four separate pulse shifted outputs were chosen. However, in an actual circuit as many as 10 and even more separate pulse shifters may be employed.

The basic function $y_i$ as obtained in line 289 is employed in the production of both the negative and the positive functions $y_n$ and $y_p$ previously mentioned in connection with the equations. Since the positive function $y_p$ has its water line location dependent upon the termination of the water line of the negative function $y_n$, it is necessary that the apparatus producing the positive function $y_p$ receive a signal regarding the time of intersection of the line 37 with the base line 0 in Fig. 3. For this reason it is best to describe the apparatus which produces the negative function from the basic function prior to the description of the apparatus which produces the positive function and for this purpose reference is now made to Figs. 12 and 13 of the drawings which will be explained concurrently.

In Fig. 12 the generated function $y_i$ as obtained from the line 289 in the previously described apparatus of Fig. 8 is applied through coupling capacitance 294 to appear across potentiometer 295, the lower end of which is connected to the (minus 200 volt) power supply. The variable position tap of potentiometer 295 is connected to the grid of a triode type electron tube 296 which tube, together with a second triode electron tube 297, forms a cathode coupled type of amplifier circuit in which the output signal retains the same polarity as the input signal. In this circuit the anode of tube 296 is connected to ground and the cathodes of tubes 296 and 297 are connected together and returned to the (minus 200 volt) power supply through the series connected resistance path including resistance 298, variable resistance 299 and fixed resistance 300. The grid of tube 297 is connected to the junction point between variable resistance 299 and fixed resistance 300 through a resistance 301. The anode of tube 297 is connected to the (plus 200 volt) power supply through resistance 302.

The anode of tube 297 is direct connected to the grid of a cathode follower tube 303. Tube 303 has its anode connected to the (plus 200 volt) power supply and its cathode connected to the (minus 200 volt) power supply through the series connection of resistances 304 and 305. Additionally the grid of tube 303 is clamped in such a manner as to prevent the excursion thereof below ground potential by the diode electron tube 306. The cathode of tube 306 is connected to the grid of tube 303 while the anode of tube 306 is connected to ground. By virtue of this connection, whenever there is any tendency of the grid of tube 303 to fall below ground potential, tube 306 becomes conductive to forestall such action.

The cathode follower circuit, including tube 303, is effectively a signal varying anode power source for the succeeding electron tube 307. The anode of this tube 307 is connected to the juncture between resistances 304 and 305 in the cathode circuit of tube 303 through a signal developing load resistance 308. The cathode of tube 307 is connected to the (minus 200 volt) power supply through resistance 309. In this circuit then, the anode supply potential for tube 307 is not of a D.-C. nature as is customary but rather is the amplified signal $y_i$ itself.

In the normal state of affairs tube 307 is held non-conductive by virtue of a low potential applied to the grid thereof through line 310 which is obtained from the circuitry of Fig. 13 which will be described presently. When tube 307 is rendered conductive by the removal of this biasing potential, the potential at the anode of tube 307 drops to a low value very rapidly because of the current limiting action of resistance 308, however, the anode of tube 307 is prevented from falling below ground potential at this time by virtue of the connection thereof to the cathode of a diode type clamping tube 311 whose anode is connected to ground. Tube 311 therefore will normally become conductive almost simultaneously with tube 307 to supply at least a portion of the anode current requirements for tube 307 and thereby prevent the anode of tube 307 from dropping below ground potential. The time instant at which tube 307 is rendered conductive corresponds to that indicated in Fig. 3 as the conclusion of the interval $t_3$ or that at which the water line of the negative function $y_n$ as represented by line LM intersects the basic function line $y_i$. Control of the duration of this time interval $t_3$ is provided by the circuitry of Fig. 13 to which reference is now had.

The apparatus of Fig. 13 is synchronized in operation by means of the master pulses from the master timing unit of Fig. 4 which are delivered to the apparatus of Fig. 13 by the line therein identified by the numeral 312. These master pulse signals are applied across potentiometer 313 which is connected between line 312 and ground. An adjustable percentage of these master pulse signals is taken from the tap of potentiometer 313 and applied to a time delay means such as the sawtooth generator circuit including tube 314. Application is to the grid of a gaseous conduction triode type electron tube, such as a thyratron, indicated by the numeral 314. The coupling circuit involved is that of capacitance 315 and resistances 316, 317, and 318, all three of which, as well as capacitance 315, have a common terminal. One terminal of resistance 316 goes to the grid of tube 314, one terminal of the resistance 317 goes to ground, whereas one terminal of resistance 318 goes to the (minus 200 volt) power supply. Voltage divider action which therefore results between resistances 317 and 318 provides bias for tube 314 which is sufficient to hold tube 314 non-conductive. Resistance 316 is a resistance which is inserted for the purpose of preventing the flow of excessive grid current in tube 314. The time constant of the coupling circuit associated with capacitance 315 is small hence the master pulses are differentiated thereby to produce the familiar alternate positive and negative spikes, or pulses of short duration, wherein the first pulse is of a positive character because of the fact that the master pulses themselves are of positive polarity.

Tube 314 is a component of a linearized sawtooth generator circuit employed as an adjustable time delay means which includes the capacitance 319 placed in shunt with the anode circuit of tube 314. The anode of tube 314 is connected to the (plus 400 volt) power supply through the series circuit comprising resistances 320 and 321 and the anode circuit of tube 322. The anode of tube 314 is further coupled to the grid of tube 322 through capacitance 323. The D.-C. return for the grid of tube 322 is provided by resistance 324 which is connected to the junction between resistances 320 and 321. The cathode of tube 314 is connected to ground. In this circuit therefore, following the discharge of capacitance 319 through tube 314 resultant to the ionization thereof responsive to the occurrence of a master pulse, an exponential charge of capacitance 319 occurs through the series circuit including tube 322 and resistances 321 and 320. The charging current for capacitance 319 is maintained constant; however, by virtue of the action of tube 322. This type of circuitry has previously been described in the specification in considerable detail so it is sufficient at this point to state that tube 322 provides a variable resistance action which is high during the initial portions of the charge period of the capacitance and low during the later portions to compensate for the reduction in the applied charging potential for capacitance 319 as the charge thereon accumulates. The resultant action of this circuitry is to produce a sawtooth waveform at the anode of tube 314 which is of a highly linear nature and which may be employed for selective unblocking of a gating circuit for control of time delay to establish the duration of the time interval $t_3$.

The anode of tube 314 is connected to the grid of a keying tube 325 which is provided for a trigger circuit which includes the electron tubes 326 and 327. The anode of tube 325 is connected to the (plus 400 volt) power supply while the cathode of tube 325 is connected to the (minus 200 volt) power supply through resistance 328. The cathode of tube 325 is connected to the grid of tube 326 through a single pole, double throw switch 680 which will be discussed at length at a subsequent point in the specification but which for the present may be considered as being in the position shown.

The anode of tube 326 is connected to the (plus 200 volt) power supply through a signal developing load resistance 329 while the anode of tube 327 is connected to the (plus 200 volt) power supply through signal developing load resistance 330. The grid of tube 327 is connected to the (minus 200 volt) power supply through resistance 331 and to the anode of tube 326 through resistance 333 which is by-passed by the capacitance 334. The cathode of tubes 326 and 327 are connected together and returned to a low potential through a cathode resistance path which comprises primarily the anode circuit of electron tube 335, which is effectively a resistance of adjustable magnitude. In this circuit therefore the cathodes of tubes 326 and 327 are connected to the anode of tube 335 while the cathode of tube 335 is connected to ground through a source of regulated voltage obtained at the anode of a voltage regulator tube 336 which as shown is a gas filled diode tube. The cathode of tube 336 is connected direct to the (minus 200 volt) power supply while the anode is connected to ground through resistance 337. This regulator tube connection is effective to maintain a substantially constant potential at the cathode of tube 335 which is positive with respect to the (minus 200 volt) power supply by an amount determined by the characteristics of tube 336 which, for example, may be approximately 105 volts if tube 336 is a VR105–30.

The grid of tube 335 is maintained at a constant but adjustable D.-C. potential by virtue of its connection to a D.-C. voltage regulator circuit wherein a battery 338 provides a constant source of direct current control potential. This battery 338 has its positive terminal connected to ground and its negative terminal connected through single pole, double throw switch 729A which will be discussed at length at a subsequent point in the specification to one end of a potentiometer 339 which has the other end thereof connected to ground. The tap of potentiometer 339 is connected to the grid of a tube 340 which is in a cathode follower type circuit wherein the anode of tube 340 is connected to the (plus 200 volt) power supply and the cathode is connected to the (minus 200 volt) power supply through the series resistance circuit comprising the fixed resistance 341, potentiometer 342 and the fixed resistance 343. The adjustable tap of potentiometer 342 is connected to the grid of tube 335. In this circuit the potential of the grid of tube 335 is therefore adjustable by the manipulation of either potentiometer 339 or potentiometer 342 to provide an effectively adjustable cathode resistor for tubes 326 and 327 which may be varied at will.

In the trigger circuit of tubes 326 and 327 the normal stable state is that wherein tube 327 is conductive and tube 326 is cut off. In the course of production of the sawtooth waveform at the anode of tube 314, the grid of tube 326 is raised in potential to where eventually tube 326 becomes conductive to produce a potential drop at the anode thereof. This potential drop is communicated to the grid of tube 327 to cause that tube to cease conduction.

An adjustment of the time delay with respect to the start of the sawtooth signal at the anode of tube 314 is secured by adjusting the resistance of tube 335 to control the potential at the cathodes of tubes 326 and 327. In this circuit then if the resistance of tube 335 has a high value, the potentials of the cathodes of tubes 326 and 327 will be high in the stable state due to the large voltage drop across tube 335 so that the grid of tube 326 must rise to a high level to produce conduction by that tube. This will occur at a later portion of the sawtooth wave than in a typical different condition where the resistance of tube 335 is a lower value so that a lower positive potential is maintained at the cathodes of tubes 326 and 327 which will permit conduction by tube 326 at an early part of the sawtooth wave generated by the circuit of tube 314.

When the conductive condition of tube 326 is thus established, tube 327 is held non-conductive and tube 326 conductive until the occurrence of the next master pulse at which time the sawtooth potential at the grid of tube 326 drops to a low value, cutting off tube 326.

The result of the operation of the trigger circuit of tubes 326 and 327 is the production at the anode of tube 327 of a positive pulse, the initiation of which is determined by the adjustment of potentiometer 339 or 342 to obtain a variable time delay in the start thereof relative to the master pulse, and which terminates in coincidence with the occurrence of each master pulse. The anode of tube 327 is connected to the grid of a triode type electron tube 344 which is connected in a cathode follower type output circuit to provide positive output pulses with a low impedance circuit. In this circuit the anode of tube 344 is connected to the (plus 400 volt) power supply while the cathode of that tube is connected to the (minus 200 volt) power supply through potentiometer 345. The tap point of potentiometer 345, which is adjustable, is connected to line 310 and therethrough to the grid of tube 307 in Fig. 12 to produce the control of conductivity therein which is required to produce the water line portion of line 37 in the negative function $y_n$. Potentiometer 345 is primarily a D.-C. level control by means of which it is possible to adjust the zero signal potential of line 310 to the zero voltage or "ground" level.

The signal produced at the anode of tube 307 resultant to the two input signals operative at that point, is not that of the negative function $y_n$ as indicated in Fig. 3 but rather includes the portion thereof up to the conclusion of the time interval $t_3$ at which time the potential thereof rapidly falls to that of the base line OG. The sloping line LM is produced by the additional apparatus of Fig. 12 to which reference is now made.

The anode of tube 307 is connected to the grid of a triode type electron tube 346 whose anode is connected to the (plus 200 volt) power supply. The cathode of tube 346 in turn is connected to the (minus 200 volt) power supply through the series connection of resistances 347 and 348. The junction point between resistances 347 and 348 is connected to the grid of a triode type electron tube 349 which is connected in a form of cathode follower circuit having a complex cathode load impedance. The anode of tube 349 is connected to the (plus 200 volt) power supply while the cathode is connected to a plurality of components and potentials but, as far as direct current is concerned, the primary connection is to the (minus 200 volt) supply through the series path consisting of the diode electron tube 350, the triode electron tube 351 and the resistance 352. In this connection the cathode of tube 349 is connected to the anode of tube 350, the cathode of tube 350 is connected to the anode of tube 351, and the cathode of tube 351 is connected to resistance 352. Additionally the cathode of tube 349 is clamped in such a manner that it will not fall below ground potential by means of the diode electron tube 353. Connection thereto is made to the cathode of tube 349 which is shunted to ground by means of the variable capacitance 354.

Triode electron tube 351 in the cathode circuit of tube 349 has its grid connected to an adjustable source of D.-C. potential which is obtained by a voltage divider connected between the (minus 200 volt) power supply and ground comprising the fixed resistances 355 and 356 and the potentiometer 357. Connection of the grid of tube 351 to the tap of potentiometer 357 is made through an isolating resistance 358 which provides a means of developing an A.-C. input signal at the grid of tube 351 as applied through capacitance 359 from another source under certain input conditions. The application of the signal in this latter manner is a variation of the original idea and has not heretofore been discussed. However, it will be discussed in detail at a later point in the specification. It is sufficient for the present to mention, however, that the complete connections to the grid of tube 351 include the coupling capacitance 359 and the potentiometer 360 together with a signal input terminal 360-A. As far as the operation of the circuit for this portion of the discussion is concerned, however, it may be assumed that the capacitance 359 is effectively an open circuit so that the only signal applied to the grid of tube 351 is the D.-C. potential as obtained from potentiometer 357.

In operation then, the circuitry of tubes 346 and 349 reproduce the variation as represented in Fig. 3 along line OL up to the intersection thereof with line LM. At this point (conclusion of time interval $t_3$), tube 346 applies an abrupt potential drop to the grid of tube 349 to interrupt a previously conductive condition therein. This portion of the curve OL up to the occurrence of the intersection thereof with line LM also appears at the cathode of tube 349 in substantially unaltered form. By contrast, however, the cut off of tube 349 does not cause an immediate drop in potential at the cathode of tube 349 because of the presence of capacitance 354 which produces a hangover in potential introducing a sawtooth discharge signal. Capacitance 354, thus charged, discharges through the series path consisting of tube 350 and 351 in series with resistance 352. However, this discharge is prevented from progressing to such a degree that the potential at the cathode of tube 349 drops below ground potential by virtue of the diode clamper tube 353. Control of the time constant of discharge of capacitance 354 and hence the slope of line LM is adjustable by either of two means. One way is by adjustment of the size of capacitance 354, the other is by adjustment of the resistance of the discharge path of capacitance 354 which may be effected by varying the D.-C. potential applied to the grid of tube 351, hence varying the effective anode resistance thereof. Such variation of the grid potential of tube 351 is provided by the potentiometer 357.

The circuit of Fig. 12 includes two additional tubes not heretofore mentioned. The first of these is a triode electron tube 361 which is a form of control tube for the triode tube 307 operative to maintain the cathode of tube 307 at a D.-C. potential which is substantially constant and easily adjustable. Tube 361 is in substantially a cathode follower circuit having a D.-C. control signal as an input thereto. This control signal is obtained from the potentiometer 362 which is connected between the (minus 200 volt) power supply and ground. The tap point of potentiometer 362 is connected to the grid of tube 361. The anode of tube 361 is connected to ground potential, thus the tube 361 will attempt to maintain the cathode of tube 307 at a D.-C. potential which is somewhat below that of ground but, of course, more positive than the (minus 200 volt) power supply. The purpose of this is primarily to provide a readily adjustable means of controlling the potential at the cathode of tube 307 to insure that tube 307 will be cut off during the period at which a negative pulse is produced at the anode of tube 327 in Fig. 13 (tube 327 conductive), and that tube 307 will be driven to conduction during the production of a positive pulse at the anode of tube 327.

The last tube of Fig. 12 is the triode tube 363 which is connected in a cathode follower type output circuit to provide the output signal $y_n$, the negative function, with a low output impedance circuit. In this circuit the cathode of tube 363 is connected to the (minus 200 volt) power supply through potentiometer 364 and to the cathode of tube 351 through a fixed resistance 365. The grid of tube 363 is connected to the cathode of tube 349. The anode of tube 363, in turn, is connected to the (plus 200 volt) power supply. Potentiometer 364 provides a ready means of adjusting the D.-C. level of the output negative function signal to obtain a zero signal level of ground potential at the tap of potentiometer 364. The resistance 365 connecting the cathodes of tubes 351 and 363 provides a form of feedback to vary the potential at the cathode of tube 351 in dependency on the output signal to vary the effective anode resistance of tube 351 during the signal $y_n$ to provide linearization of the sawtooth signal (water line) produced at the cathode of tube 349 by the discharge of capacitance 354.

It should be borne in mind, however, that although the signal obtained at the tap of the potentiometer 364 is called the negative function that this signal is still of a positive polarity, and has the same polarity as the generated function $y_i$. This output signal obtained from potentiometer 364 is the signal represented in Fig. 3 as that starting at point O, varying along line OL up to the junction L of that line with line LM, varying thence along line LM in a manner substantially linearly with time up to the point M where line LM intersects the base line OG at the conclusion of the time interval $t_2$. Control of the duration of the time interval $t_3$ is adjustable by varying either of the potentiometers 339 and 342 in Fig. 13, preferably potentiometer 342, whereas the slope of the line LM is adjustable by either of two means, a variation of capacitance 354, or a variation of grid potential of tube 351 with potentiometer 357.

With reference now to Figs. 9 and 11, these two combined show in schematic form circuitry which may be utilized for the generation of the function which has been previously identified as the positive function $y_p$. The circuits of these two figures follow the same pattern heretofore evolved, being similar in many respects to those of circuits utilized in the production of the negative function $y_n$ by the apparatus in Figs. 12 and 13 which was just described.

With reference now to Fig. 11 in particular, the basic function signal $y_i$ as produced by the apparatus of Fig. 8 and delivered to line 289 thereof is received in Fig. 11 on line 366. These signals are coupled to an input amplitude control potentiometer 367 by means of capacitance 368. The lower end of potentiometer 367 is connected to the (minus 200 volt) power supply.

Input signals obtained in selectable amplitude at the tap of potentiometer 367 are applied to the grid of an electron tube 369 which together with a similar electron tube 370 forms a cathode coupled amplifier circuit which produces amplification wherein the final output signal possesses the same polarity as the input signal. In this circuit the anode of tube 369 is connected to ground while the anode of tube 370 is connected to the (plus 200 volt) power supply through the signal developing load resistance 371. The cathodes of both tubes 369 and 370 are connected together and to the (minus 200 volt) supply through a series resistance connection including the fixed resistance 372, adjustable resistance 373, and fixed resistance 374. The grid of tube 369 is connected to the tap point of potentiometer 367 whereas the grid of tube 370 is connected through resistance 375 to the juncture between resistances 373 and 374. The anode of tube 370 is connected to the grid of a triode type electron tube 376 which is connected in a cathode follower type circuit. The anode of tube 376 is connected to the (plus 200 volt) power supply whereas the cathode of tube 376 is connected to the (minus 200 volt) supply through the series combination of resistances 377 and 378. This circuit of tube 376 provides power amplification and a low impedance output circuit for the $y_1$ signal produced at the anode of tube 370 which is taken in somewhat reduced amplitude at the juncture between resistances 377 and 378.

Additionally, the grid of tube 376 is connected to the cathode of a diode type electron tube 379, the anode of which is connected to ground. This tube is effectively a "clamper" operative to prevent the grid of tube 376 from falling below ground potential. Should any tendency toward this occur, conduction by tube 379 will take place to prevent such an occurrence.

To the juncture of resistances 377 and 378 is connected the anode of a triode tube 380. This connection is made through a resistance 381 which provides a means for isolating tube 380 from tube 376. In this circuit, as in the circuit of tube 307 of Fig. 12, the cathode follower tube 376 and its associated circuitry is the effective signal varying anode power supply for tube 380, as taken from the juncture between resistances 377 and 378 and is representative of the ship outline function $y_i$. Tube 380 is normally non-conductive so that for the most part, the signal at the juncture of resistances 377 and 378 appears unchanged at the anode of tube 380. This condition does not persist for the entire duration of $y_i$; however because at the instant in time at which curve ON of Fig. 3 reaches line 45—46 at the conclusion of the time interval $t_2$, tube 380 is brought to conduction by a signal applied to its grid from the circuitry of Fig. 9 to produce a very material alteration in the waveform thereof. To explain the development and particularly the production of the signal applied to the grid of tube 380, reference is now made to Fig. 9, the apparatus of which operates in response to master pulse signals as obtained from the cathode of tube 126 (Fig. 4) in the master timing unit 25.

The master pulses are applied to Fig. 9 by means of line 382. These input master signals are applied to the series resistance combination of fixed resistance 383 and potentiometer 384, the lower terminal of the latter being connected to ground. The adjustable tap of potentiometer 384 is coupled to the grid of a triode type gaseous conduction electron tube 385, such as a thyratron. This grid connection is made through the coupling circuit consisting of capacitance 386 and resistances 387, 388 and 389. This circuit is a combined coupling, biasing, and differentiating circuit wherein the resistance 387 is connected to the grid of tube 385, one end of resistance 388 is connected to ground, and one end of resistance 389 is connected to the (minus 200 volt) power supply. In this circuit, bias is provided for tube 385 by voltage divider action between ground and (minus 200 volts) produced across the series connected resistances 388 and 389.

Resistance 387 is a grid current limiting resistance to prevent the flow of excessive grid current in tube 385 during periods of conduction thereby. Differentiation is obtained by means of the short time constant of the circuits involved including capacitance 386. Differentiation produced thereby delivers to the grid of tube 385 a first positive pulse of short duration followed by a negative pulse of similar duration resultant to each positive master pulse obtained in line 382.

The bias voltage supplied to the grid of tube 385 is sufficient to maintain that tube normally non-conductive; however, the positive spike applied thereto in coincidence with the leading edge of the master pulse unblocks tube 385 to permit an initiation of conduction therein. The gas tube 385 forms a part of a linearized sawtooth generator, of a form which has been described previously, wherein the charging capacitance is identified by the numeral 390, and the charging resistance is that provided by the series combination of resistance 391, resistance 392 and triode electron tube 393. In this circuit the anode of tube 385 is connected to one end of resistance 391 while the other end of resistance 391 is connected to one end of resistance 392. The second end of resistance 392 is connected to the cathode of tube 393 whereas the anode of tube 393 is directly connected to the (plus 400 volts) power supply. The anode of tube 385 is coupled by means of a capacitance 394 to the grid of tube 393, this grid having its D.-C. return path provided by resistance 395 connected to the junction point of resistances 391 and 392. Additionally, the anode of tube 385 is shunted to ground by the time constant capacitance 390, and the cathode of tube 385 is connected to ground through reistance 396. This circuit then is a linearized sawtooth generator wherein the conductivity of tube 393 is varied during the charge cycle of capacitance 390 to alter the resistance through which capacitance 390 charges, varying thereby the time constant of the charge path of capacitance 390 to attain a condition of constant current flow, which is necessary to the production of a linear sawtooth voltage waveform. This type of circuit has been described to such an extent, heretofore, that any further description thereof is unnecessary at this point.

The anode of tube 385 is connected to the grid of a triode tube 397 which is connected in a cathode follower circuit. In this circuit the anode of tube 397 is connected to the (plus 400 volt) power supply while the cathode of this tube is connected to the (minus 200 volt) power supply through resistance 398.

The cathode follower circuit of tube 397 is a keying circuit for the subsequent trigger circuit which includes tube 399 and 400. In this circuit the cathode of tube 397 is directly connected to the gird of tube 399. The grid of tube 400 on the other hand is connected to the anode of tube 399 through resistance 401 which is by-passed by capacitance 402 and to the (minus 200 volt) power supply through resistance 403. The anode of tube 399 is connected to the (plus 200 volt) power supply through a signal developing load resistance 404 while the anode of tube 400 is connected to the same (plus 200 volt) power supply through a signal developing load resistance 405. The cathodes of tubes 399 and 400 are connected together and returned to a negative potential through an adjustable resistance circuit which includes primarily the triode type electron tube 406. For this purpose the cathodes of tubes 399 and 400 are connected to the anode of tube 406 while the cathode of tube 406 is connected to the anode of a gas diode voltage regulator tube 407, the cathode of which is connected to the (minus 200 volt) power supply. The common connection between the cathode of tube 406 and the anode of tube 407 is connected to ground through voltage dropping resistance 408. Additionally, an adjustable D.-C. biasing circuit for the grid of tube 406 is provided by the potentiometer 409 and resistance 410 which are series connected between the (minus 200 volt) power supply and ground.

In addition to the D.-C. bias control for the grid of tube 406, a variational signal input is provided for the grid of this tube comprising an input terminal 411, potentiometer 412, which is connected between terminal 411 and ground, and a coupling capacitance 413 which is connected to the grid of tube 406. To assist in the development of a variational signal at the grid of tube 406, the isolating resistance 414 is interposed between the tap of potentiometer 409 and the grid of tube 406. In this cathode circuit, therefore, the diode regulator tube 407 will operate to sustain a constant potential at the cathode of tube 406 which, for example, may be typically 105 volts positive with respect to the (minus 200 volt) power supply. Tube 406 will then become a variable resistance of a magnitude readily controllable by potentiometer 409 to control the potential of the cathodes of tubes 399 and 400 and, thereby, control the point on the sawtooth signal produced across capacitance 390 at which tube 399 becomes conductive.

When tube 399 is unblocked by the sawtooth signal as applied from the cathode of tube 397, the previously and normally conductive tube 400 is cut off as a result of the negative signal applied to the grid of tube 400 from the anode of tube 399. At this instant upon the cut off of the tube 400, the anode of tube 400 rises positively to produce the leading edge of a positive pulse.

Following the initiation of conduction in tube 399, the still rising sawtooth signal produced across capacitance 390 holds tube 399 conductive until the conclusion of the sawtooth signal which occurs in coincidence with the start of the next master pulse.

The anode of tube 400 is connected to the grid of a triode electron tube 415 which is connected in a cathode follower low output impedance circuit. In this over-all circuit the anode of tube 415 is connected directly to the (plus 400 volt) power supply, whereas the cathode of tube 415 is connected to the (minus 200 volt) power supply through the series combination of resistances 416 and 417. Output from the circuit of tube 415 may be taken at any convenient point such as the juncture of resistances 416 and 417 and in some instances it may be desirable to replace the two fixed resistances 416 and 417 by a potentiometer to provide a variable tap point for the output signal delivered to line 418. In this particular case, and with consideration for the circuits which follow, it has been found desirable to employ the voltage divider of resistances 416 and 417. Normally the proportion of resistances 416 and 417 is selected to provide a zero signal voltage at the juncture of resistances 416 and 417 which is equal to ground potential.

The signal produced by the apparatus in Fig. 9 as obtained in line 418 is applied to the grid of tube 380 in Fig. 11. At this point this signal is used as a gating signal to control conductivity in tube 380 and is of sufficient amplitude to render tube 380 either heavily conductive or completely non-conductive. When tube 380 is non-conductive the function $y_i$ as obtained from the amplifier tube 376 appears in substantially unchanged form at the anode of tube 380 from whence it is supplied to the grid of a triode type electron tube 419 which is connected in a cathode follower output circuit. Upon occurrence of conduction in tube 380, the low resistance of tube 380 produces a voltage drop across resistance 381. This drop is limited, however, by virtue of the clamping tube 420 which is a diode type electron tube having its cathode connected to the anode of tube 380 and the grid of tube 419 and its anode connected to ground. This tube 420 therefore will become conductive should there be any tendency for the anode of tube 380 to fall below ground potential to supply at least a part of the conductivity requirements of tube 380 and thereby prevent the grid of tube 419 from falling below ground potential. Normally, the apparatus of Fig. 9 would be set to unblock tube 380 after the conclusion of time interval $t_3$ so as to have no effect on the signal $y_i$ as would be obtained at the anode of tube 380.

In the complete circuit of tube 380, the cathode thereof is connected to the (minus 200 volt) power supply through resistance 421. Additionally connected to the cathode of tube 380 is the cathode of a triode type voltage control tube 422 the anode of which is connected to ground. The grid of tube 422 is connected to the tap point of a potentiometer 423 which is connected between the (minus 200 volt) power supply and ground. Thus by adjustment of the tap of potentiometer 423 it is possible to adjust the grid potential of tube 422 which by action similar to that of a cathode follower controls the potential at the cathode of tube 380. The value of this constant potential thus maintained at the cathode of tube 380 is readily and easily adjustable by variation of the potentiometer 423.

The cathode follower output circuit, including triode tube 419, has a resistance 424 connected between the cathode of tube 419 and the (minus 200 volt) power supply. The anode of tube 419 is in turn connected to the (plus 200 volt) power supply. The resultant signal obtained at the cathode of tube 419 with a low impedance appears in line 425 from whence it is applied to the grid of a triode type electron tube 426 by means of capacitance 457. This signal is equal to the basic function $y_i$ from which must be subtracted a linear sawtooth signal of line 45—46 (Fig. 3) which begins at a voltage equal to that of the function $(y_i)$ at the end of the time interval $t_2$. Subtraction is provided by constant current discharge apparatus for the capacitance 457. This discharge is controlled by means of a signal obtained from a rather complex lineup of tubes responsive to two signals obtained from the previously discussed circuitry which produced the negative functions as contained in Figs. 12 and 13. The two signals are first, the signal regarding the conclusion of time interval $t_3$ of the negative function which is supplied from the cathode of tube 344 of Fig. 13 to the grid of tube 427 through resistance 428. The second of these signals is the negative function $y_n$ itself which is supplied from potentiometer 364 of Fig. 12 direct to the control grid of triode electron tube 429 of Fig. 11.

In Fig. 11 the circuit including the triode electron tube 427 additionally contains a potentiometer 430 connected between the (plus 200 volt) power supply and ground. To the tap point of potentiometer 430 is connected the cathode of tube 427 making possible the control of the potential at the cathode of tube 427 so that conductivity thereof may be controlled. The anode of tube 427 is connected to the (plus 400 volt) power supply through a signal developing load resistance 431.

The signal supplied to the grid of tube 427 is of a gating character, it being of a low potential during the time interval $t_3$ and high at all other times. Thus responsive to this signal, tube 427 is held non-conductive during the time interval $t_3$ but is conductive exclusive of this time interval. As a result of the signal inversion produced by tube 427, a signal is obtained at the anode thereof which has a high positive value during the interval $t_3$ and a lower value in other periods of time.

The anode of tube 427 is connected to the grid of a triode electron tube 432 which is connected in a multiple input cathode follower circuit. The connection of the anode of tube 427 to the grid of tube 432 is made with the assistance of the D.-C. level controllable coupling circuit including the resistances 433, 434 and 435, triode electron tube 436, and potentiometer 437.

In this circuit the resistance 433 is connected between the anode of tube 427 and the grid of tube 432. The resistances 434 and 435 are connected in series and placed between the anode of tube 427 and the (minus 200 volt) power supply. Electron tube 436 has its anode connected to the grid of tube 432 and its cathode connected to the junction of resistances 434 and 435. The grid of tube 436 is connected to the tap of a potentiometer 437 which is connected between the (minus 200 volt) power supply and ground. In this circuit tube 436 is primarily an adjustable resistance to control by voltage divider action the potential at the grid of tube 432.

The tubes 432 and 429 provide a form of mixing circuit having a low output impedance wherein the output signal is dependent upon the more positive one of two input signals only, whichever it may be, rather than on a combination of the input signals. In this circuit the cathodes of tubes 432 and 429 are connected together and returned to the (minus 200 volt) power supply through resistance 438. The anodes of tubes 432 and 429 are connected together and to the (plus 200 volt) power supply. As has been previously mentioned the grid of tube 429 is connected to the output of the negative function generator of Fig. 12. In this circuit each tube 432 and 429 will operate to maintain the common cathode connection at a voltage level which is slightly positive with respect to the highest grid voltage whether it be the grid of tube 432 or that of tube 429. Thus, in the interval $t_3$, during which the grid of tube 429 is supplied with the negative function $y_i$, the grid of tube 432 will be the more positive because of the high positive potential existing at the anode of tube 427 and will take control of the potential at the common cathode connection of tubes 432 and 429. Subsequent to this time interval $t_3$ however, tube 432 will be rendered non-conductive by virtue of the low positive potential at the anode of tube 427 so that tube 429 will control the potential developed across resistance 438 to place the sloping or water line portion of line LM of the negative function upon the composite signal. The resultant of this action is a signal having two potential extremes one high and one low, the high potential being substantially constant for the duration of the time interval $t_1$ following which will occur a variation which is substantially linear with respect to time to the lower potential, which will be reached at the occurrence of the intersection of line 37 with the base line OG of Fig. 3, or in other words at the conclusion of the time interval $t_2$.

The signal thus obtained is repeatedly amplified and squared up by a cascaded multi-stage amplifier so that a resultant gating signal is obtained which is of substantially rectangular shape having a high positive potential during the time interval from zero to time $t_2$ and a low potential during other periods of time, with negligible slope duration as the change occurs from one voltage level to the other. This gating signal is obtained at the anode of triode electron tube 439.

The intervening circuitry is as follows:

The comomn cathode connection of tubes 432 and 429 is connected to the grid of a triode electron tube 440 which together with tube 441 provides a cathode coupled amplifier circuit which provides amplification without inversion. To this end the cathodes of tubes 440 and 441 are connected together and returned through resistance 442 to the (minus 200 volt) power supply. The anode of tube 440 is connected to the (plus 200 volt) power supply. Additionally the anode of tube 441 is connected through resistance 443 to the (plus 200 volt) power supply. The grid of tube 441 is connected to a voltage divider placed between the (plus 200 volt) power supply and ground which comprises the series resistance 444 and potentiometer 445, the latter of which has its tap point connected to the grid of tube 441 for purposes of providing a relatively simply adjusted means of controlling the D.-C. potential at the grid of tube 441. Potentiometer 445 is adjusted to provide the proper balance of D.-C. current between tubes 440 and 441 to obtain the proper signal amplification over all ranges in which it is employed. Thus the signal obtained at the cathodes of tubes 432 and 429 is subjected to a first step of amplification to appear without inversion at the anode of tube 441.

The anode of tube 441 is connected to the grid of a triode electron tube 446 which is in a D.-C. amplifier circuit operative to produce inversion as well as amplification of the applied input signal. This tube 446 operates in partial conjunction with tube 439 to obtain a D.-C. balance or stabilization in the operation of the two stages of amplification. In the interstage D.-C. coupling circuit employed, the anode of tube 441 is connected to the (plus 200 volt) power supply through the series voltage divider consisting of resistances 447 and 448 with the grid of tube 446 being connected to the junction of resistances 447 and 448. The cathodes of tubes 446 and 439 are connected together and returned to the (minus 200 volt) power supply through a cathode resistance 449 while the anode of tube 446 is connected to the (plus 400 volt) power supply through resistance 450 and the anode of tube 439 is similarly connected to the (plus 400 volt) power supply through a resistance 451. The anode of tube 446 is connected to the grid of tube 439 through a resistance 452 which is in series with resistance 453 the latter of which is connected to the (minus 200 volt) power supply. Thus it is seen that the circuits of the amplifier tubes 446 and 439 are D.-C. amplifiers, the resistances 447, 448, 452 and 453 being employed to provide the proper D.-C. potentials for the operation of the tubes, the attendant voltage division reduction of input signals being tolerated as the simplest means of stabilizing the operation of the D.-C. amplifier circuit.

As has been mentioned, the signal produced at the anode of tube 439 is substantially of rectangular waveform having two voltage levels, a high positive potential during the interval of time designated from zero time to time $t_2$ on the representation of Fig. 3 and a low potential during other periods of time. This signal is applied to the cathode follower output circuit including electron tube 454 which is of the triode type wherein the grid is directly connected to the anode of tube 439, the cathode is returned to the (minus 200 volt) power supply through a potentiometer 455, and the anode is directly connected to the (plus 400 volt) power supply.

The potentiometer 455 is employed to select the percentage of this developed signal which is applied to a cathode follower driver tube 456 which is employed in a circuit for producing the "linearized" sawtooth signal of line 45—46 which is subtracted from the function $y_i$ to produce the positive function $y_p$. As is readily noted from Fig. 3 the line 45—46 begins at the value of $y_i$ or $y_p$ existent at the conclusion of the time interval $t_2$, which time is established by that at which the negative function water line 37 intersects the base line 36, and proceeds at a uniform rate with regard to time to the conclusion of the time interval $t_1$ at which time line 45—46 reaches the base line OG.

In this circuit of tube 456, the capacitance which is discharged for the production of the water line slope portion of $y_p$ is capacitance 457 which as shown is also connected to line 425 and thence to the cathode of tube 419 previously described. The discharge resistance path for capacitance 457 is through the series connection of diode electron tube 458, triode electron tube 459, and resistance 460, the last of which is connected to the (minus 200 volt) power supply. The conductivity of this path is determined and controlled by many different factors. In this circuit the common connection between one side of the capacitance 457 and the anode of tube 458 is also connected to the grid of tube 426 and to the cathode of a diode electron tube 461. Tube 461 is a "clamper" device having its anode connected to ground and is operative to prevent the grid of tube 426 from falling below ground potential, being effectively therefore a limit control operative to establish reference charge conditions on capacitance 457.

Tube 459 is effectively a readily adjustable discharge resistance for capacitance 457 the magnitude of which may be controlled by a variation of the potential of the grid thereof as provided by the biasing source including the series connected resistances 462 and 463 placed between the (minus 200 volt) potential and ground. The adjustable tap point of potentiometer 463 is connected through resistance 464 to the grid of tube 459. Thus by adjustment of the tap point on potentiometer 463 it is possible to vary the effective D.-C. resistance provided by the anode circuit of tube 459 to control the time constant of the discharge path of capacitance 457. To complete this circuit at this point it is noted that the grid of tube 456 is connected direct to the tap point of potentiometer 455 while the anode of tube 456 is connected to the (plus 400 volt) power supply. The cathode of tube 456 is connected to the juncture point between the cathode of diode electron tube 458 and the anode of tube 459. The cathode of tube 459 is connected through resistance 460 to the (minus 200 volt) power supply.

In the cathode follower circuit of tube 426 the anode thereof is directly connected to the (plus 400 volt) power supply whereas the cathode is connected to the (minus 200 volt) power supply through potentiometer 465. Additionally the cathode of tube 426 is connected to the cathode of tube 459 through resistance 466 for purposes of providing a feedback circuit for varying the potential at the cathode of tube 459 and consequently the resistance of tube 459 to effect linearization of the generated exponential signal produced by the discharge of the capacitance 457. Adjustment of the movable tap of potentiometer 465 provides a means for selecting the amplitude of the output positive function ($y_p$) as obtained at the cathode of tube 426.

At the start of each cycle of operation such as the beginning of the time intervals $t_1$, $t_2$, and $t_3$ occurring at point 40 of Fig. 3, the signal $y_i$ obtained from the cathode of tube 419 is applied to the grid of tube 426 through the capacitance 457 to appear in unchanged form at the cathode of tube 426. At this time (up to the conclusion of time $t_2$) the discharge path for capacitance 457 as provided by tubes 458 and 459 is held non-conductive by virtue of the high positive potential maintained at the common connection of the cathode of tube 458 and the anode of tube 459 from the cathode of tube 456. Thus as long as a high positive potential is maintained at the cathode of tube 456 the capacitance 457 is a non-distorting coupling circuit because the effective resistance associated therewith is very large and the $y_i$ signal is applied to the grid of tube 426 without alteration. This situation prevails up to the conclusion of the time interval $t_2$ but at this instant tube 456 is cut off and the high potential which had previously been existent at the cathode of tube 456 is replaced by a low potential of such magnitude as to permit conduction by the discharge path of capacitance 457, namely, tubes 458 and 459 so that a constant current discharge of this capacitance occurs to superimpose the signal of line 45—46 (Fig. 3) upon the basic function $y_i$ producing a deviation from the signal $y_i$ at the grid of tube 426. This discharge is linearized by means of the compensating circuit including resistance 466 and is limited in time extent to the time instant of intersection of line 45—46 with base line OG by conduction through the diode clamping tube 461.

It has therefore been shown that the apparatus of Figs. 9 and 11 in conjunction with the apparatus of the previously described Figs. 12 and 13 generates a signal which corresponds to the signal $y_i$ up to the conclusion of the time interval $t_2$ from which time and up to the conclusion of the time interval $t_1$, the signal represented by the line 46—46 is subtracted from the signal $y_i$ to produce the resultant signal $y_p$. The significance of this type of operation is not readily apparent with a ship section such as shown in Fig. 3 where the function $y_i$ is substantially parallel to the base line OG in the period between the end of time interval $t_2$ and the end of time interval $t_1$, however, it is very important when the function $y_p$ is not parallel in that manner such as in the sections of Figs 2–B and 2–E. The net result of this action is the production of a signal $y_p$ which for an amidships section such as shown by Fig. 3 or Fig. 2–C will resemble the composite of curve ON beginning at point O and extending with the passage of time to the time interval $t_2$ at which time the intersection of lines ON and 45—46 occurs to cause variation from the value of $y_i$ existing at the end of the time interval $t_2$ to the base line OG of zero voltage as attained upon the conclusion of the time interval $t_1$. For other sections such as those of Figs. 2–B and 2–E, the function $y_p$ generated will correspond to $y_i$ up to the conclusion of time interval $t_2$ but which in the time between the end of time interval $t_2$ and the end of time interval $t_1$ will usually have the $y$-axis value somewhat greater than that of the line 45—46.

As with the apparatus of Fig. 10, additional components are provided for the application of a signal of a variational character to the grid of tube 459. In this case a variational signal may be applied to the input terminal 467 and across potentiometer 468 connected between terminal 467 and ground. The tap point of potentiometer 468 is coupled to the grid of tube 459 by capacitance 469. The development of such a variational signal at the grid of tube 459 is facilitated by the resistance 464 connected between the grid of tube 459 and the tap of potentiometer 463. For the purposes of the circuit as thus far described, however, it is sufficient to ignore the input of this variational signal to terminal 467, it being noted that the capacitance 469 will prevent the application of any D.-C. signal from that direction to the grid of tube 459. Thus the D.-C. potential of the grid of tube 459 is controlled by adjustment of potentiometer 463.

Referring again to Fig. 1 of the drawing it is now seen that each function control unit 31, 32, 33, 34 and 35 includes the apparatus contained in schematic form in Figs. 9, 11, 12 and 13 which is operative to receive the generated function $y_i$ from the corresponding function generator and to produce from it the two functions $y_n$ and $y_p$ which characterize the two halves of the cross sectional outline of the ship when immersed in water to a water line depth bearing a selected position relative to the keel and a selected angularity (list) relative to the vertical center plane of the hull. Thus, the entire apparatus shown in the combined Figs. 9, 11, 12 and 13 would be contained in each function control unit to provide individual control of the variables for each cross sectional outline or station of the hull.

Fig. 7 shows additional details of the connections of the function control units 32, 33, 34 and 35 in the overall schematic diagrams. The apparatus shown in Fig. 7 contains three groups of four output lines carrying independently the $y_i$ signals for four sections, the $y_n$ signals for four sections, and the $y_p$ signals for four sections. In the over-all schematic diagram, Fig. 7 is keyed to Fig. 6 to show complete connections of all of these output signals to the basic circuit components which will be described later; however, fundamentally, for the five different sections, the five separate $y_i$ signals, the five $y_n$ signals, and the five $y_p$ signals are combined respectively in the adders 54, 50 and 52 in Fig. 1 in relative amplitude in accordance with the constants of Simpson's rule. Control of these amplitudes is provided as will be shown presently by input circuits in the individual adders 50, 52 and 54 themselves.

Components of the adder 54 for $y_i$ functions are shown in schematic form in Fig. 10. The apparatus of Fig. 10 is similar to that of Fig. 6 already described as employed for the pulse shifted signals. Briefly described, however, this circuit of Fig. 10 includes a plurality of pentode type electron tubes which have inherently high anode resistances and which are identified by the numerals 470, 471, 472, 473 and 474. The anodes of tubes 470 through 474 are connected in parallel while their control grids independently receive as input signals the generated $y_i$ signals produced by the preceding apparatus. Tube 470 has its grid connected to the tap point of a potentiometer 475 which is connected to the output of the function generator 26 (Fig. 1) for a first cross section as obtained from line 289 in the schematic apparatus of Fig. 8. Line 289 of Fig. 8 is connected to one end of potentiometer 475 while the other end of potentiometer 475 is connected to ground. In similar fashion the grid of tube 471 is connected to a potentiometer 476 which is connected to a point similar to line 289 but which is located in the function generator 27. Potentiometer 477 is similarly connected between the output of the function generator 28 and ground potential so that any percentage of the output signal from the integrator portion of function generator 28 may be selected for application to the grid of the tube 472. In similar fashion the grids of tubes 473 and 474 are connected through potentiometers 478 and 479 respectively to the output of the function generators 29 and 30 respectively shown in block form with connection details in Fig. 7. Adjustment of the tap points on potentiometers 475–479 permits a selection of the percentage of the output signal from each function generator which is applied to the grid of the respective mixing tube of the group 470 to 474. Thus as has been previously mentioned in connection with the addition of sections according to Simpson's rule the potentiometers 475, 476, 477, 478 and 479 would typically be adjusted to select signal percentages for each section in accordance with the individual constants of Simpson's rule, namely 1, 4, 2, 4, 1, to provide summation of areas in accordance with the Simpson rule.

The anodes of all tubes 470 through 474 are connected together and returned through a single load resistance 480 to the (plus 400 volt) power supply. Likewise, all screen grids of the tubes 470 through 474 are connected together and to a suitable source of screen potential. As indicated, this may be typically of the order of (plus 75 volts). The cathodes of tubes 470 through 474 and the respective suppressor grids of each tube are individually connected to ground through the resistances 481, 482, 483, 484 and 485.

Signals thus combined across the common anode load resistance 480 are applied to the amplifying, inverting, and D.-C. level control output circuit associated with the electron tubes 486 and 487. In this circuit, tube 486 provides signal amplification with inversion while tube 487 provides a low impedance output. Control and adjustment of the D.-C. level of the signals and of the balance between tubes 486 and 487 themselves is provided by means of the potentiometers 488 and 489 disposed in the grid circuits of the tubes 486 and 487 respectively. In this circuit therefore the grid of tube 486 is connected to the common anode connections of tubes 470 through 474 by means of the circuitry including the series-connected resistance 490, potentiometer 488 and resistance 491 which are placed between the tube anodes and the (minus 200 volt) power supply. The grid of tube 486 is connected to the tap point of potentiometer 488 for control of the D.-C. potential thereof and is additionally coupled direct to the common anode connection by means of capacitance 492. Tube 486 is in effect substantially a triode tube because of the fact that its screen grid and anode are connected together. Additionally, the cathode and suppressor grid of tube 486 are returned to ground through a cathode resistance 494 which is by-passed by means of capacitance 495.

The anode of tube 486 is connected to the grid of tube 487 by means of the series circuit comprising potentiometer 489 and fixed resistance 496 placed between the anode of tube 486 and the (minus 200 volt) power supply. The grid of tube 487 is connected to the tap point of potentiometer 489 and additionally is coupled to the anode of tube 486 by means of capacitance 497. The anode of tube 487 is connected directly to the (plus 400 volt) power supply whereas the cathode of tube 487 is returned to the (minus 200 volt) power supply through a cathode resistance 498.

The combined output signal $y_1$ is obtained at the cathode of tube 487 in positive polarity and with a voltage base level of zero volts and applied to line 499 for delivery to subsequent apparatus in the circuit.

Identical circuitry to that just described in Fig. 10 is provided in Fig. 14 for the addition of the negative signals $y_n$ indicated by the adder 50 of Fig. 1.

The combining circuit of Fig. 14 includes the pentode type electron tubes 500, 501, 502, 503 and 504. These tubes receive their input signals by way of potentiometers 505, 506, 507, 508 and 509, respectively, which are connected to the negative function output from the function control units 31 through 35, respectively, for example, potentiometer 505 receives the output from tube 363 of Fig. 12 which is a component of the function control unit 31. In similar manner, potentiometers 506, 507, 508 and 509 receive respectively the negatvie function output signal from the function control units 32, 33, 34 and 35, respectively. In the signal addition according to Simpson's rule, which is necessary at this point, the potentiometers 505, 506, 507, 508 and 509 would be adjusted in signal percentage agreement with the constants of Simpson's rule, namely, 1, 4, 2, 4, 1 as were the potentiometers 475 through 479 of Fig. 10 just described.

As with the apparatus of Fig. 10, signal amplification, inversion, D.-C. level control and impedance conversion is provided by the circuitry associated with the electron tubes 510 and 511 to provide as positive polarity output signals in output line 512 the composite negative function signals which are added in accordance with Simpson's rule.

Components of the adder 52 of Fig. 1 are shown in schematic form in Fig. 15 of the drawing. This circuit, that for combining the positive functions $y_p$ is likewise identical to the adder of Fig. 10 previously described. However, it must be borne in mind that Fig. 15 shows additionally in schematic form the adder 53 and the meter circuit 51 which are merely indicated in Fig. 1.

Combination of the positive function signals is provided by means of the pentode type electron tubes 513, 514, 515, 516 and 517, the grids of which are connected respectively to the input potentiometers 518, 519, 520, 521 and 522. The input potentiometers 518 through 522 are connected to the positive function outputs of the function control units, 31, 32, 33, 34 and 35, respectively. For example, potentiometer 518 is connected to the positive function output from tube 426 in Fig. 11 to receive the positive signal $y_p$ for the first hull cross section. In similar manner, potentiometers 519, 520, 521, and 522 receive the positive function output from the function control units 32, 33, 34 and 35 as shown in detail by Fig. 7.

Signal amplification, inversion, D.-C. level compensation, and output impedance conversion is provided by the circuitry associated with the electron tubes 523 and 524 which are connected in cascade and receive as input the signals obtained from the common anode connection of the tubes 513 through 517.

Thus, the combined $y_p$ signals are produced at the cathode of tube 524 to appear in line 525 of Fig. 15 while the combined negative signals $y_n$ are delivered to Fig. 15 from the cathode of tube 511 (Fig. 14) to appear in line 526 of Fig. 15. These two signals are added by means of a simple resistance network including the resistances 527 and 528, shown in block 53, and the resistance circuit of block 51, including the meter 529 and the resistances 530, 531, and 532. Thus the signals $y_n$ and $y_p$ are added to obtain the sum $(y_n + y_p)$ which as has previously been mentioned is the signal which is proportional to the composite area or the quantity within brackets in Simpson's equation. When the meter scale is suitably calibrated to make allowances for all the various constants involved, etc., the meter indication is directly that of displacement. In this circuit the meter 529 would usually contain internal shunt and multiplier resistances to provide various ranges therefor. The series combination of resistances 530, 531 and 532 connected between the (minus 200 volt) power supply and ground provides a means for adjusting the negative return from meter 529 to obtain a D.-C. balance.

The mathematically operative units 55, 56, 57, 58, 59 and 60 of Fig. 1 are likewise shown in schematic form in additional figures of the drawing, all figures being keyed together so that they may be assembled in a single large drawing for best examination of the cooperation and interconnections therebetween. Several of these units are indicated in Fig. 16 to which reference is now directed. The first of these devices located in Fig. 16 is the divider 55 which as shown is merely a potentiometer 533 which in the over-all device is connected between the juncture of resistances 527 and 528 (Fig. 15) and ground. If potentiometer 533 is adjusted to divide the input signal as obtained at the juncture of resistances 527 and 528 by an amplitude factor of 2, then the signal obtained in the line 534 and delivered to the grid of electron tube 536 is the quantity:

$$\frac{y_p + y_n}{2}$$

appearing in the final equation for the stability factor.

The second major component shown in Fig. 16 is the subtractor 56 which is included to perform the operation $$y_i - \left(\frac{y_p + y_n}{2}\right)$$

This apparatus includes a previously mentioned tube 536, and additionally, a second triode type electron tube 537. In the circuit for this subtraction device, the anode of tube 536 is connected to the (plus 200 volt) power supply through resistance 538 while the cathode of tube 536 is connected to the cathode of tube 537 and is returned to the (minus 200 volt) power supply through resistance 539. Additionally the anode of tube 537 is connected to the (plus 200 volt) power supply through resistance 540 and is by-passed to ground by means of capacitance 541. The grid of tube 537 is connected to the tap of a potentiometer 542 which is connected between ground and the adder 54 (Fig. 1, Fig. 10) from whence it receives combined $y_i$ signals as obtained from the apparatus of Fig. 10 in line 499.

Output from the subtraction circuit is taken from the anode of the tube 536 to appear in line 543 as obtained by means of the coupling circuit including the series combination of fixed resistance 545, potentiometer 546, and fixed resistance 547 which are connected in series between the anode of tube 536 and the (minus 200 volt) power supply. Additionally line 543 is coupled to the anode of tube 536 by means of capacitance 548. In the circuit the series resistance combination 545, 546 and 547 is primarily a D.-C. level control circuit operative to obtain a selected D.-C. potential of zero or "ground level" in the line 543.

The next step in the mathematical operation is the multiplication of the subtracted signal obtained in line 543 by the cosine of the list angle. In practice it has been found entirely satisfactory to employ manual insertion of the value of the cosine of the angle as by the manual manipulation of a voltage divider or potentiometer. For example, the value of the cosine of a typical list angle of 10° is 0.9848, thus a potentiometer may be manipulated manually to take 98.48% of the subtracted signal output which will give the value of the quantity $$\left(y_i - \frac{y_p + y_n}{2}\right)(\cos \theta)$$

The same principle may be applied with equal ease to the multiplication of the sawtooth signal by the sine of the angle of list. Typically therefore, the sine of the typical angle of 10° is 0.1736. Thus a second potentiometer may be adjusted to take 17.36% of the value of the sawtooth signal to perform the multiplication of the quantities (sawtooth) × (sin $\theta$)

The angle resolver 57 thus becomes a relatively simple device as shown in Fig. 16 including merely the two potentiometers 549 and 550. The potentiometer 549 is connected to the output of the subtractor 56, as obtained in line 543, and to ground, with the output quantity obtained at the potentiometer tap point and delivered to line 551. Similarly, the value of the sawtooth signal which varies in a 1 to 1 proportion of voltage with respect to time to the scale of the representation of Fig. 3 as obtained from the cathode of tube 152 (Fig. 4) in the master timing unit 25 is applied to one end of potentiometer 550, the other end of potentiometer 550 being connected to ground potential. Thus the line 552 contains the product of the sawtooth multiplied by the sine of the list angle as required in the final equation. It must be borne in mind that both potentiometers 549 and 550 must be adjusted to obtain the trigonometric functions for the particular list angles. For this reason it may be desired to replace the separate potentiometers 549 and 550 with a pair of ganged wafer switches having a plurality of contact points which are connected to appropriate points on a pair of voltage dividing resistance networks. Alternatively sine and cosine potentiometers, ganged, could be employed.

Addition of the two output quantities from the angle resolver 57 is provided by the adder 58 which in the simplest form as shown by the schematic diagram of Fig. 16 is merely a network consisting of three resistances. These three resistances have a common juncture point with resistance 553 being connected to line 551, resistance 554 being connected to line 552, and resistance 555 being connected to ground.

The added output as obtained in line 556 must be multiplied by the quantity $$\frac{y_p + y_n}{2}$$

to obtain the final answer regarding the stability factor. This multiplication of two variable quantities is a rather complex operation to be performed electrically, involving considerable circuitry and explains why everything possible has been done in this apparatus to reduce to an absolute minimum the number of multiplications of a plurality of variables which must be made. It should be borne in mind that any suitable type of multiplier device for use at this point would be satisfactory. However, the device shown in Figs. 17 and 18 of the schematic diagram has been found to provide a degree of reliability, stability and accuracy superior to that of other known forms of multiplying devices. It is entirely possible that under many conditions of operation other types of multiplying devices would be entirely suitable. However, to provide the best operation under widely varying conditions, the circuit of Figs. 17 and 18 is desirable.

The multiplier unit of Figs. 17 and 18 although shown in its entirety, will be described briefly omitting some details of operation which may be obtained from the copending application Serial Number 370,903, (Navy Case No. 15,442) filed 28 July 1953, in the name of Willis S. Campbell, entitled Dynamic Multiplier Circuit, now Patent No. 2,840,307, issued June 24, 1958.

This circuit is a bridge type carrier frequency multiplier employing a carrier frequency signal as produced by an oscillator consisting of the triode electron tubes 557 and 558 of Fig. 18. Frequency stabilization of the oscillator circuit of tubes 557 and 558 is provided by means of the tank circuit consisting of inductance 559 and capacitance 560 together with the piezo electric crystal 561. Typically, this oscillator circuit may operate at a frequency of 500 kilocycles or at any other frequency where the bandwidth requirements for the signals to be multiplied can be readily met.

Signals thus produced by the oscillator are applied to an amplifier stage which includes the pentode type electron tube 562 to provide isolation between the oscillator and the circuits which follow. Thus an amplified signal is produced which is coupled by the output tank circuit including transformer 564 for delivery through line 563 to the signal multiplier proper located in the schematic diagram of Fig. 17 to which reference is now directed.

Carrier frequency signals applied to the apparatus of Fig. 17 appear across the input level control potentiometer 565 where the portion thereof selected for operation of the apparatus may be selected. The tap point of potentiometer 565 is connected to the control grid of pentode type electron tube 566 which is in an amplifier circuit having an output transformer 567 connected to the anode thereof. The secondary of transformer 567 has the series connected capacitances 568 and 569 shunted thereacross with the common connection between the capacitances connected to ground to effectively provide a center tapped secondary winding which delivers equal amplitude but opposed polarity output signals. These push-pull signals are applied to the number one control grids of the electron tubes 572 and 573. These tubes 572 and 573 are shown as each having four grids, however, this showing has been selected to avoid undue circuit complexity, tubes 572 and 573 actually being pentagrid tubes such as type 6L7 wherein the suppressor or "fifth" grid is internally connected to the cathode. The cathodes of tubes 572 and 573 are connected together and returned to the (minus 200 volt) power supply through the series combination of resistance 574, potentiometer 575 and resistance 576 which are by-passed to ground by the various capacitances 577, 578, and 579. The juncture of resistance 574 and potentiometer 575 is connected to the juncture of resistances 570 and 571 in the grid circuit of tubes 572 and 573 to provide a D.-C. potential for the number one control grids of tubes 572 and 573 which is several volts negative with respect to the cathodes of these tubes. This circuit therefore effectively provides a cathode biasing voltage for tubes 572 and 573.

The screen grid electrodes of tubes 572 and 573 are provided with a suitable D.-C. polarizing potential obtained for example through resistances 580 and 581 which are connected to the (plus 200 volt) power supply. The screen electrodes are also by-passed to ground by means of capacitances 582 and 583. The anodes of tubes 572 and 573 are connected together and to the primary of transformer 584.

The third grids of tubes 572 and 573 are also control grids which are employed for the express purpose of providing a further signal input means effective to control the transconductance of the tubes. To the number three grid in tube 573 is applied a selectable D.-C. biasing voltage which is obtained from the tap point of potentiometer 575. On the other hand, the No. 3 grid of tube 572 is connected to a signal input circuit whence it receives the quantity $(y_p+y_n)$ from the adder of 53 (Fig. 15) obtained at the junction between the resistances 527 and 528. For purposes of correlating the drawings, however, this connection to the third grid of tube 572 is made through the schematic diagram of Fig. 16.

With the circuit thus far described, tubes 572 and 573 having a push-pull input and a parallel output will not deliver any of the push-pull carrier frequency input signals obtained from transformer 567 if the gain of the two tubes is equal. If this gain is not equal, a signal is delivered to appear across the primary of transformer 584 which will be in polarity opposition to the carrier signal applied to either the grid 572 or 573 depending upon which tube has a greater transconductance. The voltage developed across the primary of transformer 584 will be proportional to the amplitude of the input quantity applied to the third grid of the tube 572, multiplied by some constant factor k and of a phase (zero degrees or one hundred eighty degrees) depending upon which tube 572 and 573 has the higher transconductance.

Multiplication of this signal, which is equal to the product of a constant and the quantity $(y_p+y_n)$, by a second variable quantity occurs in the second half of the bridge which includes the pentagrid electron tubes 585 and 586. By contrast this circuit does not receive push-pull carrier frequency input signals at the No. 1 grids but rather the No. 1 control grids of tubes 585 and 586 are connected together to the secondary of transformer 584. To provide bias for the No. 1 control grids of tubes 585 and 586, one end of the secondary of transformer 584 is connected to a suitable source of negative potential which is by-passed to ground by means of capacitance 587. The full signal developed across the secondary of transformer 584 is thus applied in push-push to the No. 1 control grids of tubes 585 and 586. Tubes 585 and 586 have their cathodes and suppressor grids as well, although the latter are not shown, connected directly to ground while the screen grid electrodes are connected to a suitable source of polarizing voltage obtained, for example, from the (plus 200 volt) power supply through resistances 588 and 589. The No. 3 grid of tube 585 is connected to a bias adjusting potentiometer whereas the No. 3 grid of tube 586 is connected to receive the second input quantity to be multiplied. This quantity is obtained from the output of the adder 58 (Fig. 16) at the output line 556, which is connected to the juncture between resistances 553, 554 and 555.

The anode of tube 585 (Fig. 17) is connected to output coupling transformer 590 while the anode of tube 586 is connected to a second output coupling transformer 591.

Separate demodulation of the signals from transformers 590 and 591 in opposing polarity is provided by the diode electron tubes 592 and 593. Tube 592 is connected as a negative polarity rectifier to produce at the anode thereof a filtered D.-C. potential of negative polarity. On the other hand diode tube 593 is arranged in a positive rectifier circuit to produce at the cathode thereof a D.-C. potential which is filtered and is of a positive polarity. These signals are combined through the resistances 594 and 595 and are applied to the grid of an electron tube 596 which is a component of a circuit which is basically of the cathode follower type. In this circuit the anode of tube 596 is connected to the (plus 200 volt) power supply whereas the cathode of that tube is connected to the (minus 200 volt) power supply through a series resistance combination including potentiometer 597 and fixed resistance 598. The output signal is obtained at the tap point of potentiometer 597 and is proportional to the desired stability factor as obtained through the solution of the final equation. This output quantity can be indicated by the meter 60 which contains a conventional integrating movement such as a d'Arsonval type meter. Meter 60 is preferably arranged so that its scale carries a calibration which gives the value of the stability factor directly and for this reason the scale may be calibrated in feet which is generally the desired unit for expression thereof. Also connected to the tap of potentiometer 597 is a balance indicating meter 602A used in original calibration of the unit. This meter is connected to the tap point of potentiometer 597 through the current limiting variable resistance 599, and fixed resistances 600, 601, and 602.

The circuit of Fig. 17 includes several additional elements which may be mentioned at this time. These elements are the diode type electron tubes 603 and 604 which are employed as limiters to protect the meter 602A from excessive developed voltages.

This circuit provides multiplication of the two input quantities which are applied separately to the No. 3 grids of tubes 572 and 586, the radio frequency signals supplied through tube 566 being employed merely as a carrier which is removed by the demodulation action of tubes 592 and 593.

The apparatus as thus far described is intended primarily for determinations made under static conditions, that is, those where a selected water line for each section as well as a selected angle of list are inserted upon the generated function curves as obtained from the function generators 26, 27, 28, 29 and 30 (Fig. 1). With this type of information input the two basic quantities of displacement and stability factor are readily determined; however, the nature of the apparatus of this invention is such that by the addition of several auxiliary circuits of relatively simple nature it is possible to obtain dynamic operation which permits rapid examination of a wide range of input variables which may later be examined statically in certain portions as hereinbefore described. The advantage of this, for example, is to permit a rapid study of the displacement for a wide range of list angles. At this point is should be noted that the basic apparatus shown in schematic form in Figs. 4–18 does not contain all of the connections necessary to adapt it to dynamic operation of the various forms to be described; however, all necessary connections are at least indicated on the figures.

A first dynamic situation which may be inserted is displacement variation responsive to a dynamic variation of the list angle. At first glance it would appear that such a problem may be readily and simply simulated merely by varying the slope of the generated water lines shown by the reference characters LM and 45—46 in Fig. 3 which would be accomplished by the apparatus in the appropriate Figs. 11 and 12 of the schematic diagram. Such a slope variation could be inserted merely by adjusting the discharge time constant of the water line generating circuits associated with the capacitance 354 in Fig. 12 and the capacitance 457 in Fig. 11. In fact such a means of varying the slopes of the water lines is shown in these figures embodied in the variational signal input circuits to the grid of the capacitance discharge tube 351 in Fig. 12 from terminal 360-A, potentiometer 360 and capacitance 359 and to the grid of capacitance discharge tube 459 in Fig. 11 from input terminal 467, potentiometer 458 and capacitance 469. By input signals supplied to these points, it is possible to vary the discharge time constants of the circuits including the capacitances 354 and 457 at some relatively slow variational rate to simulate variations in the angle of list. For this reason, capacitances 359 and 469 would form, together with their respective resistances 358 and 464, long time constant coupling circuits.

This form of variational signal input, although it is adequate to control the slope of the water line curves and hence the angle of list, must be supplemented by the application of variational signals elsewhere in the circuit necessitated by the fact that the duration of the time interval $t_3$ as shown in Fig. 3 is normally different for every section of the hull and varies with the list angle. Thus, although the list angle may be the same for all sections, the time interval $t_3$ will be different for each section and will vary differently for each as the list angle is varied. It thus becomes necessary to provide apparatus which will determine the proper value of the time interval $t_3$ to be employed for the various sections under all conditions.

To this end a reference or control function which may be identified as $y_c$ is employed to inform each function control unit as to the proper instant of conclusion of the time interval $t_3$ for that section. The control function $y_c$ is indicated in Fig. 3 as comprising several component parts or signals, first a "unit function" variation from point O along the x-axis to a value somewhat in excess of the greatest voltage or hull width (voltage) such as $V_c$. When the value $V_c$ is reached this control signal $y_c$ changes character abruptly to obtain a second portion which varies along a line parallel to the y-axis at a constant voltage until the water line JK is reached. This signal $y_c$ then follows the line JK, which slopes at the list angle until it intersects the y-axis or base line OG from which time and until the next master pulse it follows line OG at zero voltage. The composite signal $y_c$ thus assumes a somewhat rectangular waveform except for the trailing edge which is provided with a linear slope which corresponds to the list angle. This is a reference signal with which the water line of the negative function $y_n$ for all sections will coincide at least in part. This is true in the normal conditions wherein list would be studied where the pitch angle is zero so that the water line intersection with the hull vertical center plane is at the same distance from the keel O for all sections. This may be stated in other terms by saying that the time interval $t_2$ will be uniform for all sections in this particular dynamic variation although both time intervals $t_1$ and $t_3$ will be of a different instantaneous value for each section and will vary as the list angle varies.

Once the comparison signal $y_c$ is thus produced to determine the limiting value of the water line for each section it is compared with the outline curve $y_i$ to derive a control signal at the instant the curve $y_i$ for each section becomes equal to the curve $y_c$ to inform the negative function control of each function control unit when to start the generation of the water line portion of the curve $y_n$ departing then from the basic function curve $y_i$ for this section.

With reference now to Fig. 19 apparatus for generating the signal $y_c$ is shown. This apparatus basically is similar to a part of a function generator as shown in the previously discussed Fig. 8 which is the integrator portion of the function generator units 26, 27, 28, 29 and 30. Several simplifications and modification of the original circuit are possible however.

With particular reference now to the apparatus of Fig. 19, a time delay mechanism is provided which produces a positive voltage pulse having a uniform voltage during the time interval $t_4$ as represented in Fig. 3. At the conclusion of this time interval $t_4$, a linearized "sawtooth" signal variation is produced corresponding to the portion of the line JK between the values of voltage of $V_c$ and zero.

To this end the master pulses are supplied to the potentiometer 605 which has one terminal thereof connected to ground. The tap point of potentiometer 605 is connected to the grid of a gaseous conduction triode electron tube 606 and to the grid of a "hard" triode electron tube 607 through the coupling network consisting of capacitances 608 and 609 and resistances 610, 611, 612, 613 and 614. This rather complex grid coupling network is employed as has been discussed previously to provide differentiation of the input signal by virtue of the short time constant of the circuit associated with capacitance 609, to protect the grid of tube 606 by means of the grid current limiting resistance 610, and to provide a proper grid bias potential for the tubes 606 and 607 by virtue of the potential divider action between resistances 612 and 613 connected between ground and the (minus 200 volt) power supply.

Gas tube 606 is the primary control element in the discharge path of a capacitance 615, the charge path of which includes resistance 616 and the anode circuit of a triode electron tube 617. Additionally the cathode of tube 606 is connected to the (minus 200 volt) power supply through resistances 618 and 619. Further, the cathode of tube 606 is connected to ground through resistance 620 which is by-passed by capacitance 621. Capacitance 615 is connected across the anode and the cathode of tube 606. The anode of tube 606 further is connected to the grid of tube 617 through a biasing battery 622. This circuit is a linearized sawtooth generator device wherein the variation produced across capacitance 615 is employed to control the conductivity of tube 617 which in turn operates to maintain a constant current charge of capacitance 615.

Tube 607 is a triggering tube for a trigger circuit of the Eccles-Jordan type which includes the triode electron tubes 623 and 624. The connections of tube 607 include the connection of the cathode thereof to ground and of the anode thereof to the grid of tube 624 of the trigger circuit.

A second triggering tube for the trigger circuit of tube 623 and 624 is the triode electron tube 625 which has its grid connected to the anode of tube 606, its cathode connected to ground, and its anode connected to the grid of tube 623. In the trigger circuit itself besides those connections already described the anode of tube 623 is connected to the (plus 200 volt) power supply through resistance 626 while the anode of the tube 624 is similarly connected to the (plus 200 volt) power supply through resistance 627. Further the anode of tube 624 is connected to the grid of tube 623 through resistance 628 which is by-passed by capacitance 629. Also the anode of tube 623 is connected to the grid of tube 624 by means of resistance 630 which is by-passed by capacitance 631. Further connections in the trigger circuit include the connections of the grids of tubes 623 and 624 to the (minus 200 volt) power supply through the resistances 632 and 633 respectively, while the cathodes of tubes 623 and 624 are connected together and returned to ground through resistance 634. An addition in this circuit beyond the components ordinarily found in the Eccles-Jordan circuit is the capacitance 635 which couples the anode and the grid of tube 624. This capacitance which is quite small has been included to provide a slight delay in the triggering action which has been found desirable. The combined action of this circuit, therefore, is to produce conduction by tube 607 upon occurrence of the master pulse to drop the potential of the grid of tube 624 so that tube 623 is rendered conductive at the beginning of the master pulses. Following this occurrence, during which the constant current charging of capacitance 615 is occurring, tube 625 initially is held in a non-conductive condition. As time passes, however, and the voltage across capacitance 615 rises, eventually tube 625 is brought to conduction. When this occurs the resultant drop in potential at the anode thereof, communicated to the grid of tube 623, causes a termination in the conduction therein causing the trigger circuit to revert to the initial condition with tube 624 conductive. The result of this action is the production at the anode of tube 623 of a negative pulse during a time interval of selectable duration immediately following each master pulse.

The anode of tube 623 is coupled to the grid of an amplifying and inverting tube 636 by means of the coupling network including capacitance 637 and resistance 638. Resistance 638 is the grid return resistance for tube 636 having one end thereof connected to the grid of tube 636 while the other end is connected to the (minus 200 volt) power supply. The anode of tube 636 is connected to the (plus 400 volt) power supply through a circuit consisting of the resistances 639 and 640 and the anode circuit of the triode electron tube 641, the anode of the latter being connected to the (plus 400 volt) power supply. Additionally, resistance 642 is connected to the junction of resistances 639 and 640 and to the grid of tube 641 to provide a D.-C. return path. The anode of tube 636 is coupled to the grid of tube 641 by means of capacitance 643. In turn the cathode of tube 636 is connected to the (minus 200 volt) power supply through resistance 644 which is by-passed by capacitance 645. Clamping of the anode of tube 636 to prevent its excursion above a selected value is provided by means of the diode electron tube 646, the anode of which is connected to the anode of tube 636. The cathode of clamper tube 646 is maintained at a selected potential by means of the voltage regulator tube 647 which operates by cathode follower action to maintain a fixed potential at the common connection between the cathode of tube 647 and the cathode of tube 646 which common connection is returned to the (minus 200 volt) power supply through resistance 648. The anode of tube 647 is connected directly to the (plus 400 volt) power supply while the grid of tube 647 is connected to a selected D.-C. potential which is adjustable by means of the variable tap of potentiometer 649 which is connected in series with resistance 650 between the (plus 200 volt) power supply and the (minus 200 volt) power supply. This portion of the circuit associated with tubes 636, 641, 646 and 647 therefore operates in response to negative pulses produced at the anode of tube 623 to produce positive pulses (at the anode of tube 636) which have a controllable duration and which are limited to a selected maximum positive value. These pulse signals are employed to control the conductance of triode type electron tube 651 which is arranged in a form of cathode follower circuit with its anode connected to the (plus 400 volt) power supply and its cathode connected to ground through a rather complex circuit including primarily the capacitance 652 and an adjustable resistance discharge means therefor as provided by the anode circuit of triode type electron tube 653. Tube 653 provides a discharge path for capacitance 652 which is readily adjustable by variation of the grid potential thereof. Such grid potential variation is provided by the potentiometer 654 connected between the (minus 200 volt) power supply and ground. To complete the discharge path, the cathode of tube 653 is returned to the (minus 200 volt) power supply through a resistance 655.

In this circuit, therefore, the capacitance 652 is charged through tube 651 toward a positive potential which is determined by the level of the positive pulse produced at the anode of tube 636 which typically may be near 200 volts positive and is discharged through tube 653 toward a potential which is minus 200 volts. Limiting action in this discharge occurs, however, by virtue of diode electron tube 656 which is placed across capacitance 652 with the anode thereof connected to ground and the cathode connected to the anode of tube 653 to prevent a negative polarity charge of capacitance 652 to any appreciable extent. Thus when capacitance 652 discharges completely it is prevented from charging in the opposite polarity by conduction through tube 656 which then provides an effective short circuit across the capacitance 652. The signal thus produced across the capacitance 652 is delivered as an output signal through an impedance transforming cathode follower circuit including electron tube 657. This cathode follower circuit, aside from being an output impedance transformation device, is employed to assist in the linearization of the discharge of capacitance 652 by adjusting the conductance of tube 653. To accomplish this linearization the cathode follower tube 657 which is connected to the (minus 200 volt) power supply through potentiometer 658 is also connected to the cathode of tube 653 through resistance 659 which provides feedback of the output signal.

The resulting linearized signal produced at the cathode of tube 657 is that of $y_c$ which may be delivered in amplitude selectable by the setting of the tap point of potentiometer 658 and which may be observed by means of an oscilloscope 660. It should be borne in mind, however, that the oscilloscope 660, although it is shown directly connected to the circuit at this point may actually be the previously mentioned oscilloscope 293 in Fig. 8, provided suitable signal switching is incorporated in the overall circuit.

In the circuit of Fig. 19 the duration of the time interval $t_4$ (Fig. 3) is controlled by the adjustment of capacitance 615 while the slope of the linearized time variation portion between the conclusion of time interval $t_4$ and the end of the time interval $t_2$ is controlled by adjustment of potentiometer 654.

To provide variational control of the slope of this function (list angle) in the period between the end of time interval $t_4$ and the end of time interval $t_2$, a control signal is supplied to the grid of the capacitance discharge tube 653. This signal is supplied from the input terminal 661 to appear across potentiometer 662 which has a terminal thereof connected to ground potential. The tap point of potentiometer 662 is coupled to the grid of tube 653 by means of capacitance 663. To assist in the development of variational signals at the grid of tube 653 a grid return resistance 664 is interposed between the grid of tube 653 and the tap point of potentiometer 654.

When the potential of the grid of tube 653 is high so that the anode circuit resistance of the tube 653 is low, a rapid discharge of capacitance 652 occurs to reproduce a water line representative essentially of zero list angle. On the other hand, if the grid potential of tube 653 is low causing a high anode resistance, the discharge of capacitance 652 is prolonged to produce a "list" water line.

Thus by the variation of the potential of the grid of tube 653 it is possible to vary the slope of the water line (list). Such potential variation is controlled by the list variation generator 665 which typically produces a sawtooth voltage waveform having a frequency of approximately 5 cycles per second. The generator 665 is of simple nature and may typically be a linearized sawtooth generator circuit similar to that which is built around the tubes 606 and 617 wherein the grid bias potential is set to permit free-running repetitive operation, rather than biased as heavily as tube 606 which requires an input pulse to initiate each cycle of operation.

The signal obtained from list variation generator 665 is also supplied to the positive and negative control portion of the function control unit 31 (Fig. 1) as applied specifically to Fig. 11 for the positive function at input terminal 467 and to Fig. 12 for the negative function at input terminal 360-A.

Additionally, although the connections are merely indicated on Figs. 1 and 19 and not shown completely elsewhere to avoid excessive complexity in the schematic diagram the output from the list variator generator 665 would be applied to similar terminals 360-A and 467 in each of the function control units 32, 33, 34 and 35.

The comparison function $y_c$ produced at the output of tube 657 of Fig. 19 is delivered to all of the function control units 31, 32, 33, 34 and 35 to points as exemplified by that in the connections to function control unit 31 in Fig. 13. In this circuit of Fig. 13 the signal $y_c$ is compared with the generated basic function $y_1$ produced by that particular generator to determine the time instant (end of interval $t_3$) at which the basic function and the comparison function attain a selected relationship. This comparison is provided by means of a subtractor circuit including the triode type electron tubes 667 and 668 (Fig. 13).

In the subtractor circuit the function $y_c$ as obtained from the apparatus of Fig. 19 is applied to an input level selection potentiometer 669 which has one end thereof connected to ground potential. The tap point of potentiometer 669 is connected directly to the grid of tube 667. The basic function $y_1$ on the other hand is applied to the second input potentiometer 670 one end of which is also returned to ground potential while the tap point is directly connected to the grid of tube 668. The anode of tube 667 is connected to the (plus 200 volt) power supply through a signal developing load resistance 671 whereas the anode of tube 668 is connected to the (plus 200 volt) power supply through resistance 672 which forms a part of a filter circuit operative in conjunction with capacitance 673 to provide a filtered direct current at the anode of tube 668. The cathodes of tubes 667 and 668 are connected together and returned to the (minus 200 volt) power supply through resistance 674. Signal take off from this circuit is provided by means of the output circuit connected to the anode of tube 667. This circuit which provides adjustment for the average D.-C. potential in the output line 675 includes the series connected combination of resistance 676, potentiometer 677 and resistance 678 which are placed between the anode of tube 667 and the (minus 200 volt) power supply. Output line 675 is further coupled to the anode of tube 667 by means of capacitance 679.

The resulting signal as developed in line 675 has a low D.-C. value during intervals when the comparison signal $y_c$ is greater than the basic function $y_1$. This situation is altered, however, when the basic function $y_1$ attains a higher potential than the comparison function $y_c$ at which time the potential in line 675 rises abruptly.

The difference signal as thus produced in line 675 is employed to control the operation of the trigger circuit of tubes 326 and 327. As will be recalled, the trigger circuit of tubes 326 and 327 establishes the duration of the time interval $t_3$ at the conclusion of which time the negative function curve $y_n$ is caused to depart from the basic function curve $y_1$ and proceed along the water line 37 to the base line of zero voltage OG. To this end, the line 675 is connected to the grid of tube 326 by means of a single pole double throw switch 680 which permits selection of the source of control signal for this grid of tube 326. In the circuit as originally described, the grid of tube 326 was supplied with a sawtooth signal which controlled a selectable delay in the time at which tube 326 was rendered conductive to terminate the time interval $t_3$. Thus in one position of switch 680 the grid of tube 326 is controlled by the time delay signal produced by the sawtooth generator including capacitance 319 while in the other position of switch 680, the grid of tube 326 is controlled by the difference signal from line 675 which occurs at the instant in time following each master pulse at which the control function $y_c$ and the basic function $y_1$ reach equivalency and hence signify for that particular function control unit that the time for conclusion of the interval $t_3$ has occurred. Thus the foregoing apparatus as associated particularly with Fig. 19 provides for an automatic "rocking" of the ship hull to rapidly cover a wide range of list angles.

A second form of dynamic operation is provided by the apparatus of Fig. 1 contained within the blocks 61, 62, 63, 64 and 65. By means of this additional apparatus it is possible to cause the system to rapidly and automatically adjust the water level for all sections to obtain a selected displacement directly rather than require individual manual adjustment of the water line height at each function control unit 31, 32, 33, 34 and 35. To this end, the volume signal as taken from the output of adder 53 is first integrated over its entire duration to provide a substantially constant D.-C. level signal proportional to volume. Integration is provided by apparatus contained within the block 61 further identified as the waveform integrator. The integrated signal is then compared with a reference signal in the subtractor 62 which receives its reference displacement signal from a suitable source of D.-C. potential in the reference block 63. The output of subtractor 62 is dependent upon the relative amplitudes of the D.-C. signals in the output of the integrator 61 and the output of the reference device 63. When the integrated volume is greater than the reference signal the output of subtractor 62 is of such character as when applied to the function control units 31, 32, 33, 34 and 35 through the control distributor 65 to cause a shift in the water line in a direction toward the keel, producing effectively a reduction in displacement, a compensation action. Conversely if the integrated output from waveform integrator 61 is smaller than the level established by the reference unit 63, the function control units 31–35 receive a compensating signal to cause the water line to move away from the keel line producing therefore an effective increase in displacement. Meter 64 is provided to measure the output of subtractor 62 to indicate when the apparatus has reached a stable condition. When such a stable condition is reached, movement of the meter will stop indicating that no further variation is taking place in the water level control signal applied to the function control unit.

For purposes of water level control of the function control units 31–35 to obtain a selected displacement, it is considered normal for the function control units 31 to 35 to receive identical control signals from the control distributor 65.

Circuit details of the devices in blocks 61, 62, 63, 64 and 65 of Fig. 1 are shown in the schematic diagram of Figs. 20, 21 and 22. Attention is now directed to Fig. 20 which shows the components of the waveform integrator 61. The primary purpose of this integrator is to average the output signal from the adder 53 to obtain therefrom a substantially constant D.-C. potential. This integration is provided by means of the time constant circuit including resistances 681 and 682 which operate in conjunction with capacitance 683 in conventional time constant fashion to filter the signal variations applied thereto. Capacitance 683 is discharged immediately prior to the beginning of each cycle of operation by triode electron tube 684 which has its anode connected to one plate of capacitance 683 and its cathode connected to the (minus 200 volt) power supply.

Control of conductivity of tube 684 is effected by means of a gating circuit responsive to master pulses as applied to the grid of tube 685 which is a triode of the gas filled variety. In this circuit tube 685 is the discharge path for a sawtooth generator which includes the time constant circuit of capacitance 686 and resistance 687. The cathode of tube 685 is maintained at a substantially constant D.-C. potentional by means of the voltage regulator tube 688 which is in a voltage divider path between ground and the (minus 200 volt) power supply, including resistance 689. In the complete sawtooth generator circuit the coupling of the grid of tube 685 to the source of master pulses in the master timing unit 25 is provided by means of a coupling circuit including capacitance 690 and resistance 691 which together comprise a short time constant circuit of the differentiator type which produces from each positive master pulse two short duration pulses first one of positive polarity and then one of a negative polarity. The positive spike applied to the grid of tube 685 is effective to unblock the normally cut-off tube 685 to permit conduction therein. In this coupling circuit is included an additional resistance 692 which is esssentially current limiting in nature inserted to prevent the flow of excess grid current in tube 685 during periods of anode circuit conduction thereby. The anode of tube 685 is connected to ground through the resistance 687 and is by-passed to the cathode by means of the capacitance 686. Additionally the cathode of tube 685 is connected to the (minus 200 volt) power supply through the combination of resistance 689 in parallel with the series connected resistances 693 and 694. Resistance 691 in the grid coupling circuit is connected to the juncture of resistances 693 and 694 to provide bias for tube 685. Additionally the cathode of tube 685 is connected to ground through the voltage regulator tube 688 which as shown is of the gas diode type having its cathode connected to the cathode of tube 685 and its anode connected to ground potential. By virtue of this connection therefore a constant potential is maintained at the cathodes of tubes 685 and 688 which is a selected amount below ground potential, typically by 105 volts, if tube 688 is of the VR 105/30 type.

The sawtooth signal developed across capacitance 686 by the periodic discharge thereof followed by the exponential charge through resistance 687 is employed to control the conductivity in a switch circuit including the two triode type electron tubes 695 and 696. In this switch circuit the grid of tube 695 is directly connected to the anode of tube 685 whereas the cathode of tube 695 as well as the cathode of tube 696 are connected to the cathode of tube 685 through a variable resistance 697. The anode of tube 695 is connected to the (plus 200 volt) power supply through a signal developing load resistance 698. Likewise the anode of tube 696 is connected to the (plus 200 volt) power supply through a signal developing load resistance 699. The grid of tube 696 is connected to the junction point of resistances 700 and 701 while resistance 700 is connected to the anode of tube 695 and resistance 701 is connected to the (minus 200 volt) power supply. Resistance 700 is by-passed by capacitance 702.

By virtue of these connections the static condition of the switch circuit is that wherein tube 696 is conductive. This condition prevails immediately following each master pulse while capacitance 686 is discharged. In this condition the grid of tube 695 is at approximately the potential of the cathode of tube 685. During this time, however, the conduction current through tube 696 produces a voltage drop across resistance 697 which provides an additional biasing voltage for tube 695 holding tube 695 non-conductive. This situation changes, however, as the voltage across capacitance 686 increases in a positive direction due to the charging of capacitance 686 through resistance 687, raising the potential of the grid of tube 695 to where tube 695 is eventually unblocked to attain anode circuit conductivity. When tube 695 thus becomes conductive, the resultant voltage drop produced across resistance 698 when communicated to the grid of tube 696 blocks tube 696 so that conduction is completely transferred to tube 695. Tube 695 thus rendered conductive remains in that condition until the occurrence of the next master pulse at which time the discharge of capacitance 686 through tube 685 causes the grid of tube 695 to drop to a low potential to return tube 696 to conduction.

The result of this action is the production at the anode of tube 696 of a series of repetitive pulses of positive polarity each of which begins at an instant of time subsequent to the occurrence of a master pulse and which lasts until the occurrence of the succeeding master pulse. The time of occurrence of the start of this positive pulse is controllable by means of the resistance 697 which adjusts the potential at the common cathode connection of tubes 695 and 696 when tube 696 is conductive to provide a means of selection of the potential to which the grid of tube 695 must rise to produce conduction by that tube.

The pulse signal thus produced at the anode of tube 696 is employed to control the conductivity in a triode type electron tube 703 which is connected in a form of cathode follower circuit. The grid of tube 703 is connected to the anode of tube 696 by means of a coupling circuit which includes a bias adjusting device including the triode type electron tube 704. This tube 704 has its anode connected to the grid of tube 703 while its cathode is connected to the (minus 200 volt) power supply through a resistance 705. Additionally resistance 706 is placed between the anode of tube 696 and the grid of tube 703, this resistance 706 being by-passed by capacitance 707. Further, the anode of tube 696 is connected to the cathode of tube 704 through resistance 708. The grid potential for tube 704 is obtained by means of a potential divider connected between the (minus 200 volt) power supply and ground consisting of the potentiometer 709 in series with fixed resistance 710. The tap point of potentiometer 709 is connected to the grid of tube 704. The function of this circuit is primarily that of a variable resistance to provide with resistance 706 a D.-C. voltage divider which adjusts the potential of the grid of tube 703.

The cathode follower circuit including tube 703 is completed by the connection of the anode direct to the (plus 200 volt) power supply and the connection of the cathode to the (minus 200 volt) power supply through the series combination of potentiometer 711 and the fixed resistance 712. Across potentiometer 711 is placed a second potentiometer 713 which has the tap point thereof connected to the positive terminal of a battery 714. The negative terminal of battery 714 is connected to the grid of a tube 684 to establish the bias level for tube 684 while the tap point of potentiometer 711 is direct connected to the grid of a triode type electron tube 715 and is further coupled to the grid of tube 684 by capacitance 716. To complete the circuit, the anode of tube 715 is connected to the (plus 200 volt) power supply while the cathode thereof is connected to the anode of tube 684. In turn the cathode of tube 684 is connected to the (minus 200 volt) power supply. Additionally the common connection between the cathode of tube 715 and the anode of tube 684 is connected to one terminal of capacitance 683. In this circuit then, both tubes 715 and 684 are non-conductive during the occurrence of the function signals. At the conclusion of each function signal, however, as determined by the time delay control 697, both tubes are unblocked to bring capacitance 683 to the zero voltage condition. Since the function appearing at this point, as delivered through resistances 681 and 682, is of positive polarity, tube 684 is brought to conduction first to discharge capacitance 683, the discharge taking place with great rapidity due to the (minus 200 volt) potential maintained at the cathode of tube 684.

Tube 715 then enters the picture to become conductive when the potential across capacitance 683 reaches zero volts to prevent a charge thereof in the negative direction. Both tubes 715 and 684 thereafter remain conductive until the occurrence of the next master pulse at which time they are cut off to permit integration of the function as then applied to resistance 681. The rather close balance in conduction points or levels of the tubes 715 and 684 is adjusted by the potentiometers 711 and 713.

This circuit therefore provides positive control of the discharge and potential level across capacitance 683 to assure that the only signal actually integrated is that which occurs during the stable period of the switch circuit tubes 695 and 696 which immediately follows the occurrence of a master pulse and which exists for a duration of time as selected by potentiometer 697.

The integrated signal which is proportional to the volume of the hull thus simulated is compared with a signal which represents the actual volume desired. At this point if the integrated volume is greater than the desired volume, it is in order for a circuit to be included which will provide a control signal of one polarity; and which in the opposing condition of volume wherein the integrated volume is the opposite relative to the desired volume, will provide a control signal of opposing polarity. Such signals are provided by the apparatus contained within the subtractor block 62 of Fig. 1 and the reference block 63 of Fig. 1 shown in schematic form in Fig. 21 to which reference is now made. It will be noted at this point that in the apparatus of Fig. 21 the circuitry enclosed within the block 62 is basically identical to that of the subtractor as employed in the schematic diagram of Figs. 13 and 16 employing the tubes 667, 668 and 536, 537 respectively. This type of circuit has previously been described in detail so it will be mentioned only briefly at this point.

The circuit of Fig. 21 includes the triode type electron tubes 717 and 718 and is connected in such a manner as to apply the integrated signal from the cathode of tube 715 of Fig. 20 to the grid of tube 718 through an input potentiometer 719, and to apply a reference signal to the grid of tube 717 as obtained from potentiometer 720, connected in series with resistance 721 between the (plus 200 volt) power supply and ground potential. Tube 718 operates very much as a cathode follower effective to maintain a potential at the common cathode connection with tube 717, as developed across resistance 722, that is wholly dependent upon the integrated signal, the percentage of which may be selected by means of potentiometer 719. When the grids of tubes 717 and 718 are at equal voltages, a degree of conductivity will exist in tube 717 which results in the existance of a selected potential at the anode of tube 717 produced by virtue of the voltage drop across resistance 723. In this condition the output coupling circuit including the series combination of resistances 724, potentiometer 725, and resistance 726, which is connected between the anode of tube 717 and the (minus 200 volt) power supply may be adjusted to where the tap point of potentiometer 725 is at ground potential. With the circuit thus adjusted, any departure in potential balance between the grids of tubes 717 and 718 will cause an alteration in the voltage drop across resistance 723 resulting in a change in potential at the tap point of potentiometer 725 so that it is either above or below ground depending upon whether the grid of tube 718 is more or less positive with respect to the grid of tube 717 than was the case when the circuit was balanced. Thus whenever the grid potential of tube 718 is below the adjusted value relative to the grid of tube 717, indicating that the integrated volume is less than the volume desired as inserted by the setting of potentiometer 720, the output signal from the subtractor unit 62 as obtained at the tap point of potentiometer 725 and appearing in line 727 will be below ground potential, whereas in the opposing condition wherein the grid of tube 718 is positive with respect to the grid of tube 717, the potential in the line 727 will be positive with respect to ground potential. This signal as developed is employed to control the water level as inserted by the function control units 31–35 in such manner as to produce an alteration therein which varies the volume in such a direction as to attain an equality between the generated volume and the desired reference volume established by potentiometer 720. As a sidelight in the completed circuit, it may be found desirable to insert a filter circuit or second integrator consisting of resistance 728 and capacitance 729 to minimize tendencies toward hunting.

A meter 64 indicated in block form in Fig. 21 may be any suitable form of D.-C. meter, typically a vacuum tube type having high input impedance so as to produce a minimum amount of loading of the circuit to which it is connected. Even this requirement, however, is not a rigid one because a high resistance milliammeter connected in series with suitable multiplying resistances to make the reading thereof proportional to voltage would be adequate where the circuitry, particularly that of resistances 723, 724, 725 and 726, if of a relatively low impedance as would normally be the case.

The signal thus developed may be applied directly to the water level establishing apparatus of function control units 31–35 as shown in detail in the schematic diagram of Fig. 13, the signal being supplied to line 728–A and thence through switch 729–A to potentiometer 339 instead of the D.-C. signal supplied by the battery 338 as previously indicated. In this connection it must be understood that although all of these auxiliary connections for the dynamic circuitry are not shown in the schematic diagram to avoid undue complexity of lead lines, these connections are indicated in the block diagram of Fig. 1 by the connections leading from the control distributor 65 to the various function control units 31–35. These signals would be utilized in each function control unit 31–35 in exactly the same manner as is indicated for function control unit 31 in the schematic diagram, namely, through equivalent line 728–A and equivalent switch 729–A.

The control distributor 65 is shown in Fig. 22 and as indicated therein is of a relatively simple structure including the triode type electron tubes 730 and 731 connected in series between the (plus 200 volt) power supply and the (minus 200 volt) power supply with a voltage divider chain including resistances 732, 733, 734, 735, 736 and 737 placed in series between the cathode of tube 730 and the cathode of tube 731. A switch 731–A is inserted between resistance 737 and the cathode of tube 731. Additionally the cathode of tube 730 is connected to the (minus 200 volt) power supply through resistance 738. In this circuit, therefore, tube 730 is primarily a cathode follower circuit operative to maintain a potential at the juncture between resistances 732 and 738 which is dependent upon the potential at the tap point of potentiometer 725 in Fig. 21. The line 728–A in the function control unit 31 is typically connected to the juncture point between resistances 732 and 733, while the equivalent line 728–A in the function control unit 32 is connected to the junction point between resistances 733 and 734. Likewise, the line 728–A in the function control unit 33 is connected to the juncture between resistances 734 and 735 while the line 728–A in the function control unit 34 is connected to the juncture between resistances 735 and 736. Finally the line 728–A of function control unit 35 is connected to the juncture between resistances 736 and 737.

For the purposes of the circuit as thus far described, it is adequate to consider that switch 731–A is open so that lines 728 in all of the function control units 31–35 are supplied with a D.-C. control signal from the cathode of tube 730 of identical value. Variations in this D.-C. control signal will produce a shift in that the water line relative to the keel of the ship by an equivalent amount for every section.

A third type of dynamic operation is provided by means of the apparatus located in the blocks 66, 67, 68, 69, 70, 71, 72 and 73 of Fig. 1 which also provides signals for the control distributor 65.

The apparatus of these blocks 66—73 operates to provide a form of dynamic operation to achieve a selected balance between the longitudinal moment of buoyancy and the longitudinal moment of weight of the hull. The exact meaning of this may be interpreted more clearly with the assistance of the hull elevation view of Fig. 2 wherein it will be noted that the keel line will be level only when the two moments, of weight in a downward direction, and of buoyancy in an upward direction, taken with regard to an arbitrary reference point such as the line R, are equal. If these moments are not equal, the keel will not ride even, and, depending upon which is the greater, the ship will be up or down by the bow. In making this determination, the area for each section (incremental volume) is multiplied by the distance of that section from the reference line R. The results of all these individual moments are added and compared with the weight moment which is equal to the product of the total weight also multiplied by its distance from the reference line R.

In operation of the apparatus a condition wherein the keel is not even is simulated by placing the water line at a different position for each section, the position thereof being graduated along the hull length in dependency upon the position of that section of the hull. Thus, for example, where the bow of the ship is higher in the water than the stern, the water line for the first section 2–A will be lower than that for the second section 2–B, which in turn is lower than that for the third section 2–C and so on. In view of the discussion which has thus just preceded in connection with the dynamic water line adjustment (which was at even keel) such water line control or such adjustment is provided by variation in the signal in the lines 728–A of the various funtion control units 31–35. Thus to simulate a bow-up or bow-down condition, rather than apply a uniform D.-C. potential to all of these lines 728–A of the various function control units, a graduated D.-C. potential will be supplied to the various function control units in magnitude dependency upon the position of the section generated by each along the length of the hull. As in the case of displacement, dynamic operation provides a particular advantage in the determination of longitudinal moments because the apparatus when thus employed automatically adjusts the water level for each section to obtain a condition of balance between the moments about the longitudinal reference plane R for buoyancy and weight without requiring time consuming manual manipulation of the water lines for all sections in a trial and error process. This dynamic operation on longitudinal moments must be accompanied by the dynamic operation on displacement as just described so that the apparatus automatically adjusts itself for general water line for all sections to give displacement as well as the graduated water line for the sections to give longitudinal moments. In practice, therefore, both corrective actions could take place simultaneously and in a fraction of a second.

In the longitudinal moment circuit, the moment arms shown in Fig. 2 as $D_1$, $D_2$, $D_3$, $D_4$ and $D_5$ for a particular hull shape or constants may be inserted simply by means of potentiometers in the same manner that the constants in Simpson's equation are inserted for the displacement problem. To this end, the areas generated for each section may be added in an amplitude dependency, for each section, proportional to the value of the distance of that section from the reference line R which is equal to the moment arm. To perform this operation therefore, adders 66 and 67 (Fig. 1) identical respectively to the previously described adders 50 and 52 are provided and shown in detail in Figs. 23 and 24 respectively.

Circuits of the type employed in Figs. 23 and 24 have been described in detail previously, hence no detailed discussion of the circuitry is necessary at this point. Some details may be mentioned regarding the circuit, however. In Fig. 23 a plurality of pentode type electron tubes 739, 740, 741, 742 and 743 having their anodes tied together and through a single load resistance 744 to the (plus 400 volt) power supply is employed. These pentode type electron tubes separately receive the generated functions $y_n$ for the five sections as obtained from the output of the function control units 31, 32, 33, 34 and 35, respectively. Signal input to each of the tubes 739 through 743 is provided by means of the input potentiometers 745 through 749 respectively. Thus it is necessary merely to adjust the input potentiometers 745–749 to select a percentage of the output signal from the associated function control unit proportional to the distance D between that section and the arbitrarily selected reference line R. Thus, for example, if the function control unit 31 produces the section corresponding to that of Fig. 2–A, the input potentiometer connected thereto, for example potentiometer 745, will be adjusted to select a percentage of the output signal equal to the ratio of the distance $D_5$ to the maximum distance $D_1$. Similarly for the second section such as that shown by Fig. 2–B which may be produced by the function control unit 32, the second input potentiometer, for example, potentiometer 746 may be adjusted to apply to tube 740 a percentage of the output from the function control unit for that section equal to the ratio of the distance $D_4$ of the section 2–B from line R as represented to the maximum distance $D_1$. In like manner the input potentiometers 747, 748 and 749 will be adjusted to select the appropriate percentage of the generated signal equal to the ratio of the corresponding distance for that particular section from the reference line R to the maximum distance $D_1$. Actually, therefore, the potentiometer which supplies the function generated by the last section such as that shown in Fig. 2–E which would be function control unit 35 having the input potentiometer 749 for tube 743 would apply the entire output of the function control unit 35 to tube 743 since the ratio of the actual distance of that section from the reference line R to the maximum distance is unity.

Signals thus developed across resistance 744 are applied to a two stage amplifier unit consisting of the electron tubes 750 and 751. This unit is inserted to provide signal inversion, impedance transformation, and control of D.-C. level of the output signal.

Output signals for the negative function thus obtained at the cathode of tube 751 are the summation of the longitudinal moments for the "negative" side of the hull. In a similar manner the apparatus of Fig. 24 provides signal multiplication and combination for the moments of the "positive" side of the hull. This operation is provided by means of the pentode type electron tubes 752, 753, 754, 755 and 756 which have the signal input level control potentiometers 757, 758, 759, 760 and 761 respectively. Potentiometers 757–761 respectively are adjusted in the same ratios as are the potentiometers 745—749 of Fig. 23 as just described.

Signals thus developed across the common anode load resistance 762 by the pentode tubes of Fig. 24 are supplied to the two stage amplifying system consisting of tubes 763 and 764 which are connected together in an amplifying, inverting, D.-C. level control, and impedance conversion circuit to provide output signals at the cathode of tube 764 of a low impedance character with a selected polarity and D.-C. ground level. Output signals obtained from this tube 764 together with the signals from tube 751 of Fig. 23 are combined by the adder 68 which, as shown in Fig. 24, comprises merely the two resistances 765 and 766 in a combination circuit wherein the meter 73 provides the third or combining resistance. As with the meters previously discussed meter 73 is primarily a D.-C. voltmeter such as a meter of an integrating type.

Electronic integration of the signals produced at the juncture of resistances 765 and 766 is provided by the apparatus of Fig. 25. This apparatus is identical to that previously described in detail in connection with integrator 61 and which is controlled by master pulses as applied to line 767 to control integration across the time constant circuit which includes resistances 768 and 769 and capacitance 770. The integrated signal output as obtained across capacitance 770 is of substantially D.-C. character having periodic discharge portions being proportional to the moments of buoyancy of the hull.

This D.-C. signal is compared with a second D.-C. signal of fixed but adjustable character which is inserted by manual manipulation as a reference equivalent to the quantity of the moments of weight. The comparison of the two moments signals is provided by means of the subtractor 70 cooperative with the reference source 71 both of which are shown in detail in Fig. 26. This type of subtractor circuit as shown in Fig. 26 has been described previously in considerable detail and will be discussed only briefly here. This circuit includes the triode type electron tubes 771 and 772 from which an output signal is obtained in line 773 which is at ground potential when the potentials at the grids of tubes 771 and 772 bear a pre-selected relationship, but which is positive when the potential at the grid of tube 772 exceeds the selected relationship to the potential at the grid of tube 771, and which is negative when the potential at the grid of 772 is below the selected potential relationship with respect to the grid potential of tube 771. The result of this is that where the moments of buoyancy are larger than the moment of weight acting in opposition thereto, the potential of line 773 will be positive with respect to ground whereas in the opposing situation, wherein the moments of buoyancy are less than the moments of weight, the potential at the line 773 will be negative with respect to ground.

The potential of line 773 is employed to control the conductivity of tube 731 in the control distributor 65 as shown in detail in Fig. 22. Tube 731 is employed to control the conductivity through the previously mentioned voltage divider chain consisting of resistances 732, 733 734, 735, 736 and 737 when the switch 731-A is closed. Thus when the potential of the cathode of tube 731 is the same as that at the cathode of tube 730, the function control units 31–35 for all stations will receive the same control signal to generate the same keel to water line distance for all stations. When this condition of balanced conductivity in tubes 730 and 731 does not exist however, the resultant potential division across the resistances 732–737 provides a different control signal for each function control unit resulting in a different water line position for each section. When the potential of line 773 is positive with respect to ground, assuming for the moment that the potential of line 727 in Fig. 19, which controls the conductivity of tube 730, is at ground potential, the water line control signal for function control unit 35 will be somewhat more positive than that for function control unit 34 which in turn is more positive than that of function control unit 33, etc. This situation will lower the water line for the more distant section 2–E by greater amount than for a closer section 2–D which in turn is lower than that for 2–C and so on. This will produce a reduction in the buoyancy moments and in the buoyancy itself which will cause a decrease in the conductivity of buoyancy control tube 730 which will be operative to raise the water line on the closer sections such as T–A to maintain a constant buoyancy. A similar but opposite action takes place for the opposing condition wherein the buoyancy moments are less than the reference value inserted by the reference 71, in which case the control tubes 730 and 731 will have their conductivity conditions altered to the opposing condition namely that wherein tube 730 is more conductive than tube 731 operative thereby to lower the water line for the closer sections such as that of Fig. 2–A and raise the water line for the more distant sections such as that of Fig. 2–E.

The components of the computer connected as in the foregoing description of Fig. 1 for the solution of the volume-stability problem must be calibrated. The calibration procedure is actually performed before solution of the problem is attempted but explanation thereof has been reserved to follow the description of the apparatus and its operation. With the mode of operation of the computer in mind it is believed the calibration procedure set forth below will be readily understood.

The apparatus of the computer is set up to perform the operations required in the problem to be solved. A function generator 30–A of the same type as function generators 26 through 30 previously described is connected to master timing unit 25. The output of the function generator 30–A is then adjusted to a square wave of approximately one-half the maximum voltage magnitude it can generate. This function generator is used as a standard to adjust the gain of the components used in the solution of the problem.

The signal output is applied to each input of the various components, the adders, subtractors, multipliers, integrators and differentiators. The signal output of each component is now compared with the standard signal of the function generator 30–A by the use of a double beam oscilloscope and the output amplitude of the particular component adjusted by means of its output potentiometer until the desired magnitude ratio to the standard input signal is obtained. Normally the input to output ratio used is 1 to 1 or 1 to ½.

After all the components except the function generators have been adjusted as above the over-all gain of the components is then found. A pattern for a problem of the same type for which the exact solution is known is placed before a projection oscilloscope which is then connected to each function generator in turn. Each function generator in turn is adjusted so that its output will produce a pattern on the oscilloscope corresponding to the given pattern or patterns required for the known problem.

Following the above adjustment the meters are read, or if the desired answer is in terms of a curve on an oscilloscope, a trace is made of the curve. These meter readings or traced curve are taken for the known problem, the correct solution of which such as the answers in terms of volume or moments, is known. Each known correct answer is divided by the corresponding answer obtained. The resulting quotients are calibration multipliers to be used for converting the computer readings of a similar problem into the correct values.

The computer is now ready for solution of the problem. The function generators are set up to produce the desired patterns or curves on the oscilloscope. The meters may be read and the calibration multipliers obtained above applied to obtain the correct solutions. The calibration problem may again be used to check the multiplier constants.

In the event that the problem to be solved is of a type for which no known correct solution is available the computer may still be calibrated. Each phase of the problem is calibrated separately. Where the areas of section are involved, for example, the function generator may be set to produce a known pattern such as a rectangle or a square the area of which is easily computed and checked against the answer given by the computer. On the same basis answers in terms, moments or volumes may be calibrated by use of simple cases. The calibration multipliers obtained in this manner may then be combined as required by the mathematics of the over-all problem to be solved.

The present invention has been shown and described with particular reference to buoyancy and stability problems of ship hulls. It is by no means, however, to be considered limited to such problems. The various units or elements performing mathematical operations in the manner disclosed herein may be arranged in the proper order to solve many other types of problems with equal ease and facility. Aircraft lift and strength problems for example are typical of problems readily solvable by apparatus of the type herein disclosed. Probability or statistical functions may also be readily applied by the function generators. The particular arrangement of units or elements used is obviously determined by the mathematical expression of the problem under consideration in any particular case.

From the foregoing it is readily apparent that a computer device of great flexibility and utility, particularly in any field where irregular curves are involved, is provided. The present computer is superior to digital type computers for irregular curve problems because continuous curve following is possible. Digital computers using point by point approximations of such curves and requiring complex circuitry for each point to be approximated on each curve are not well adapted for such use. A new speed and convenience of operation is provided by the present invention involving considerable savings in time and circuitry over previous approaches to problems where plots of one variable versus another are involved.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the composite value of a plurality of related functions comprising, a plurality of signal generators for separately generating recurrent electrical signal waveforms representative of values of each function along a time base line, time selector means connected to said signal generators for selecting a portion of each signal waveform, mixing means connected to said time selector means for combining the selected portions of the signal waveforms, means connected to said mixing means for integrating the combined signals to determine the size of the area outlined thereby with the time base line, and means connected to said integrating means for determining the location of the geometrical center of the area outlined.

2. Apparatus for producing a selected value of a quantity dependent upon a mathematical relationship to at least one other quantity comprising, signal generator means for producing recurrent electrical signal waveforms representative of the mathematical relationships involved, adjustable selector means connected to said signal generator means for selecting portions of the waveforms, means connected to said selector means for integrating the selected portions of the waveforms, comparison means responsive to the integrated output from said last named means to produce a control signal in dependency upon the relationship thereof to a desired value, and control means connecting said comparison means and the adjustable selector means whereby the selected portions of the waveform are varied to equalize the integrated output and the desired value.

3. In apparatus for deriving a selected value for the composite value of a plurality of related functions, the combination of, signal generator means for producing recurrent electrical signal waveforms representative of the value of each function along a time base line, mixing means connected to said signal generator means for combining the recurrent electrical signal waveforms, time controlled selector means connected to said mixing means for selecting parts of each of the electrical signal waveforms taken along the time base line, integrating means connected to said selector means for determining the average value of the selected parts of the combined signal waveforms, comparison means connected to said integrating means for deriving control signals in proportion to differences between the average value and the selected value, and control means connected to said comparison means for applying said control signals to the time controlled selector means whereby the parts of the signal waveforms selected thereby are varied to maintain a predetermined relationship between the average value and the selected parts of the combined signal waveform.

4. Apparatus for producing the value of a quantity which is dependent upon a mathematical relationship to at least one other quantity which can be represented by the passage of time comprising, timing means for producing a series of pulse timing signals having a selected recurrence frequency, signal generator means responsive to said pulse timing signals for producing a series of pulse signals of selected duration and spacing following each timing signal, mixing means connected to the output of said signal generator means for combining selectable amplitude portions of the pulse signals, adjustable time constant integrator means connected to the output of the mixer means for integrating the combined pulse signals, time control signal distortion means connected to the output of the integrator means operative to transmit integrated signals without distortion for a selected period of time following each pulse timing signal and to block integrated signal transmission in controllable amount at the conclusion of the selected period of time following each pulse to produce signal waveforms characteristic of the mathematical relationship, integrator means for measuring the average value of the output signals from the distortion means, and an indicator for displaying the value of the signals measured by the integrator means.

5. Apparatus for producing the composite value of a plurality of related functions which functions are individually dependent upon mathematical relationships to at least one another quantity which can be represented by the passage of time comprising, timing means for producing a series of pulse timing signals having a selected recurrence frequency, signal generator means responsive to said pulse timing signals for producing a series of pulse signals of selected duration and spacing following each timing signal, a plurality of mixing means one of each function connected to the output of said signal generator means for combining selectable amplitude portions of the pulse signals, a plurality of adjustable time constant integrator means, one for each function connected to the output of the respective mixer means for separately integrating the combined pulse signals, a plurality of time controlled signal distortion means individually connected to the output of one of said integrator means operative to transmit integrated signals without distortion for individually selectable periods of time following each pulse timing signal and to individually lock integrated signal transmission in controllable amount at the conclusion of the selectable period of time to produce signal waveforms characteristic of the functions, second mixer means connected to the signal distortion means operative to combine the output signals therefrom in relative amplitudes in accordance with the relationships of the related functions, second integrator means connected to the second mixer means operative to measure the average value of the combined signals, and an indicator for displaying the value of the signals measured by the second integrator means.

6. Apparatus for producing a selected value for a quantity which is dependent upon a mathematical relationship to at least one other quantity which can be represented by the passage of time comprising, timing means for producing a series of pulse timing signals having a selected recurrence frequency, signal generator means responsive to said pulse timing signals for producing a series of pulse signals of selected duration and spacing following each timing signals, mixing means connected to the output of said signal generator means for combining portions of the pulse signals in selectable amplitude, adjustable time constant integrator means connected to the output of the mixer means for integrating the combined portions of the pulse signals, time controlled signal distortion means connected to the output of the integrator means operative to transmit integrated signals without distortion for a selected period of time following each pulse timing signal and to block integrated signal transmission in controllable amount at the conclusion of the selected period of time following each pulse to produce signal waveforms characteristic of the mathematical relationship, integrator means connected to the said signal distortion means for measuring the average value of the output signals from the distortion means, and control means connected to said signal distortion means responsive to the average value of the output signals and to the selected value for the quantity operative to vary the selected period of time of signal transmission without distortion thereby to obtain correspondence between the selected value for the quantity and the measured average value of the output signals.

7. In apparatus for producing a selected value for the composite of a plurality of related functions which are individually dependent upon mathematical relationships to at least one other quantity which can be represented by the passage of time, the combination of, timing means for producing a series of pulse timing signals having a selected recurrence frequency, signal generator means responsive to said pulse timing signals for producing a series of pulse signals of selected duration and spacing following each timing signal, a plurality of mixing means one for each function connected to the output of said signal generator means for combining portions of the pulse signals in selectable amplitude, a plurality of adjustable time constant integrator means one for each function connected to the output of the respective mixer means for separately integrating the combined portions of the pulse signals, a plurality of time controlled signal distortion means each individually connected to the output of one of said integrator means operative to transmit integrated signals without distortion for individually selectable periods of time following each pulse timing signal and to individually block integrated signal transmission in controllable amount at the conclusion of the selectable period of time to produce signal waveforms characteristic of the functions, second mixer means connected to the signal distortion means operative to combine the output signals therefrom in relative amplitudes in accordance with the relationships of the related functions, second integrator means connected to the second mixer means operative to measure the average value of the combined signals, and control means connected to said signal distortion means responsive to the average value of the output signals and to the selected value of the composite of the related functions operative to vary the selected period of time of signal transmission without distortion thereby to obtain correspondence between the selected value for the composite of the related functions and the measured average value of the output signals.

8. Apparatus for producing the value of a quantity which is dependent upon a mathematical relationship to at least one other quantity which can be represented by the passage of time comprising, timing means for producing a series of pulse timing signals having a selected recurrence frequency, signal generator means responsive to said pulse timing signals for producing a series of pulse signals of selected duration and spacing following each timing signal, mixing means connected to the output of said signal generator means for combining portions of the pulse signals in selectable amplitude, adjustable time constant integrator means connected to the output of the mixer means for integrating the combined portions of the pulse signals, time controlled signal distortion means connected to the output of the integrator means operative to transmit integrated signals without distortion for a selected period of time following each pulse timing signal and to block integrated signal transmission in controllable amount at the conclusion of selected period of time following each pulse to produce signal waveforms characteristic of the mathematical relationship, secondary integrator means connected to said distortion means measuring the average value of the output signals from the distortion means, and means for determining the location of the geometrical center of the area defined by the signal waveform from the signal distortion means and the zero signal axis.

9. Apparatus for producing the value of a quantity which is dependent upon a mathematical relationship to at least one other quantity which can be represented by the passage of time comprising, timing means for producing a series of pulse timing signals having a selected recurrence frequency, signal generator means responsive to said pulse timing signals for producing a series of pulse signals of selected duration and spacing following each timing signal, mixing means connected to the output of said signal generator means for combining the pulse signals in selectable amplitude, adjustable time constant integrator means connected to the output of the mixer means for integrating the combined pulse signals, time controlled signal distortion means connected to the output of the integrator means operative to transmit integrated signals without distortion for a selected period of time following each pulse timing signal and to block integrated signal transmission in adjustable amount at the conclusion of the selected period of time following each pulse to produce signal waveforms characteristic of the mathematical relationship, control means connected to said signal distortion means operative to vary the amount of signal blocking produced by the signal distortion means, and secondary integrator means connected to said distortion means measuring the average value of the output signal from the signal distortion means.

10. In apparatus for producing the value of a quantity which is dependent upon a mathematical relationship to at least one other quantity which can be represented by the passage of time, the combination of, timing means for producing a series of pulse timing signals having a selected recurrence frequency, signal generator means responsive to said pulse timing signals for producing a series of pulse signals of selected duration and spacing following each timing signal, mixing means connected to the output of said signal generator means for combining the pulse signals in selectable amplitude, adjustable time constant integrator means connected to the output of the mixer means for integrating the combined pulse signals, time controlled signal distortion means connected to the output of the integrator means operative to transmit integrated signals without distortion for a selected period of time following each pulse timing signal and to block integrated signal transmission in adjustable amount at the conclusion of the selected period of time following each pulse to produce signal waveforms characteristic of the mathematical relationship, control means connected to said signal distortion means operative to vary the amount of signal blocking produced by the signal distortion means, secondary integrator means connected to said signal distortion means for measuring the average value of the output signal distortion means operative to combine the output signals from the signal distortion means, and means for determining the location of the geometrical center of the area defined by the signal waveform from the signal distortion means and the zero signal axis.

11. In apparatus for producing a selected value for the composite of a plurality of related functions which are individually dependent upon mathematical relationships to at least one other quantity which can be represented by the passage of time, the combination of, timing means for producing a series of pulse timing signals having a selected recurrence frequency, signal generator means responsive to said pulse timing signals for producing a series of pulse signals of selected duration and spacing following each timing signal, a plurality of mixing means one for each function connected to the output of said signal generator means for combining the pulse signals in selectable amplitude, a plurality of adjustable time constant integrator means one for each function connected to the output of the respective mixer means for separately integrating the combined pulse signals, a plurality of time controlled signal distortion means each individually connected to the output of one of said integrator means operative to transmit integrated signals without distortion for individually selectable periods of time following each pulse timing signal and to individually block integrated signal transmission in controllable amount at the conclusion of the selectable period of time to produce signal wave forms characteristic of the functions, second mixer means connected to the signal therefrom in relative amplitudes in accordance with the relationships of the related functions, secondary integrator means connected to the second mixer means operative to measure the average value of the combined signals, control means connected to said signal distortion means responsive to the average value of the output signals and to the selected value of the composite of the related functions operative to vary the selected period of time of signal transmission without distortion thereby to obtain correspondence between the selected value for the composite of the related functions, and means for determining the location of the geometrical center of the area defined by the signal waveforms from the signal distortion means and the zero signal axis.

12. In apparatus for producing a selected value for the composite of a plurality of related functions which are individually dependent upon mathematical relationships to at least one other quantity which can be represented by the passage of time, the combination of, timing means for producing a series of pulse timing signals having selected recurrence frequency, signal generator means responsive to said pulse timing signals for producing a series of pulse signals of selected duration and spacing following each timing signal, a plurality of mixing means one for each function connected to the output of said signal generator means for combining the pulse signals in selectable amplitude, a plurality of adjustable time constant integrator means one for each function connected to the output of the respective mixer means for separately integrating the combined pulse signals, a plurality of time controlled signal distortion means each individually connected to the output of one of said integrator means operative to transmit integrated signals without distortion for individually selectable periods of time following each pulse timing signal and to individually block integrated signal transmission in controllable amount at the conclusion of the selectable period of time to produce signal waveforms characteristic of the functions, and control means connected to said signal distortion means operative to vary the amount of signal blocking produced by the signal distortion means.

13. In apparatus for producing a selected value for the composite of a plurality of plurally related functions which are individually dependent upon mathematical relationships to at least one other quantity which can be represented by the passage of time and for producing a desired proportionment of the selected value to each of the related functions, the combination of, timing means for producing a series of pulse timing signals having a selected recurrence frequency, signal generator means responsive to said pulse timing signals for producing a series of pulse signals of selected duration and spacing following each timing signal, a plurality of mixing means one for each function connected to the output of said signal generator means for combining the pulse signals in selectable amplitude, a plurality of adjustable time constant integrator means one for each function connected to the output of the respective mixer means for separately integrating the combined pulse signals, a plurality of time controlled signal distortion means each individually connected to the output of one of said integrator means operative to transmit integrated signals without distortion for individually selectable periods of time following each pulse timing signal and to individually block integrated signal transmission in controllable amount at the conclusion of the selectable period of time to produce signal waveforms characteristic of the functions, second mixer means connected to the signal distortion means operative to combine the output signals therefrom in relative amplitudes in accordance with one relationship of the related functions, second integrator means connected to the second mixer means operative to measure the average value of the combined signals, first control means for said signal distortion means responsive to the average value of the output signals and to the selected value of the composite of the related functions operative to vary uniformly for all functions the selected period of time of signal transmission without distortion thereby to obtain correspondence between the selected value for the composite of the related functions and the measured average value of the output signals, third mixer means connected to the signal distortion means operative to combine the output signals therefrom in relative amplitudes in accordance with a second relationship of the related functions, third integrator means connected to the third mixer means operative to measure the average value of the combined signals, and second control means connected to said signal distortion means responsive to the proportionment of the average value of the output signal to the various functions and responsive also to a proportionment reference signal from a reference control unit and operative to vary the selected period of time of signal transmission without distortion by different amounts for each function thereby to obtain correspondence between the proportionment reference and the proportionment of average value.

14. In apparatus for producing a selected value for the composite of a plurality of plurally related functions which are individually dependent upon mathematical relationships to at least one other quantity which can be represented by the passage of time and for producing a desired proportionment of the selected value to each of the related functions, the combination of, timing means for producing a series of pulse timing signals having a selected recurrence frequency, signal generator means responsive to said pulse timing signals for producing a series of pulse signals of selected duration and spacing following each timing signal, a plurality of mixing means one for each function connected to the output of said signal generator means for combining the pulse signals in selectable amplitude, a plurality of adjustable time constant integrator means one for each function connected to the output of the respective mixer means for separately integrating the combined pulse signals, a plurality of time controlled signal distortion means each individually connected to the output of one of said integrator means operative to transmit integrated signals without distortion for individually selectable periods of time following each pulse timing signal and to individually block integrated signal transmission in controllable amount at the conclusion of the selectable period of time to produce signal waveforms characteristic of the functions, second mixer means connected to the signal distortion means operative to combine the output signals therefrom in relative amplitudes in accordance with one relationship of the related functions, second integrator means connected to the second mixer means operative to measure the average value of the combined signals, first control means connected to said signal distortion means responsive to the average value of the output signals and to the selected value of the composite of the related functions operative to vary uniformly for all functions the selected period of time of signal transmission without distortion thereby to obtain correspondence between the selected value for the composite of the related functions and the measured average value of the output signals, third mixer means connected to the signal distortion means operative to combine the output signals therefrom in relative amplitudes in accordance with a second relationship of the related functions, third integrator means connected to the third mixer means operative to measure the average value of the combined signals, second control means for said signal distortion means responsive to the proportionment of the average value of the output signal to the various functions and responsive also to a proportionment reference signal from a reference control unit and operative to vary the selected period of time of signal transmission without distortion by different amounts for each function thereby to obtain correspondence between the proportionment reference and the proportionment of the average value, and means for determining the location of the geometrical center of the area defined by the signal waveforms from the second mixer means and by the zero signal axis.

15. In apparatus for determining displacement characteristics of ship hulls, the combination of, electrical signal generator means for producing an electrical signal having a waveform which when plotted against time reproduces the cross-section of the ship hull, water line means connected to said generator means superimposing on the cross-section waveform a representation of a water line, measuring means connected to said water line means for determining the area defined by the cross-section waveform and the water line, means connected to said measuring means for comparing the defined area magnitude with a reference area magnitude operative to produce control signals characteristic of the relative magnitudes, and control means connected to said last named means for said water line means responsive to the control signals operative to vary the water line location on the cross-section waveform to attain a selected area magnitude thereof.

16. In apparatus for determining displacement characteristics of ship hulls, the combination of, electrical signal generator means for producing an electrical signal having a waveform which when plotted against time reproduces the cross-section of the ship hull, means connected to said signal generating means superimposing on the cross-section waveform a representation of the water line, measuring means connected to said last named means for determining the area defined by the cross-section waveform and the water line representation, and means connected to said measuring means for determining the location of the geometrical center of said defined area.

17. In apparatus for determining displacement characteristics of ship hulls, the combination of, electrical signal generator means for producing an electrical signal having a waveform which when plotted against time reproduces the cross-section of the ship hull, water line means connected to said generator means for superimposing on the cross-section waveform a representation of a water line, measuring means connected to said water line means for determining the area defined by the cross-section waveform and the water line, means connected to said measuring means for comparing the defined area magnitude with a reference area magnitude operative to produce control signals characteristic of relative magnitudes, control means connected to said measuring means and said water line means responsive to said control signals to adjust the position of the water line representation on the cross-section to provide a selected area defined by the cross-section waveform and the water line, and means connected to said measuring means for determining the location of the geometrical center of said defined area.

18. In apparatus for determining displacement characteristic of a ship hull which is symmetrical about a center-line plane but which may have a list, the combination of a ship side electrical signal generator means for producing an electrical signal varying with respect to time in the same mathematical relationship as a ship side varies with respect to said center-line plane, first limiting means comprising a waterline signal generator which produces an electrical signal varying with respect to time as the waterline varies with respect to said center line plane, a first mixing means combining the signals from said ship side electrical signal generator and said first limiting means to produce an electrical representation of the cross-section of the submerged portion of the hull side having the smaller displacement, a second limiting means comprising a second waterline electrical signal generator producing a representative water line signal starting at a time when the output of said first waterline signal generator drops to zero and having the same slope as said first waterline signal, second mixing means combining the signals from said side electrical signal generator and said second limiting means to produce an electrical representation of a cross-section approximating in area the submerged portion of the hull having the larger displacement, means combining the electrical signals representating the cross-sections of the two sides of the ship hull and integrating indicator means responsive to the combined signals.

19. In apparatus for determining displacement characteristics of ship hulls, the combination of, a plurality of electrical signal generator means for producing electrical signals having waveforms which when plotted against time reproduce the cross-section of the ship hull at a plurality of selected points along the length thereof, separate water line generation means for superimposing on each cross-section waveform a water line representation to select a predetermined portion thereof, means for combining the resultant cross-section and water line signals for the various stations in amplitude relationship in accordance with a cross-section-volumetric averaging mathematical relationship, and measuring means for determining the total value of the combined resultant signals.

20. In apparatus for determining displacement characteristics of ship hulls, the combination of, a plurality of electrical signal generator means for producing electrical signals which when plotted against time reproduce the cross-section of the ship hull at a plurality of selected points along the length thereof, separate water line generation means connected to said generator means for superimposing on each cross-section waveform a water line representation, means connected to said last named means for combining the resultant cross-section and water line signals for the various stations in amplitude relationship in accordance with a cross-section-volumetric averaging mathematical relationship, measuring means connected to said last named means for determining the total value of the combined resultant signals, means for comparing the measured total value and a reference value operative to produce displacement control signals characteristic of the relative magnitudes thereof, and control means connected to said water line generation means responsive to the displacement control signals and operative to vary the water line locations uniformly on the cross-section waveforms to attain a selected magnitude thereof.

21. In apparatus for determining displacement characteristics of ship hulls, the combination of, a plurality of electrical signal generator means for producing electrical signals which when plotted against time reproduce the cross-section of the ship hull at a plurality of selected points along the length thereof, separate water line generation means connected to said generator means for superimposing on each cross-section waveform a water line representation, means connected to said water line generation means for combining resultant cross-section and water line signals for the various stations in amplitude relationship in accordance with a cross-section-volumetric averaging mathematical relationship, measuring means connected to said last mentioned means for determining the total value of the combined resultant signals, means connected to said measuring means for comparing the measured total value and a reference value operative to produce displacement control signals characteristic of the relative magnitudes thereof, control means connected to said last named means and said water line generation means responsive to the displacement control signals and operative to vary the water line locations uniformly on the cross-section waveforms to attain a selected magnitude thereof, and means connected to said measuring means for determining the location of the geometrical center of the combined resultant signals.

22. In apparatus for determining displacement characteristics of ship hulls, the combination of, a plurality of electrical signal generator means for producing electrical signals which when plotted against time reproduce the cross-section of the ship hull at a plurality of selected points along the length thereof, separate water line generation means connected to said signal generator means for superimposing on each cross-section waveform a water line representation, means connected to said water line generator means for combining the resultant cross-section and water line signals for the various stations an amplitude relationship in accordance with a cross-section-volumetric averaging mathematical relationship, measuring means connected to said last named means for determining the total value of the combined resultant signals, means connected to said measuring means for comparing the measured total value and a reference value operative to produce displacement control signals characteristic of the relative magnitudes thereof, control means connected to said water line generation means responsive to the displacement control signals and operative to vary the water line locations uniformly on the cross-section waveforms to attain a selected magnitude thereof, second mixer means for combining the resultant cross-section and water line signals for the various stations in amplitude relationships proportional to distance of each station from a reference station location, means for comparing the combined signals with a reference signal operative to produce moment control signals characteristic of the relative magnitudes thereof, and control means for said water line generation means responsive to the moment control signals and operative to vary the water line locations for the various stations in proportion to the distance of each station from the reference station location.

23. In apparatus for determining displacement characteristics of ship hulls, the combination of, timing means for producing a series of pulse timing signals having a selected recurrence frequency, signal generator means connected to and responsive to said pulse timing signals for producing a series of pulse signals of selected duration and spacing following each timing signal, mixing means connected to the output of said signal generator means for combining the pulse signals in selectable amplitude, adjustable time constant integrator means connected to the output of the mixer means for integrating the combination pulse signals, and time controlled signal distorting transmission means connected to said integrator means and operative to transmit integrated signals without distortion for a selected period of time following each pulse signal and to block integrated signal transmission in controllable amount at the conclusion of the selected period of time following each pulse to produce a signal waveform equivalent to that of a displacement cross-section of the ship hull.

24. In apparatus for determining displacement characteristics of ship hulls wherein repetitive electrical signals are produced having a waveform which corresponds to the ship hull outline at a selected portion thereof, water line insertion means comprising, a capacitance, low impedance charge means for said capacitance operative to charge said capacitance during the portion of the signal waveform which corresponds to the submerged portion of the ship hull outline, time controlled switch means connected to said charge means which terminates the charging signal applied to said capacitance at a selected instant of time, and discharge means connected to said capacitance operative to provide a constant current discharge thereof at a selected rate upon termination of the charging signal.

25. In apparatus for determining displacement characteristics of ship hulls wherein repetitive electrical signals are produced having a waveform which corresponds to a ship hull outline including a list angle at a selected portion thereof, stability factor calculating apparatus comprising, means producing a first signal having a waveform corresponding to the average ship cross-sectional outline on each side of a center longitudinal plane, means for producing a second signal having a waveform which represents the average displacement outline on one side of the center longitudinal plane, means for producing a third signal having a waveform which represents the average displacement outline on the second side of the center longitudinal plane, first adder means for combining the second and third signals in equal amplitudes, divider means connected to the output of said last named means for dividing the combined signals by a factor of two, subtractor means connected to the output of said last named means operative to subtract the output therefrom from the first signal, first angle resolver means for multiplying the output of said subtractor means by the cosine of the list angle involved in the hull outline, sawtooth generator means for producing a sawtooth signal waveform which has a 45-degree slope with respect to time when taken to the same scale as employed for the other waveform to simulate vertical distances above ships keel, second angle resolver means for multiplying the sawtooth signal by the sine of list angle involved in the hull outline, second adder means connected to the output of the first and second angle resolver means for combining the signals therefrom in equal amplitudes, multiplier means connected to the output of the divider means and second adder means for multiplying the signals therefrom, and indicator means for indicating the value of the resultant signal, which is equal to the righting arm for the ship for the chosen displacement for the ship.

26. In apparatus for determining displacement characteristics of ship hulls wherein repetitive electrical signals are produced having a waveform which corresponds to the ship hull outline at a selected portion thereof, water line insertion means comprising, a capacitance, low impedance charge means for said capacitance operative to charge said capacitance during the portion of the waveform which corresponds to the submerged portion of the ship hull outline, time controlled switching means which terminates the charging signal applied to said capacitance at a selected instant of time, capacitance discharge means for said capacitance operative to initiate a constant current discharge of said capacitance upon termination of the charging period, control means for said discharge means operative to adjust the impedance of said capacitance discharge means to vary the slope of the discharge, and signal generator means connected to said control means operative to vary the discharge rate of the capacitance at a low frequency relative to the repetition frequency of the electrical signals.

27. In apparatus for determining displacement characteristics of ship hulls wherein repetitive electrical signals are produced having a waveform which corresponds to the ship hull outline at a selected portion thereof, water line signal generator means comprising a capacitance, low impedance charge means for said capacitance operative to charge said capacitance during the portion of the signal waveform which corresponds to the submerged portion of the ship hull outline, switching means responsive to input control signals operative to terminate the charging signal applied to said capacitance, discharge means for said capacitance operative to provide a constant current discharge thereof at a selected rate upon termination of the charging signal, measuring means for integrating the signal thus produced across the capacitance, a reference displacement source for deriving reference signal values equal to the desired value of the integrated signal, first and second electron tubes connected in opposition and having individual inputs operative to provide output signals in dependency on differences between the signal inputs thereto, means connecting the measuring means to the input of one of the electron tubes, means connecting the reference displacement source to the input of a second one of the electron tubes, and means connecting the output of the two electron tubes to the switching means as input control signals thereto whereby the beginning of the capacitance discharge is altered to obtain the desired displacement.

28. In apparatus for determining displacement characteristics of ship hulls wherein repetitive electrical signals are produced having waveforms which correspond to the ship hull cross-section outline at a plurality of preselected locations along the length of the hull, the combination of, water line generation means responsive to control signals for placing upon the waveforms limiting signals in the position of the transverse water line relative to the keel for each section, displacement moment determination means for combining the waveform water line signals for all the sections in amplitude dependency upon the distance of each from a reference plane parallel thereto, weight moment determining means for multiplying the gross weight of the ship by the distance between the center of gravity and the aforementioned reference plane, first and second electron tubes connected in opposition and having individual inputs operative to provide output signals in dependency on differences between the signal inputs thereto, means connecting the displacement moment determination means to the input of one of the electron tubes, means connecting the weight moment determining means to the input of a second one of the electron tubes, and means connecting the output signals from the two electron tubes to the water line generation means as input control signals thereto whereby the transverse water lines for the various sections are varied by different amounts relative to the keel to obtain equality between the displacement moments and the weight moments.

References Cited in the file of this patent

UNITED STATES PATENTS

| | | |
|---|---|---|
| 2,643,819 | Yuk Wing Lee et al. | June 30, 1953 |
| 2,656,101 | Haviland | Oct. 20, 1953 |
| 2,705,901 | Sherwin | Apr. 12, 1955 |
| 2,773,641 | Baum | Dec. 11, 1956 |

OTHER REFERENCES

Electronic Instruments (Greenwood et al.), vol. 21, Radiation Laboratory Series, published by McGraw-Hill Book Co., 1948, pages relied on 50–53.

Cheatham, T. P. Electronic Correlator for Solving Complex Signalling Parameters, pp. 40–43, Tele-Tech, February 1950.

Wallman, Henry: An Electronic Integral-Transform Computer and the Practical Solution of Integral Equations. Journal of Franklin Institute, vol. 250 No. 1, July 1950, pp. 45–61.

Singleton, Henry E.: A Digital Electronic Correlator. Proceedings of the IRE, December 1950, pp. 1422–1428.

Project Cyclone, Symposium II on Simulation and Computing Techniques part 2, Apr. 28–May 2, 1952, New York City, Reeves Instruments Corporation under the sponsorship of the U.S. Navy Special Devices Center, pages relied on 215–223.

Macnee, A. B.: A High Speed Product Integrator. The Review of Scientific Instruments, vol. 24, No. 3, March 1953, pp. 207–211.